US010511492B2

(12) United States Patent
Kanojia et al.

(10) Patent No.: US 10,511,492 B2
(45) Date of Patent: Dec. 17, 2019

(54) APPLICATION PROGRAMMING INTERFACE FOR PREMISES NETWORKING DEVICE

(71) Applicant: Starry, Inc., Boston, MA (US)

(72) Inventors: Chaitanya Kanojia, West Newton, MA (US); Alex Moulle-Berteaux, Brooklyn, NY (US); Brian Scott Loveland, Southborough, MA (US); Donald Lehman, Brooklyn, NY (US); Joseph Thaddeus Lipowski, Norwell, MA (US)

(73) Assignee: Starry, Inc., Boston, MA (US)

( * ) Notice: Subject to any disclaimer, the term of this patent is extended or adjusted under 35 U.S.C. 154(b) by 0 days.

(21) Appl. No.: 15/416,924

(22) Filed: Jan. 26, 2017

(65) Prior Publication Data
US 2017/0214584 A1    Jul. 27, 2017

Related U.S. Application Data

(60) Provisional application No. 62/287,528, filed on Jan. 27, 2016, provisional application No. 62/326,210, filed on Apr. 22, 2016.

(51) Int. Cl.
*H04L 12/24* (2006.01)
*H04W 4/80* (2018.01)
(Continued)

(52) U.S. Cl.
CPC ............ *H04L 41/22* (2013.01); *G06F 3/0482* (2013.01); *G06F 3/0484* (2013.01);
(Continued)

(58) Field of Classification Search
CPC ............... H04L 67/306; H04L 61/2015; H04L 61/1511; H04L 67/02; H04L 1/0003;
(Continued)

(56) References Cited

U.S. PATENT DOCUMENTS

| | | |
|---|---|---|
| 5,819,028 A | 10/1998 | Manghirmalani et al. |
| 8,555,047 B2 | 10/2013 | Malasani |

(Continued)

OTHER PUBLICATIONS

International Search Report and the Written Opinion of the International Searching Authority, dated May 31, 2017, from International Application No. PCT/US2017/015142, filed on Jan. 26, 2017. Twenty-one pages.

(Continued)

*Primary Examiner* — Natasha W Cosme
(74) *Attorney, Agent, or Firm* — HoustonHogle LLP

(57) ABSTRACT

A premises networking device includes hardware components including speakers, microphone, infrared sensor, spectrum analyzer and wireless interfaces. A touch screen display presents a user interface that provides information about network conditions and configuration settings and a menu for setting and changing configuration settings. Different versions of the user interface are displayed based on whether a user is in proximity to the device. The user interface includes shapes representing user devices, the visual characteristics of which change based on the current network conditions. A health score, which is an evaluation of network performance based on measurements of aspects of the conditions of the network, is displayed in real time. A network management system includes a network management platform for storing network conditions and configuration information and pushing the information to premises networking devices. An application programming interface allows third-party applications to send instructions to and access data from various system processes.

30 Claims, 73 Drawing Sheets

(51) Int. Cl.
| | |
|---|---|
| *G06F 3/0488* | (2013.01) |
| *H04L 12/26* | (2006.01) |
| *G06F 3/0484* | (2013.01) |
| *G06F 3/16* | (2006.01) |
| *G06F 3/0482* | (2013.01) |
| *H04B 17/318* | (2015.01) |
| *H04W 24/02* | (2009.01) |
| *H04W 24/08* | (2009.01) |
| *H04L 29/08* | (2006.01) |
| *G06F 3/0481* | (2013.01) |
| *H04L 12/28* | (2006.01) |
| *H04W 84/12* | (2009.01) |
| *H04L 29/12* | (2006.01) |

(52) U.S. Cl.
CPC ............ *G06F 3/0488* (2013.01); *G06F 3/167* (2013.01); *H04B 17/318* (2015.01); *H04L 41/0806* (2013.01); *H04L 41/0813* (2013.01); *H04L 41/0816* (2013.01); *H04L 41/0886* (2013.01); *H04L 41/12* (2013.01); *H04L 41/14* (2013.01); *H04L 41/20* (2013.01); *H04L 43/045* (2013.01); *H04L 43/0811* (2013.01); *H04L 43/0864* (2013.01); *H04L 43/0894* (2013.01); *H04L 67/306* (2013.01); *H04W 4/80* (2018.02); *H04W 24/02* (2013.01); *H04W 24/08* (2013.01); *G06F 3/04817* (2013.01); *G06F 3/04842* (2013.01); *H04L 12/2803* (2013.01); *H04L 12/2807* (2013.01); *H04L 61/1511* (2013.01); *H04L 61/2015* (2013.01); *H04L 2012/2841* (2013.01); *H04L 2012/2849* (2013.01); *H04W 84/12* (2013.01)

(58) Field of Classification Search
CPC ... H04L 1/0025; H04L 1/0032; H04L 1/1671; H04L 1/1685; H04L 29/12009; H04L 41/0806; H04L 41/0813; H04L 43/0811; H04L 61/00; H04L 69/18; H04L 2012/2841

USPC ........................................................ 370/254
See application file for complete search history.

(56) References Cited

U.S. PATENT DOCUMENTS

| | | | |
|---|---|---|---|
| 9,485,728 | B1 | 11/2016 | Banerjea et al. |
| 10,223,754 | B1* | 3/2019 | Lopez ................... G06Q 40/12 |
| 2007/0250596 | A1 | 10/2007 | Baugher |
| 2011/0277001 | A1 | 11/2011 | Kaluskar et al. |
| 2013/0230325 | A1 | 9/2013 | Chow et al. |
| 2013/0254856 | A1 | 9/2013 | Krishan |
| 2014/0143695 | A1 | 5/2014 | Sundermeyer et al. |
| 2015/0058456 | A1 | 2/2015 | Staats et al. |
| 2015/0074259 | A1 | 3/2015 | Ansari et al. |
| 2015/0205449 | A1 | 7/2015 | Sinha et al. |
| 2015/0221151 | A1 | 8/2015 | Bacco et al. |
| 2015/0304157 | A1 | 10/2015 | Kim et al. |
| 2015/0331666 | A1* | 11/2015 | Bucsa ..................... G10L 15/30 704/275 |
| 2015/0382215 | A1 | 12/2015 | Huang |
| 2016/0135112 | A1 | 5/2016 | Lin |
| 2016/0139752 | A1 | 5/2016 | Shim et al. |
| 2016/0142407 | A1 | 5/2016 | Chun et al. |
| 2016/0226732 | A1 | 8/2016 | Kim et al. |
| 2016/0234232 | A1* | 8/2016 | Poder .................. H04L 63/1425 |
| 2017/0099198 | A1 | 4/2017 | Bhimavarapu et al. |
| 2017/0111811 | A1 | 4/2017 | Szymanik et al. |
| 2017/0171054 | A1 | 6/2017 | Howcroft |
| 2017/0212653 | A1 | 7/2017 | Kanojia et al. |
| 2017/0214574 | A1 | 7/2017 | Kanojia et al. |
| 2017/0214577 | A1 | 7/2017 | Kanojia et al. |
| 2017/0214583 | A1 | 7/2017 | Kanojia et al. |

OTHER PUBLICATIONS

Partial International Search Report, dated Mar. 13, 2017, from International Application No. PCT/US2017/015142 filed on Jan. 26, 2017. Three pages.

International Preliminary Report on Patentability, dated Aug. 9, 2018, from International Application No. PCT/US2017/015142, filed on Jan. 26, 2017. Thirteen pages.

* cited by examiner

APPLICATION PROGRAMMING INTERFACE FOR PREMISES NETWORKING DEVICE

RELATED APPLICATIONS

This application claims the benefit under 35 U.S.C. 119(e) of U.S. Provisional Application No. 62/287,528, filed on Jan. 27, 2016, and U.S. Provisional Application No. 62/326, 210, filed on Apr. 22, 2016, both of which are incorporated herein by reference in their entirety.

This application is related to U.S. application Ser. No. 15/416,897 filed on Jan. 26, 2017, entitled "Premises Networking Device User Interface and Method of Operation", now U.S. Patent Publication No.: US2017/0214583, U.S. application Ser. No. 15/416,902, filed on Jan. 26, 2017, entitled "Method and Device for Evaluating Local Area Network", now U.S. Patent Publication No.: 2017/0214577, U.S. application Ser. No. 15/416,910, filed on Jan. 26, 2017, entitled "Premises Networking Device with Interactive Display and Method of Operation", now U.S. Patent Publication No.: 2017/0212653, and U.S. application Ser. No. 15/416, 919, filed on Jan. 26, 2017, entitled "Network Management System and Method for Access Network", now U.S. Patent Publication No.: 2017/0214574, all of which are incorporated herein by reference in their entirety.

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

In general, consumer or small business grade networking devices are installed on user premises to support local area networks (LAN). Often, these networking devices are commodity devices that are provided by an internet service provider (ISP) as part of an internet subscription service. In other cases, consumers directly purchase devices to serve as routers and wireless access points. Typically, these devices perform router functions such as forwarding data packets between computer networks such as the LAN for the premises and the service provider networks, which provides access to the internet. Often, these networking devices include Wi-Fi capability, which is wireless local area networking based on the IEEE (Institute of Electrical and Electronics Engineers) 802.11 standards. They also maintain the local network and perform functions such as Dynamic Host Configuration Protocol (DHCP) services, domain name system (DNS) services, point-to-point protocol over Ethernet (PPPoE) services, network address translation (NAT) services, provide encryption such as WPA2, and a firewall, among other things.

Typically, configuration settings for networking devices are accessed and modified via an integrated web server function. Users administer the devices through a web browser operating on a desktop computer or mobile computing device. More recently, networking devices have been offered that can be administered via an app installed on a mobile computing device such as a smartphone.

SUMMARY OF THE INVENTION

Typically, premises networking devices such as routers support network connections for host computing devices, maintain local area networks for premises such as homes or offices, and provide access to wide area networks such as the internet to connected devices. Many of these devices operate with basic firmware and only limited hardware components.

It is desirable for premises networking devices to include more advanced hardware components, which can be accessed and driven by higher level software applications in order to expand the capability of the devices and allow for the integration of local area network management with other aspects of premises management. The present premises networking device can have a touch screen display, an infrared sensor, speakers, a microphone, a spectrum analyzer, and/or low-power wireless communication interfaces (for example, Bluetooth). An operating system provides an application programming interface (API) for higher level applications, including applications executing on the device's controller and remote applications. The API allows the applications to make function calls to the operating system, providing access to system processes such as those that drive the functionality of the advanced hardware components of the device.

The API opens up the premises networking device to outside developers, such as those from business entities different from the business entity providing the device, to create third party applications to provide functionality outside the scope of traditional networking devices. By facilitating the use of higher level software, including that developed by third parties, the API allows the device to be customized to function with and coordinate many different home and business technologies as well as to evolve to accommodate emerging technologies.

In general, according to one aspect, the invention features a premises networking device with a controller executing an operating system. The operating system directs the functionality of the premises networking device and provides an application programming interface, which enables instructions to be executed by the controller. Third-party applications, which are applications supplied by entities that are different from a business entity offering the premises networking device, execute on the controller and make function calls via the application programming interface.

In embodiments, the application programming interface enables the third-party applications to send instructions to various hardware components of the premises networking device, including speakers, a microphone, an infrared sensor, wireless interfaces, and a touch screen display. In addition, applications executing on network servers can send instructions to be executed by the controller via the API. The third-party applications can include applications for managing home security systems, home lighting systems, and speaker systems. Additionally, the third-party applications can access context information of the premises networking device, such as whether a user is proximate to the premises networking device, whether the user has looked up weather information using the premises networking device, or whether the user has looked up time information using the premises networking device.

In general, according to another aspect, the invention features a method for executing instructions on a premises networking device. Third-party applications send function calls to an application programming interface of an operating system of the premises networking device. The operating system receives and executes the function calls.

In general, according to another aspect, the invention features a premises networking device comprising a microphone and speaker and a controller, which uses the microphone and speaker to establish a connection between a user at the premises networking device and a customer service system, provide uplink and/or downlink status information, or provide subscription, data usage, or activity information.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Figure 1A:
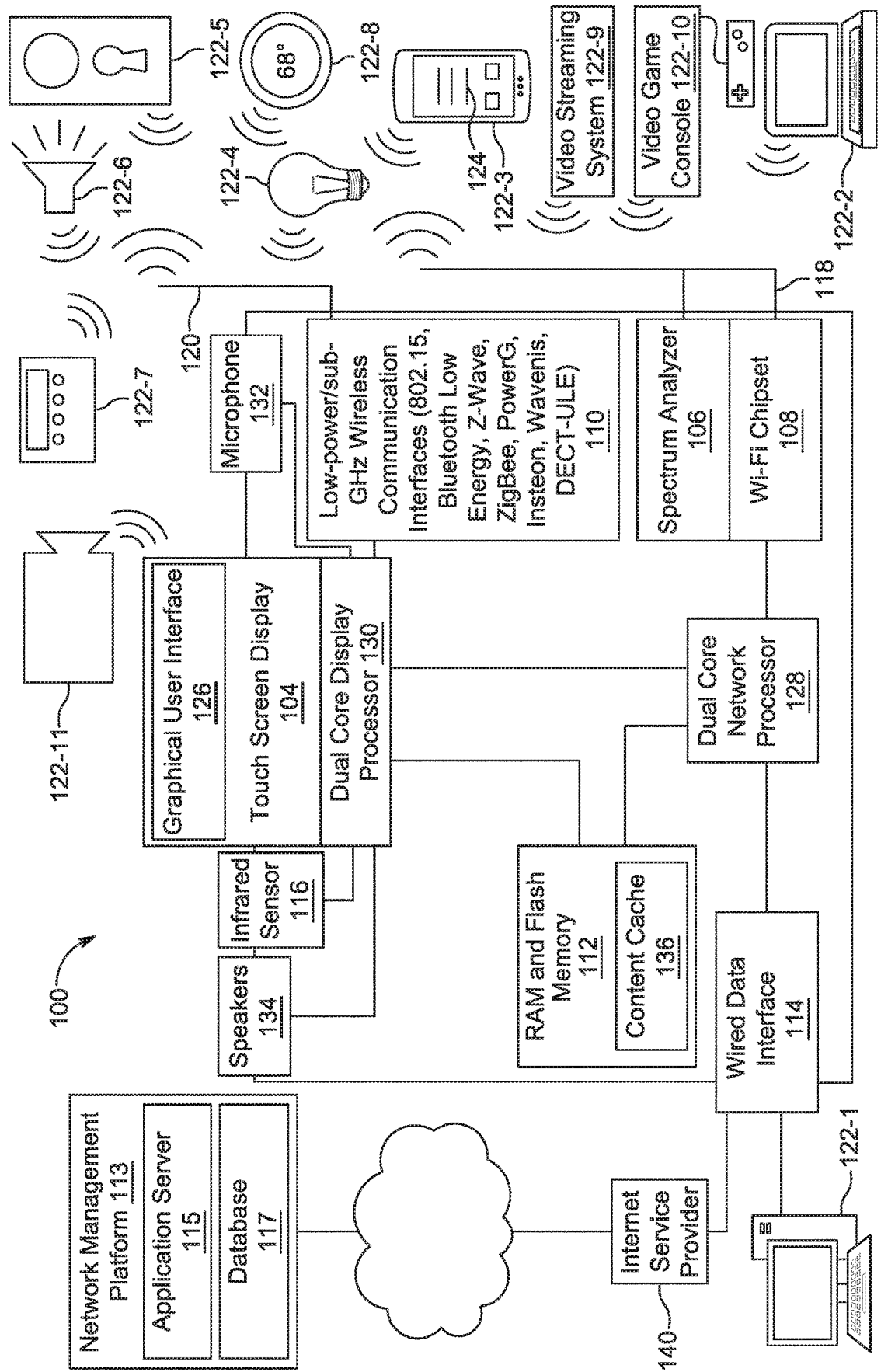
FIG. 1A is a block diagram of a premises networking device according to the present invention.

FIG. 1A is a block diagram of a premises networking device 100 such as an access point or router. The device supports network connections for host computing devices and maintains a local area network for a premises such as a home or office. In one embodiment, the device performs the traditional functions associated with networking devices such as routers. These include Dynamic Host Configuration Protocol (DHCP) services, domain name system (DNS) services, point-to-point protocol over Ethernet (PPPoE) services, network address translation (NAT) services, encryption such as WPA2, and firewall, among other things.

The device includes a display processor 130 and network processor 128. The network processor 128 manages the communications and the configuration of the LAN maintained by the device and is also able to analyze the radio frequency spectrum using a spectrum analyzer 106. On the other hand, the display processor 130 is able to access host devices via low-power wireless communication interfaces 110 and monitor its physical proximity using an infrared sensor 116.

In addition, the display processor 130, among other functions, drives and receives user inputs from a touch screen display 104. It generates a graphical user interface (GUI) 126 and renders it on the display 104. Then, user input derived from the touching of the screen is detected and forwarded back to the display processor 130. This graphical user interface can also be rendered on user devices, such as a smart phone or tablet user device 122-3 via a configuration app 124 executing on the user device 122.

The network processor 128 manages the forwarding of packets between the host devices via the WiFi interface 108 and wired data interface 114 and an internet service provider 140, and manages the protocols associated with the wired interface 114 and WiFi 108 and the translation between these interfaces.

The premises networking device 100 further comprises memory 112 accessed by the network processor 128 and the display processor 130, which contains software/firmware dictating the operation of the display processor 130 and network processor 128, stored configuration information and data measured by and received from the communication interfaces 108, 110, 114 as well as the spectrum analyzer 106, over time. In one embodiment, the memory is 1.5 GB random access memory (RAM) and 8 GB of flash memory. Further, the memory contains a content cache 136 in the flash memory and/or a separate SD memory card.

Additionally, a network management platform 113 includes an application server 115 and a database 117. The application server 115 receives and processes configuration information and network conditions information, which includes data from all components of the premises networking device 100. The configuration information and network conditions information is stored in the database 117. The network management platform 113 also communicates data to the premises networking device 100.

The GUI 126 comprises various screens that communicate information to the user and enable the user to input information by selecting virtual buttons and keys (for example, of a keyboard). Some virtual buttons are displayed on the screens of the GUI as oblongs with rounded ends and text centered within the shape. Other virtual buttons are displayed as circles with characters or graphics centered within the shape. The text and graphics communicate to the user what input option the virtual button represents. The display 104 detects selection of these buttons by the user and forwards that information to the display processor 130.

In one embodiment, the touch screen display 104 is a 4.5" (measured diagonally) capacitive LCD covered by a mask such that the visible portion of the screen is 3.8".

The premises networking device 100 further comprises speakers 134 and a microphone 132, which generate audible sounds and detect audio under the control of the display processor 130. In one embodiment, sounds are generated upon selection of certain buttons on the GUI. In some embodiments, the microphone receives audio voice commands from the user. The voice command data is then interpreted by the display processor 130 and/or by a cloud-based processing system and the commands are executed by the display processor 130. The commands can relate to either the premises networking device's functionality, or a third party service (for example, music streaming service) executing on the device 100. In another embodiment, the speakers 134 and microphone 132 send and receive voice information between the user and a technical support service using voice over internet protocol (VOIP) protocol.

In some cases, the wired data interface 114 connects to an internet service provider wireless, cable or optical fiber modem or gateway and possibly to wired user host devices 122. The Wi-Fi interface 108, via a Wi-Fi antenna 118, connects wirelessly to user host devices 122 to provide connectivity between the user devices and to the internet.

Figure 1B:
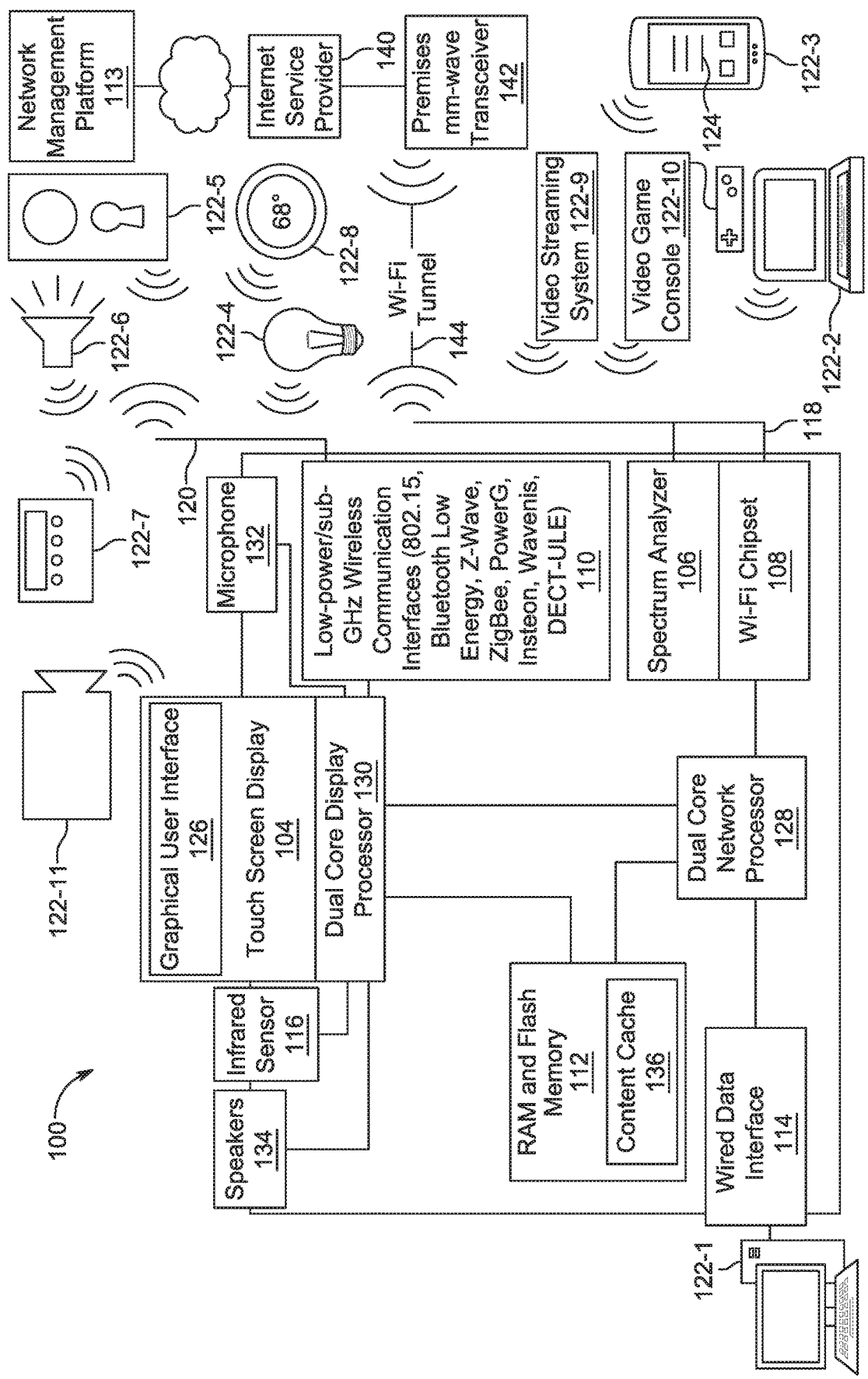
FIG. 1B is a block diagram of a premises networking device, according another embodiment in which the device is connected to a wireless high frequency transceiver through a Wi-Fi tunnel.

In other examples, however, the Wi-Fi interface further provides the connection to the internet service provider modem or gateway such as through a data tunneling protocol. FIG. 1B shows the premises networking device 100 connected to a premises a wireless transceiver 142 through a Wi-Fi tunnel 144. In one example the service provider wireless transceiver is a transceiver transmitting data over millimeter wavelengths such as in the range of 10-300 GHz.

In one embodiment, the wired data interface 114 includes one gigabit Ethernet port and specifically typically includes two or more RJ-45 jacks.

Further, the Wi-Fi interface 108 can be implemented in accordance with any of the wireless local area network standards IEEE 802.11 ac/n/g/b/a, in both the 2.4 GHz and 5.0 GHz frequency bands.

In addition, the low-power wireless communication interfaces (such as Bluetooth Low Energy, Z-Wave, ZigBee, PowerG, Insteon, Wavenis, and DECT-ULE, for example) 110, via a low-power wireless communication antenna 120, also connect wirelessly to user host devices 122 and other devices within the premises. In one embodiment, the low-power wireless communication interfaces 110 are implemented in accordance with the wireless local area network standard IEEE 802.15.

User devices 122 connect to the premises networking device 100 through either the wired data interface 114, the Wi-Fi interface 108, or the low-power wireless communication interfaces 110. User devices 122 can include desktop computers 122-1, laptop computers 122-2, other mobile computing devices (smart phones or tablets) 122-3, premises lighting systems 122-4, wireless door lock systems 122-5, wireless speakers 122-6, premises security systems 122-7, premises climate systems 122-8, video streaming systems 122-9, video game consoles 122-10, video surveillance cameras 122-11, and other devices.

Additionally, a configuration application 124 running on a connected user device 122 (e.g. a smart phone 122-3 running the iOS or Android operating systems) enables the user to view and change the configuration settings of the premises networking device 100 and also view the graphical user interface 126.

The spectrum analyzer 106 measures wireless conditions of the LAN including the strength of radiofrequency emissions in the 100's of MegaHertz to GigaHertz regions. In one example it covers a band including 800 MHz to 6 GHz. In this way it can measure power in the bands associated with WiFi and IEEE 802.15 and channel assignments of the signals received by the Wi-Fi antenna 118. These measurements are communicated to the network processor 128, which stores them in memory 112 and sends them to be stored on the network management platform 113.

Network Management Platform

Figure 2:
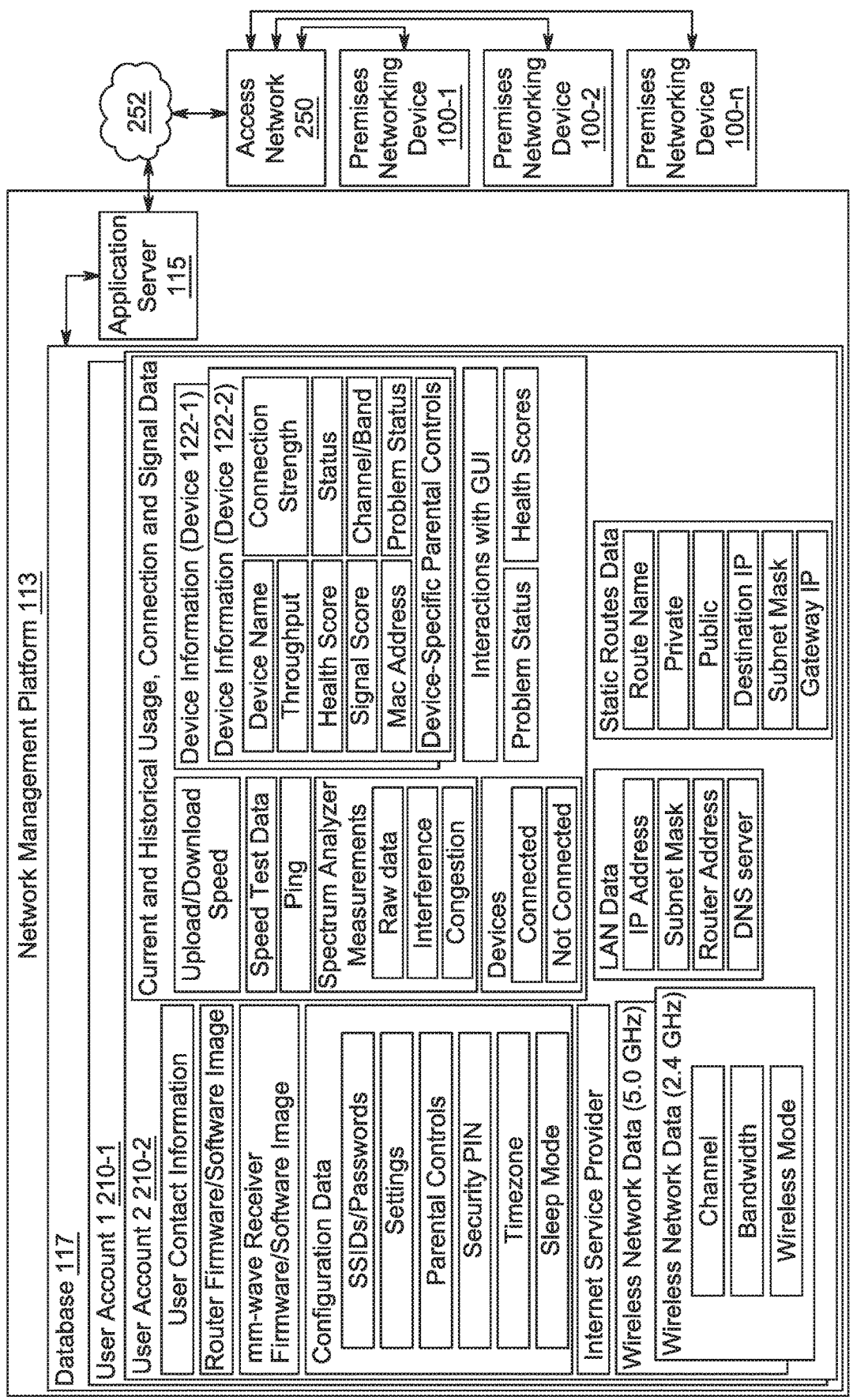
FIG. 2 is a diagram of a network management platform for an access network.

FIG. 2 shows the network management platform 113, which receives, stores and processes network conditions information and configuration information from multiple premises networking devices 100 and communicates data, including configuration information, to the devices.

Network conditions information is current and historical information about the conditions of the local area network maintained by the premises networking device 100. Network conditions can include the rate of transmission of data across the local area network such as between the premises networking device 100 and each of the devices 122, the rate of transmission of data between the local area network and a wide area network (such as the internet), error rate, the received signal strength of wireless signals sent between the user devices 122 and the premises networking device 100, the amount of data transmitted across the network to and from user devices 122, the bandwidth of the network, whether user devices 122 are connected to the internet, whether user devices 122 are connected to the premises networking device 100, electromagnetic radiation emissions within the spectral bands in which the wireless interfaces 110, 108 operate (and whether network congestion or interference is present), among other examples.

On a continuous basis throughout the normal operation of the premises networking device 100, network conditions information is measured by components of the premises networking device 100, such as the spectrum analyzer 106, the Wi-Fi antenna and chipset 118, 108, the low-power wireless communication interfaces and antenna 110, 120, and the wired data interface 114, and sent to the display processor 130. The display processor 130 sends the data to the network management platform 113 via an access network 250 of the internet service provider 140.

The access network 250, which is managed by the internet service provider 140, provides connectivity between a public network 252, such as the internet, and possibly connected content delivery networks and the premises networking devices 100 of subscribers of the access network 250. In one possible embodiment, the access network 250 comprises premises high frequency (i.e., typically greater than 10 GHz) or mm-wave transceivers wirelessly connected to aggregation nodes for providing access to the public network 252, and the internet service provider 140 provides the premises networking device 100 and the network management platform 113 to subscribers. However, in other embodiments, the access network 250 comprises POTS, cable networks and fiber optic networks, and the internet service provider 140 is different from the business entity providing the premises networking device 100 and the network management platform 113.

The application server 115 receives and processes network conditions and configuration information from multiple premises networking devices 100-1, 100-2, 100-n. The network conditions and configuration information is then stored in the database 117. The application server 115 also communicates data, such as configuration information, to the premises networking devices 100.

The database 117 stores the network conditions and configuration information from all of the premises networking devices 100. Within the database, each premises networking device 100 is associated with a user account record 210, which can also be associated with other services such as internet access through a premises high frequency or mm-wave transceiver 142. In examples, each user account record 210-1, 210-2 . . . 210-*n* includes:

user contact information;

an image of the premises networking device's 100 firmware and software (including installed apps);

an image of an mm-wave receiver's 142 firmware and software;

configuration data such as SSIDs and passwords for any wireless networks managed by the device 100, user settings, parental controls, a security PIN, the user's timezone, and whether or not the device is in sleep mode;

the user's internet service provider;

the channel, bandwidth and wireless mode of each wireless network managed by the premises networking device 100;

LAN data such as assigned host device IP addresses, subnet mask, router address, and DNS server;

static routes data such as the route name, private/public static route data, destination IP, subnet mask, and gateway IP;

current and historical usage, connection and signal data for the premises networking device 100, including upload speed, download speed, speed test data, ping speed, raw data from the spectrum analyzer 106, processed data from the spectrum analyzer 106 (including whether interference or congestion is detected on any channels), all user interactions with the GUI, health scores, problem status (for example, whether there is a problem with the premises networking device's 100 connection to the internet) and device data for both connected and not connected devices, including the device name, throughput, device health score, signal score, MAC address, connection strength, connection status, channel/band, device problem status (for example, whether or not a problem is detected with a user device's 122 connection to the premises networking device 100), and device-specific parental controls.

In one embodiment, the network management platform 113 stores historical usage, connection and signal data as unique iterations over time of the aforementioned data. In another embodiment, the network management platform 113 stores historical usage, connection and signal data as a weighted average.

The network management platform 113 pushes configuration information and device software from the platform to the premises networking device 100. For example, if a user purchases a new premises networking device 100 to replace one that is already configured, the user can input their existing user account information (such as username and password) into the device 100, and the network management platform 113 pushes software and configuration data to the new device. All historical usage data is also made available to the user through the new device.

In another example, updated firmware and/or software for the premises networking device 100 is pushed from the network management platform 113 to a premises networking device 100 with outdated firmware and/or software.

In another example, premises networking devices with outdated configuration settings receive updated configuration information from the networking management platform 113.

The network management platform 113 can also be accessed by the user through a configuration application 124 or through a GUI running on a web browser on a desktop or mobile computing device. All changes to the configuration settings input by the user through a configuration application 124 or a web browser are stored in the network management platform 113 and pushed down to the premises networking device 100.

Application Programming Interface

Figure 3:
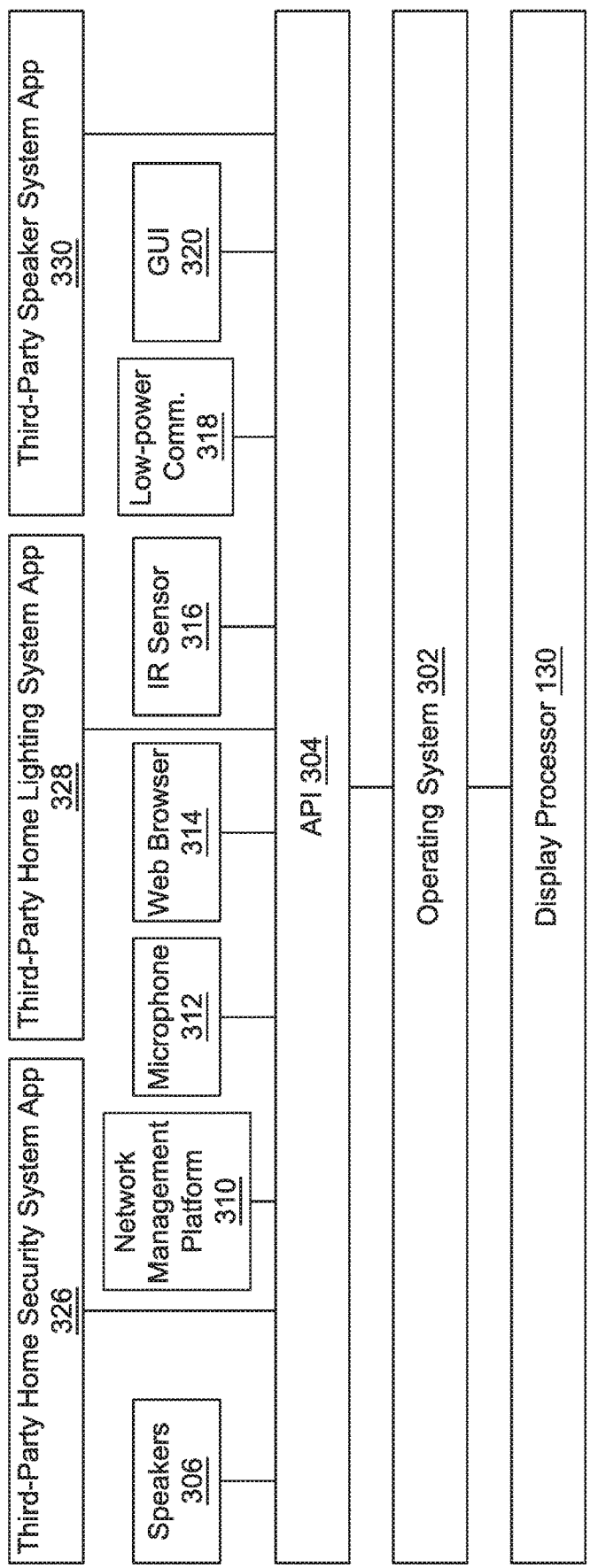
FIG. 3 is a block diagram of the software processes running on the controller of the premises networking device.

FIG. 3 is a block diagram showing the software processes running on the device controller, which is preferably the display processor 130 of the premises networking device 100. In other examples, the device control functions could be performed by the network processor 128 or some type of hybrid processor handling networking and device oversight.

The operating system 302, which executes on the processor 130, directs the basic functionality of the device. An operating system application programming interface (API) 304 makes data and functions available to higher level software (apps) running on the device, along with processes running external to the device such as the network management platform 113. Applications make function calls to the API 304, which in turn sends instructions to be executed by the processor 130. In this way, the API 304 allows instructions from the applications to be executed by the processor 130.

The API 304 allows applications to send instructions to and receive data from various system processes, such as the speakers process 306, the microphone process 312, the IR sensor process 316, the low-power communications interface chipset process 318, and the GUI process 320. The system processes perform the essential functions of each of the respective hardware components, including directing data and instructions sent to and from the respective associated chipsets.

A web browser 314 allows direct access to the internet from the premises networking device 100 via the GUI 126.

The API 304 makes data and functions available to one or more third-party apps running on the premises networking device 100 or a user device 122. Third-party applications are applications supplied by entities that are different from the business entity supplying the premises networking device 100. One example is the third-party home security system app 326, which is an app (developed, for example, by the manufacturer of a home security system) that controls the home security system through the premises networking device 100. Also included are the third-party home lighting system app 328 and the third-party speaker system app 330.

Other examples of third-party software that can run on the premises networking device are applications that combine control of separate premises automation systems (such as a premises lighting system, security system and climate system) into one user interface, applications that control security and privacy for all devices, applications that block advertisements on all internet-connected devices, and applications that manage parental controls for all connected devices.

In one example, a user can use the third-party home lighting system app 328 to turn lights on and off throughout the premises, or schedule preset on and off times for each connected lighting device 122-4.

In another example, a user can use a third-party retail shopping app (for example, from Amazon.com) to make purchases directly through the premises networking device 100. In one embodiment, the microphone process 312 receives voice command data from the microphone 132 and sends it to a third-party retail shopping app. The voice command data is then interpreted by a cloud-based processing system and is executed via the third-party retail shopping app (for example, an item is added to the user's virtual shopping cart).

In another example, a third-party voice authentication app can be used to control access to the premises networking device 100 and any third-party apps running thereon.

In another example, surveillance cameras 122-11 connected to the premises networking device 100 can be managed and controlled by a third party app developed by the manufacturer of the surveillance cameras 122-11.

In yet another example, third party applications can access information about the context of the premises networking device 100 such as if the user is detected and determined to be proximate to the device, or whether the user has checked other information such as weather or the time from the device, among other examples.

Figure 4:
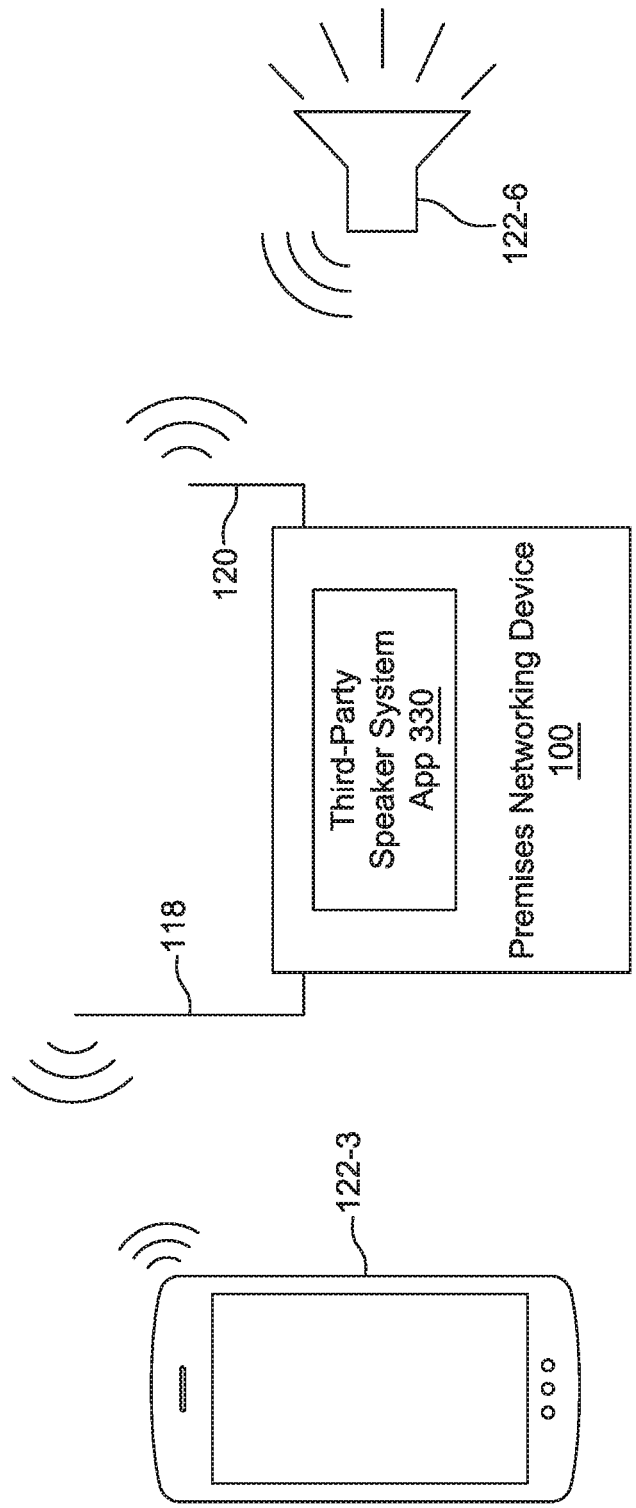
FIG. 4 is a schematic diagram illustrating how the premises networking device is used to create a proxy to a speaker connected to a network device by a Bluetooth link.

FIG. 4 illustrates another example, in which the premises networking device 100 is used to create a proxy to a speaker 122-6 connected to the premises networking device 100 by a Bluetooth link. A connected smart phone 122-3 is used to control the playback of music. The third-party speaker system app 330 receives the music data through Wi-Fi and communicates it to the speaker system 122-6 through the Bluetooth link. In this example, the user plays music from the smartphone 122-3 to a speaker 122-6 that is located outside of the range for a Bluetooth connection between the smartphone 122-3 and the speaker 122-6, but within the range for a Wi-Fi connection between the smartphone 122-3 and the premises networking device 100.

Spectrum Analyzer

In general, the spectrum analyzer 106 measures electromagnetic radiation emissions within the spectral bands in which the wireless interfaces 110, 108 operate.

Figure 5:
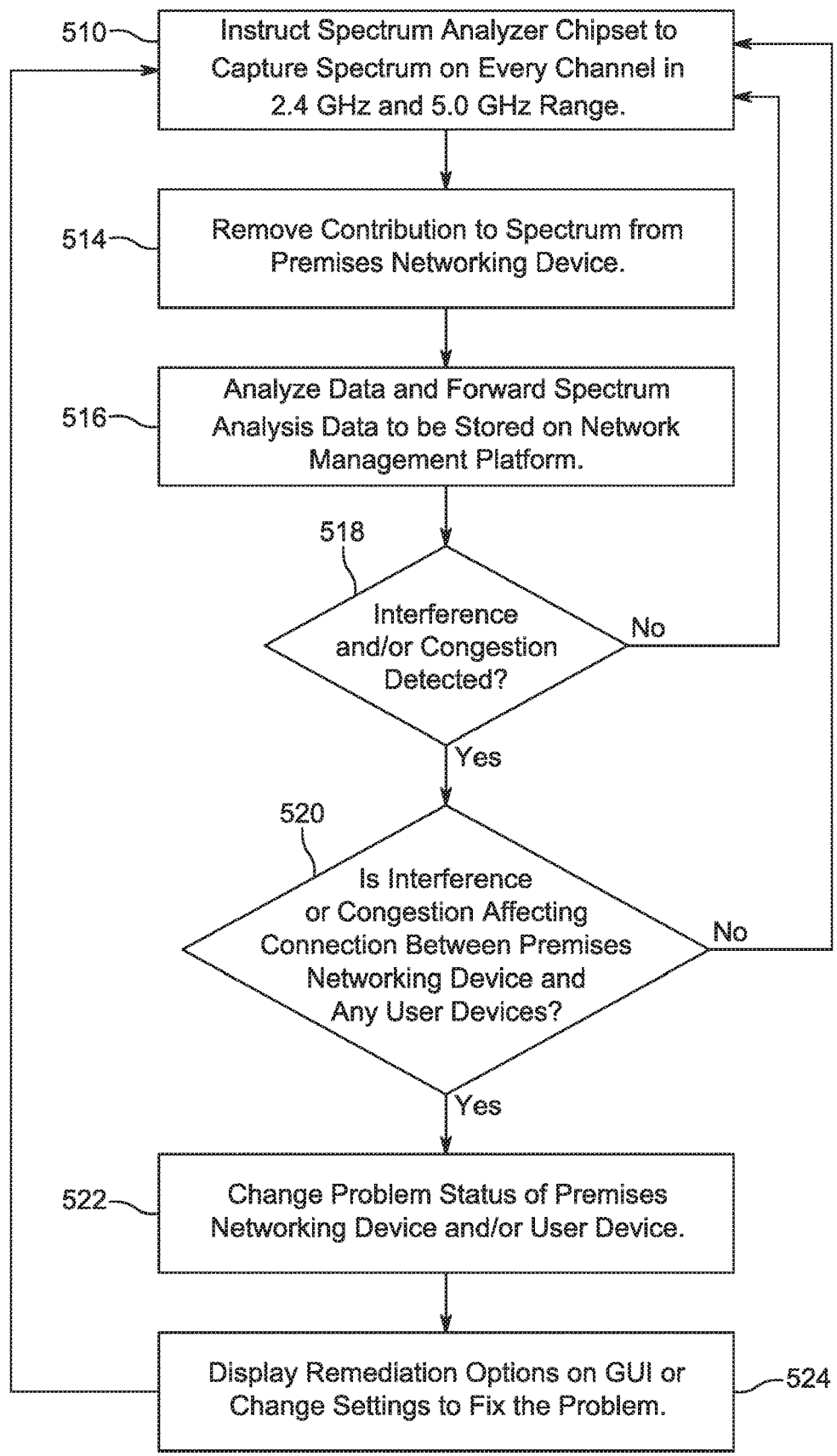
FIG. 5 is a flow diagram showing operation of the spectrum analyzer process.

FIG. 5 is a flow diagram showing operation of the spectrum analyzer process 322.

In step 510, the spectrum analyzer 106 is instructed to capture the spectrum on every channel in both the 2.4 GHz and 5.0 GHz ranges. In other examples, the spectrum analyzer also analyzes the spectrum in the operational bands of the mm-wave transceiver 142. In one example, the mm-wave transceiver 142 operates in one or more bands located somewhere in the 10 GHz to 300 GHz range, such as possibly 38.6-40.0 GHz band, 71-76 GHz band, 81-86 GHz band, and 92-95 GHz band.

Then, the contribution to the spectrum from the premises networking device 100 and/or the mm-wave transceiver 142 themselves are removed from the spectrum raw data in step 514. This provides information on potentially interfering sources.

In step 516, the spectrum data is analyzed, and the spectrum analysis data is then forwarded to be stored on the network management platform 113. In one embodiment, a two-stage analysis is performed. First the sampled radio frequency data is decoded on the network processor 128, because the raw data stream from the spectrum analyzer is very large. In the preferred embodiment, this process includes a local signal classifier, which is capable of identifying certain network conditions such as interference or congestion based on the raw data from the spectrum analyzer. A list of interference sources is generated and sent to be stored on the network management platform 113. Trend analysis is then performed on the network management platform 113. This classification information is sent back to the network management platform in some implementations, rather than the raw spectral information in order to reduce the amount information sent.

In step 518, if no interference or congestion is detected, the process returns to step 510, and the spectrum is recaptured. If interference and/or congestion is detected, it is then determined in step 520 whether the interference and/or congestion is affecting a connection between the premises networking device 100 and any of the user devices 122. If the connection between the premises networking device and the user devices is not affected by the congestion and/or interference, the process returns to step 510. In step 522, if the connection between the premises networking device 100 and the user devices 122 is affected by the congestion and/or interference, the problem status of the premises networking device 100 and/or the user device 122 is then updated on the network management platform 113 to indicate that there is a problem.

In step 524, options to remediate the interference and/or congestion are displayed on the GUI 126, or, alternately, changes to the configuration of the premises networking device 100 are enacted automatically to fix the problem. The spectrum analysis data, along with information stored on the network management platform 113, is used to determine how to optimize the connection with the user devices 122. In some examples, the network processor 128 reassigns and shifts user devices to different Wi-Fi bands among 2.4 GHz, 3.6 GHz, 4.9 GHz, 5 GHz, and 5.9 GHz bands. The network processor 128 further reassigns and shifts user devices to different channels within these bands based on the spectral analysis performed by the spectrum analyzer process 322 using measurements from the spectrum analyzer 106. In another example, the above mentioned changes are suggested to the user via the GUI 126 before being executed.

The spectrum analyzer process 322 then returns to step 510, as the spectrum is captured and analyzed on a continuous basis. Historical spectrum analysis data is then incorporated into the analysis process as increasing numbers of iterations of analysis yield a larger body of analysis data.

In one example, the spectrum analyzer process 322 determines that a neighbor's wireless access point is causing interference on a specific channel and a suggestion is communicated to the user that the user change the channel via the GUI 126. In another example, the spectrum analyzer process 322 determines that a nearby airport causes consistent interference on a specific channel and forwards instructions to be stored on the cloud-based network platform 113 to not attempt to use that channel. In another example, the spectrum analyzer process 322 determines that a microwave oven causes intermittent interference, and suggests via the GUI that the user change the channel or relocate the premises networking device 100. In yet another example, the spectrum analyzer process 322 determines, over time, a pattern of congestion in the wireless network at certain times and presents remediation options to the user via the GUI 126.

Health Score

In general, the health score is an evaluation of the performance of the local area network based on the conditions of the network.

In general, network conditions information is current and historical information about the conditions of the local area network maintained by the premises networking device 100 and its connection to the access network and the internet. Network conditions can include the rate of transmission of data across the local area network such as between the premises networking device 100 and each of the devices 122, the rate of transmission of data between the local area network and a wide area network (such as the internet), error rate, the received signal strength of wireless signals sent between the user devices 122 and the premises networking device 100, the amount of data transmitted across the network to and from user devices 122, the bandwidth of the network, whether user devices 122 are connected to the internet, whether user devices 122 are connected to the premises networking device 100, electromagnetic radiation emissions within the spectral bands in which the wireless interfaces 110, 108 operate (and whether network congestion or interference is present), among other examples.

In more detail, network conditions information is measured by components of the premises networking device 100, such as the spectrum analyzer 106, the Wi-Fi antenna and chipset 118, 108, the low-power wireless communication interfaces and antenna 110, 120, and the wired data interface 114, and sent to the display processor 130. The display processor 130 can store and assess the data locally and/or send the data to be stored and assessed on the network management platform 113.

When the network conditions information is assessed, a series of sub-scores are calculated and stored on the device 100 and/or network management platform 113. The health score 620 is then calculated as a weighted average of the sub-scores and stored on the device 100 and the network management platform 113. This process repeats continuously such that each sub-score and, by extension, the current health score, reflects the conditions of the network managed by the premises networking device 100 in real time.

In one embodiment, the health score ranges from 1 to 100, with a health score of 100 indicating optimum network conditions, and a health score of 1 indicating poor network conditions.

Figure 6A:
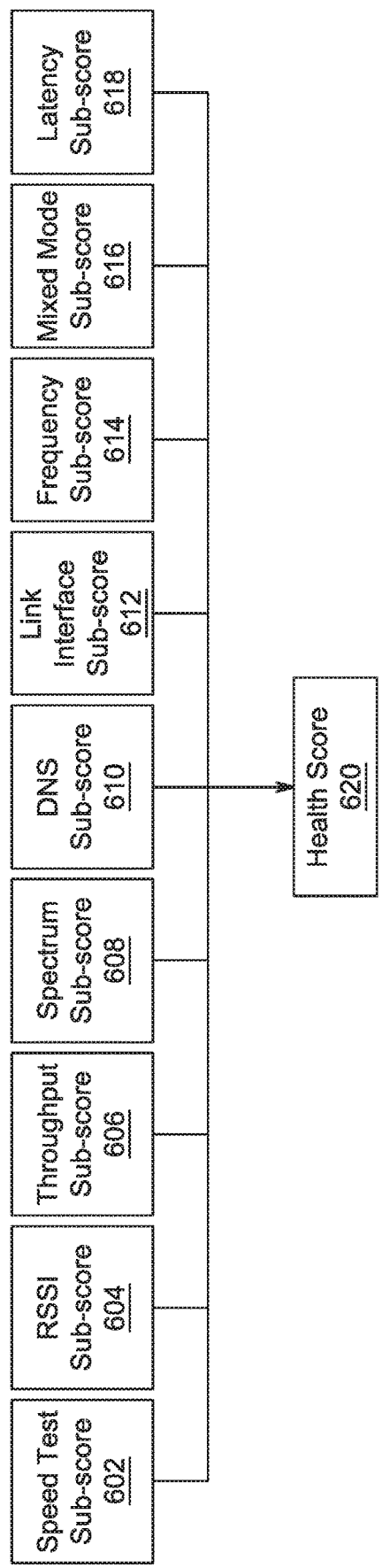
FIG. 6A is a flow diagram showing the measurements and sub-scores used in calculating the health score.

FIG. 6A is a diagram showing the sub-scores used in calculating the health score 620. Included are the speed test sub-score 602, the RSSI sub-score 604, the throughput sub-score 606, the spectrum sub-score 608, the DNS sub-score 610, the link interface sub-score 612, the frequency sub-score 614, the mixed mode sub-score 616, and the latency sub-score 618.

Figure 6B:
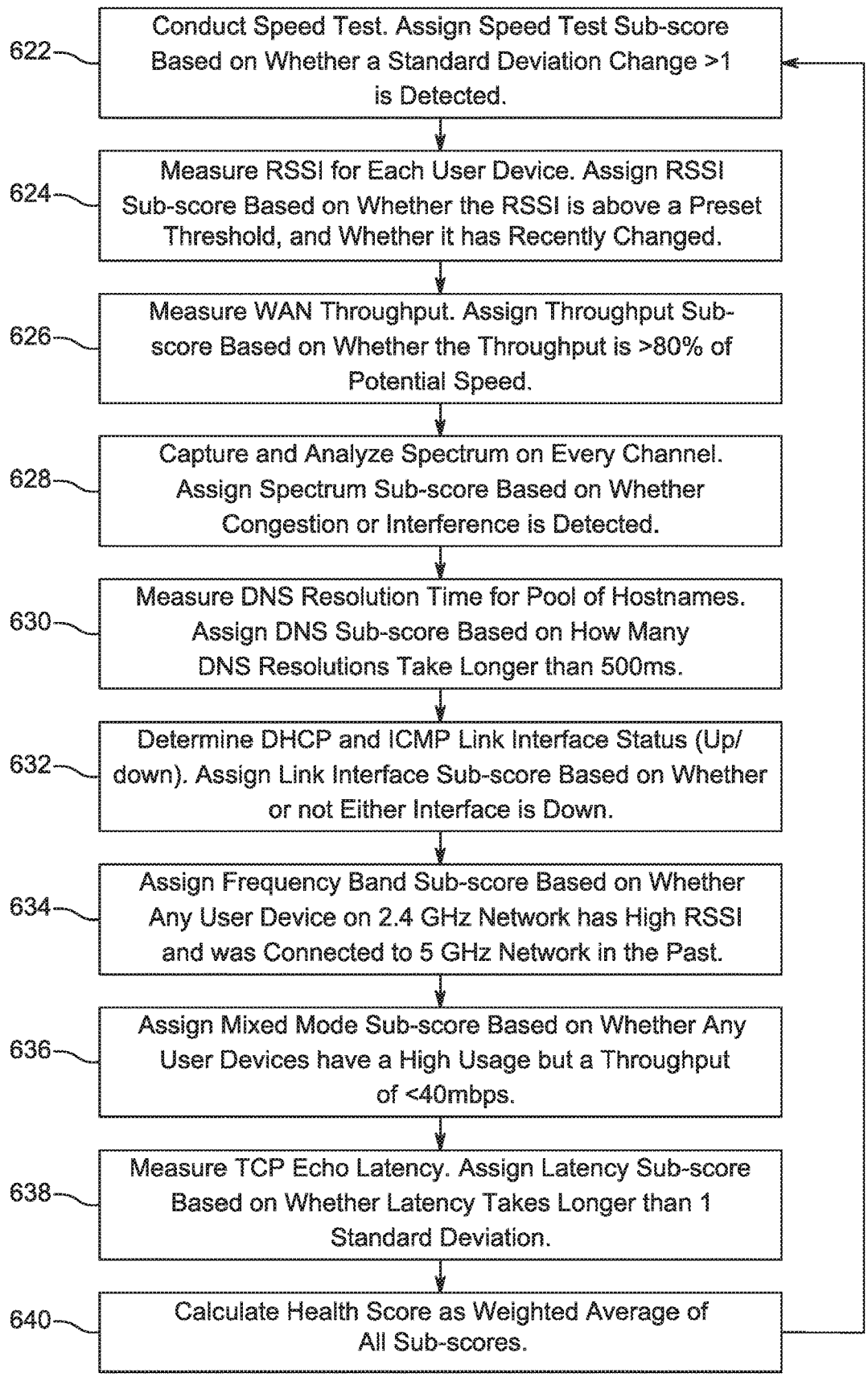
FIG. 6B is a flow diagram showing a sequence in which the various sub-scores are continually calculated and averaged to produce the health score.

FIG. 6B is a flow diagram showing a sequence in which the various sub-scores are continually calculated and averaged to produce the health score 620.

In step 622, a speed test network condition measurement is performed of the download speed and upload speed, which determine the rate of transmission of data from and to, respectively, the premises networking device 100 and a wide area network, such as the internet via the access network of the internet server provider. The speed is measured using a third party service such as Ookla (speedtest.net). The speed test is performed on a continuous basis (for example, every two hours). The results of the speed tests are compared with the results of previous speed tests, including the maximum recorded speed. A degradation of speed greater than one standard deviation, relative to previous speed tests and the available download and upload speed, results in a lower speed test sub-score 602. On the other hand, an increase in speed greater than one standard deviation, relative to previous speed tests and the available download and upload speed, results in a higher speed test sub-score 602.

In step 624, the received signal strength indication (RSSI) condition measurement is performed, which is a measurement of the signal strength of wireless signals between the premises networking device 100 and each user device 122. The RSSI data is compared to previous RSSI data (for example, an average of the user device's 122 previous RSSI measurements) and the user device's 122 bandwidth usage. If the RSSI is above a preset threshold, and if the RSSI comparison data reveals that the RSSI has recently changed, the RSSI sub-score 604 decreases on a non-linear scale. In one example, if the RSSI is less than −50 dBm, a RSSI sub-score of 100 out of 100 is assigned. In another example, if the RSSI is less than −75 dBm, a RSSI sub-score of 80 out of 100 is assigned. In another example, if the RSSI is less than −95, a RSSI sub-score of 40 out of 100 is assigned.

In step 626, a measurement of the wide area network (WAN) throughput is performed for the local area network maintained by the premises networking device 100. A WAN throughput that is greater than 80% of the available download and upload speed provided by the internet service provider 140 in the user's internet subscription results in a lower throughput sub-score 606.

In step 628, the spectral condition measurement is performed. This is analysis of every channel in both the 2.4 GHz and 5.0 GHz ranges, and all channels in the sub-GHz ranges. This information is captured by the spectrum analyzer 106 and resolved by the spectrum analyzer process 322. If congestion is detected, a lower spectrum sub-score 608 results. This score is based on the ratio of (the population of wireless access points other than the user's premises networking device 100 using the same channel as the premises networking device) to (the population in the channel least populated by other wireless access points). In one example, a ratio of 1.5:1 results in a spectrum sub-score of 90 out of 100. In another example, a ratio of 2:1 results in a spectrum sub-score of 75 out of 100. In another example, a ratio of 3:1 results in a spectrum sub-score of 50 out of 100.

In step 630, the domain name system (DNS) resolution time condition measurement is performed. Specifically, the resolution time for a pool of hostnames is measured. The DNS sub-score 610 decreases linearly based on the number of resolutions taking longer than 500 ms. If ten out of ten DNS resolutions complete in under 500 ms, a DNS sub-score of 100 out of 100 results. If eight out often DNS resolutions complete in under 500 ms, a DNS sub-score of 80 out of 100 results. If five out of ten DNS resolutions complete in under 500 ms, a DNS sub-score of 50 out of 100 results. If zero out of ten DNS resolutions complete in under 500 ms, a DNS sub-score of 0 out of 100 results.

In step 632, a network condition concerning whether the dynamic host configuration protocol (DHCP) and the internet control message protocol (ICMP) link interfaces are up or down is determined. This is measured based on the success of DHCP and ICMP queries. If either status is determined to be down, a lower link interface sub-score 612 results.

In step 634, if a user device 122 has a relatively high RSSI and is connected to the premises networking device 100 on a 2.4 GHz frequency channel, and, according to connection data stored in the network management platform 113, the device has been connected on a 5.0 GHz frequency channel at some point in the past, then it is determined that the user device 122 is connected wirelessly to the premises networking device 100 on a frequency channel that is not optimal, and a lower frequency sub-score 614 results.

In step 636, if a measurement of the amount of data transmitted across the local area network to and from a user device 122 is relatively high, but a measurement of that device's throughput is less than 40 megabits per second (mbps) for example, a lower mixed mode sub-score 616 results.

In step 638, the transmission control protocol (TCP) echo latency condition measurement is performed. This is measured by sending a TCP query and determining how long it takes for an identical copy of the data in the query to be sent back. A latency that takes longer than one standard deviation results in a lower latency sub-score 618. The extent to which the latency sub-score 618 changes scales with the degree of the latency shift.

In step 640, the health score 620 is calculated as a weighted average of all of the sub-scores. Each of the sub-scores is then recalculated, and a new health score 620 is recalculated, on a continuous basis. Historical data concerning the performance of the local area network maintained by the premises networking device 100, including past health scores 620, and past sub-scores, are then incorporated into the calculation of the health score, as increasing numbers of iterations of analysis yield a larger body of analysis data.

Figure 6C:
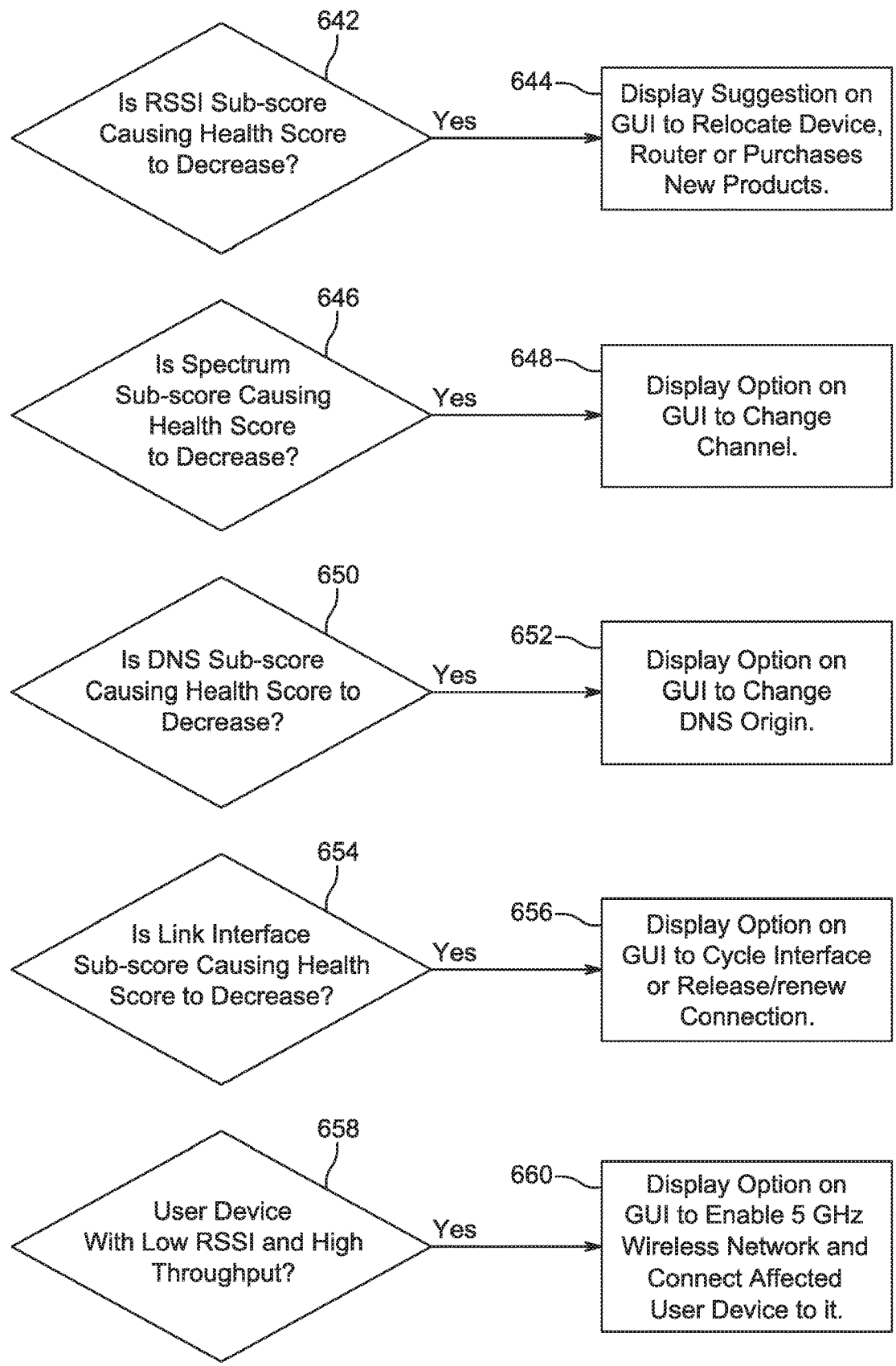
FIG. 6C is a flow diagram showing how options are presented to the user to change the configuration of the premises networking device.

Depending on which factor or factors are causing the health score 620 to decrease, resulting in a sub-optimal score, suggestions can be presented to the user via the GUI 126 to change the configuration of the premises networking device 100 in order to improve the network conditions and increase the health score. Flow diagrams in FIG. 6C depict this process.

For example, in step 642, if the RSSI sub-score 604 is causing a decrease in the health score 620, a suggestion is communicated to the user in step 644 to relocate the user device 122, relocate the premises networking device 100, or to purchase new products to remediate the low signal strength, such as an access point. In another example, in step 646, if the spectrum sub-score 608 is causing a decrease in the health score 620, an option is communicated to change the channel or channels being used by the premises networking device 100. In another example, in step 650, if the DNS sub-score 610 is causing a decrease in the health score 620, the option is communicated to the user in step 652 to change the DNS origin. In another example, in step 654, if the link interface sub-score 612 is causing a decrease in the health score 620, the option is communicated to the user in step 656 to cycle the interface or release/renew the connection. In another example, in step 658, if a low RSSI and a high throughput are detected for a particular user device 122, the option is communicated to the user to enable a 5 GHz wireless network to connect the affected user device 122 to the 5 GHz network. In each of these examples, the network processor 128 can also implement the changes to the configuration settings automatically, without user input.

The real-time and historic health score 620 and all processed data concerning the network conditions of the premises networking device 100 and all user devices 122, including the various real-time and historic sub-scores, are stored in the network management platform 113 and thus can be viewed by the user on the GUI 126, on a configuration application 124 running on a user device 122, and on a GUI running on a web browser.

Graphical User Interface

The GUI process 320, executing on the display processor 130, renders the GUI 126 on the display 104.

Figure 7:
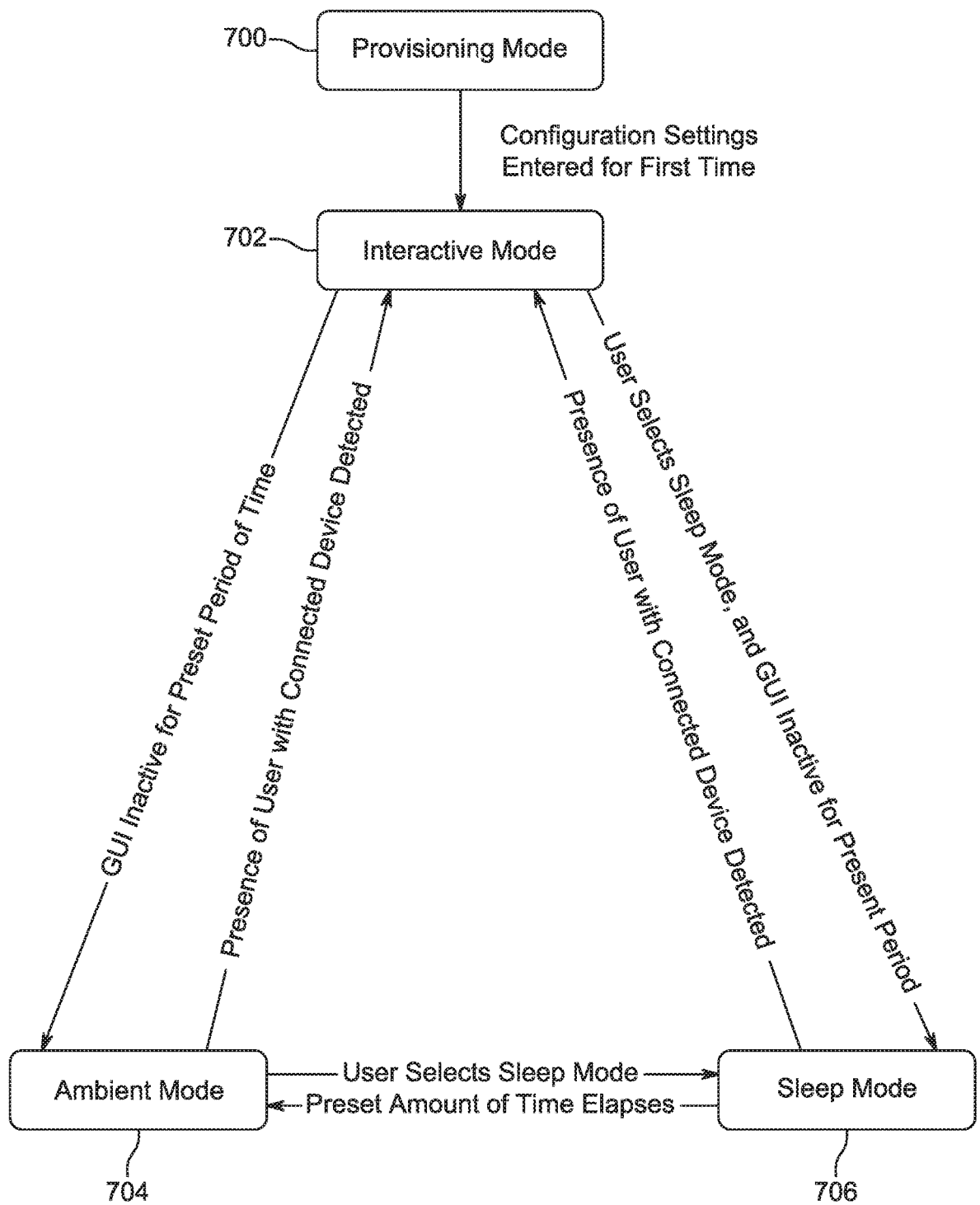
FIG. 7 is a state diagram of the four modes in which the graphical user interface operates.

Different versions of the GUI 126 are displayed by the display processor 130 via the GUI process 320 depending on several factors. FIG. 7 is a state diagram of the four modes in which the GUI 126 operates: provisioning mode 700, interactive mode 702, ambient mode 704, and sleep mode 706.

When the user first plugs in the premises networking device 100 to a power source, the display processor 130 places the GUI 126 in a provisioning mode 700. While the GUI 126 is in provisioning mode 700, a series of screens are displayed on the GUI 126 that communicate and receive data to and from the user related to the initial device and account configuration settings of the premises networking device 100.

After the initial configuration of the premises networking device 100, the display processor 130 places the GUI by default into an interactive mode 702.

While interactive mode 702 is activated, a series of screens are displayed that communicate and receive data to and from the user related to the ongoing maintenance of the network and the premises networking device 100 by the display processor 130.

When the GUI 126 is in either ambient mode 704 or sleep mode 706, interactive mode 702 is activated when a user, possibly with a connected user device 122, is determined to be in the proximity of the premises networking device 100 by the display processor 130.

Users are determined by the display processor 130 to be in the proximity of the premises networking device 100 in a number of different ways (or any combination thereof), including: the infrared sensor 116 detecting a user proximate to the device, the touchscreen being touched by the user, the microphone 132 detecting a user command or speech nearby, the Wi-Fi interface 108 detecting wireless signals from a new WiFi device proximate to the device, and/or the low-power communication interface 110 detecting wireless signals from a new low power device proximate to the device.

Generally, the display processor 130 concludes that a user is proximate to the device 100 when the user is closer than 5 meters or 3 meters or possibly even less than 1 meter from the premises networking device 100. Actions are taken based on this determination and the information (user proximity) is made available by the API to third party applications executing on the display processor.

In one example, the display processor 130 determines that a user is proximate to the premises networking device 100 when motion is detected by the infrared sensor 116 and/or a BLE signal from a connected user device 122 is detected with sufficient signal strength to indicate that the user is closer than 5 meters or 3 meters or possibly even less than 1 away. In some cases, the GUI 126 only transitions to interactive mode 702 if the BLE signals are from a recognized user device that has been previously paired with the networking device 100. In another example, the display processor 130 determines that a user is proximate to the premises networking device 100 when the GUI 126 is touched while the device is in ambient mode 704 or sleep mode 706. In another example, the display processor 130 determines that a user is proximate to the premises networking device 100 when components of a home security system (for example, motion detectors) that are connected to the premises networking device 100 indicate that a user is detected. Here, the display processor 130 monitoring these components concludes user proximity or not. In another example, a user is detected by a voice recognition process executing on the display processor 130 matching voice data received by the microphone 132 with previously stored voice data.

The display processor 130 switches the GUI 126 to ambient mode 704 from interactive mode 702 after a preset period of time or time-out period during which no input is received by the user. On the other hand, from sleep mode 706, ambient mode 704 is entered after a preset interval of time elapses regardless of whether input is received. In general, the ambient mode screen displays an animated, graphical depiction of the health of the entire network maintained by the premises networking device 100.

Sleep mode 706 is enabled by the user in the configuration settings. The user selects a start time at which sleep mode should activate and stop time at which it should deactivate. Within the selected window of time, whenever the display processor 130 would otherwise switch the GUI 126 to ambient mode 704, the display processor 130 instead switches the GUI 126 to sleep mode 706. During sleep mode, the screen is turned off, which avoids distracting light from the touchscreen 104.

FIGS. 8-31B show screens of the GUI 126 as generated by the GUI process 320 executing on the display processor 130.

Provisioning Mode

FIGS. 8-16 show screens that are displayed while the GUI 126 is in provisioning mode 700.

Figure 8:
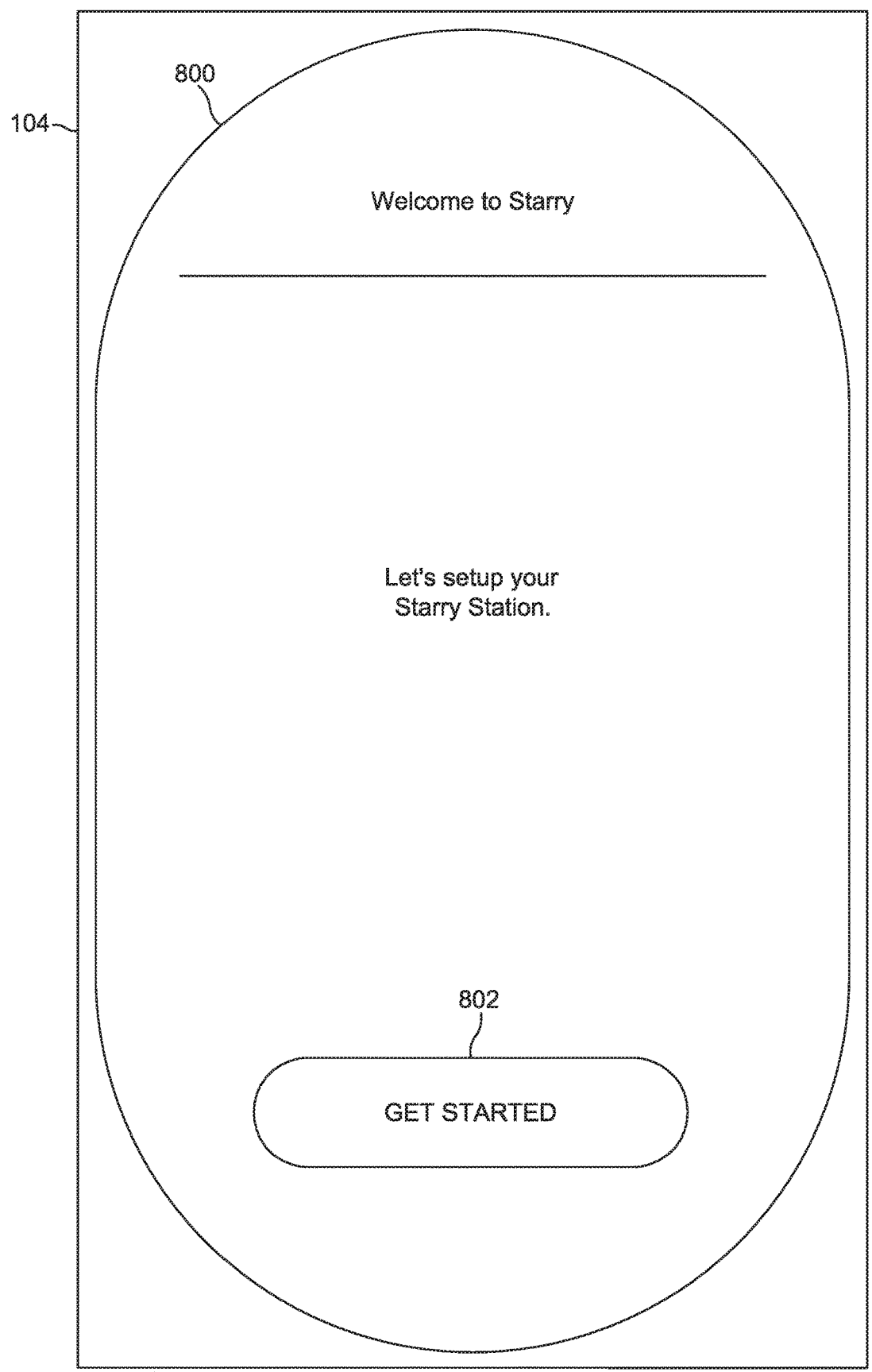
FIG. 8 shows a welcome screen of the graphical user interface generated by the display processor.

FIG. 8 shows a welcome screen 800, which contains welcome text. At the bottom of the welcome screen 800 is the "Get Started" button 802, which, when selected, advances to the next screen.

Figure 9A:
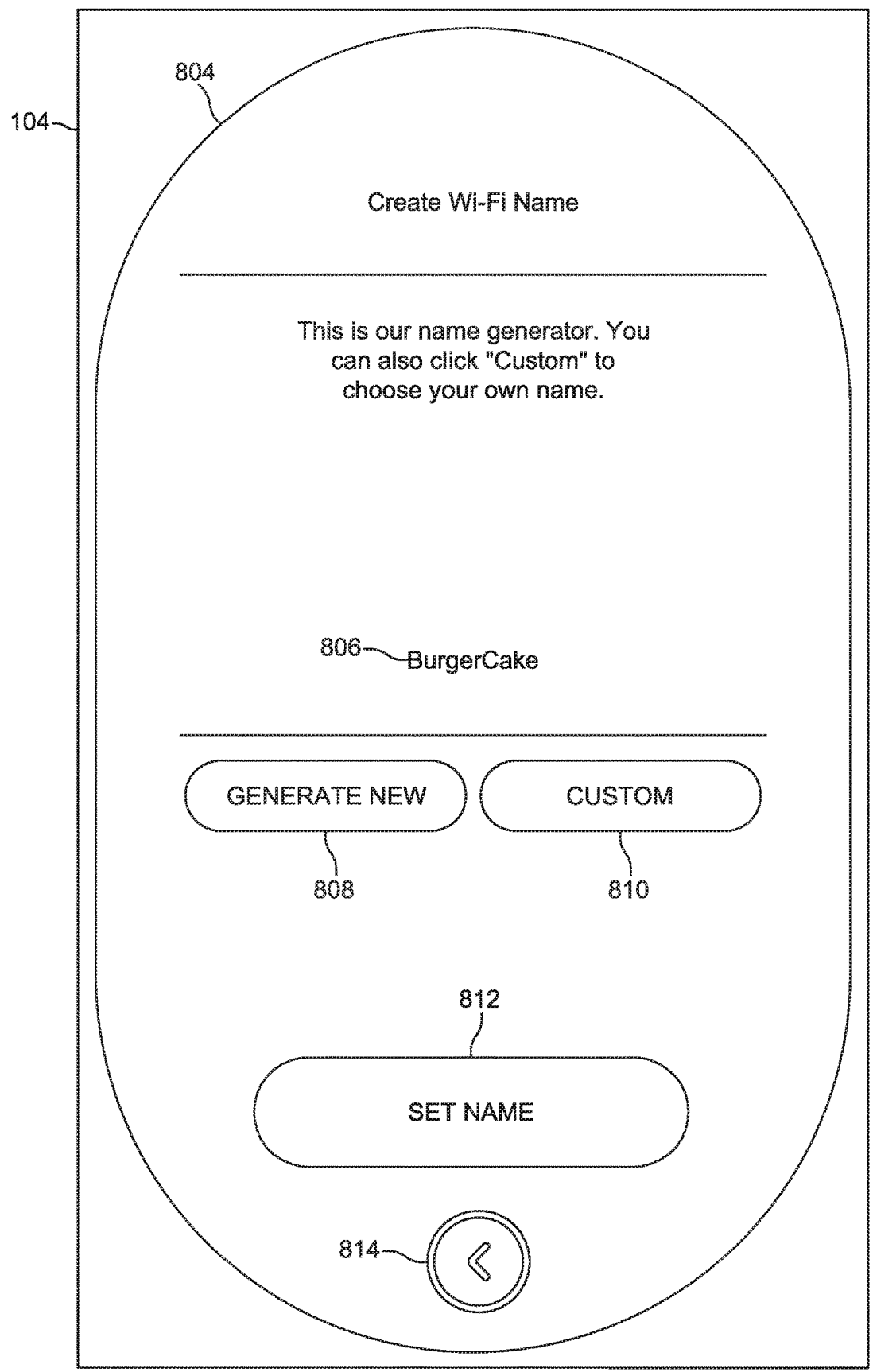
FIG. 9A shows a Wi-Fi name screen of the graphical user interface.

FIG. 9A shows a Wi-Fi name screen 804, which is displayed when the user selects the "Get Started" button 802 on the welcome screen 800. The screen includes a title and instructional text. Also included is a Wi-Fi name 806 that is randomly selected. The randomly selected Wi-Fi name 806 comprises two randomly selected words from conversational language combined into one compound word with the first letter of each individual word capitalized in the illustrated example.

In general, this screen is used to set the service set identifier (SSID) for the Wi-Fi network maintained by the premises networking device 100. This identifier is attached to the header of packets sent over the wireless local-area network (WLAN).

Below the Wi-Fi name 806 are the "Generate New" button 808 and the "Custom" button 810. At the bottom of the screen is the "Set Name" button 812 and a back button 814. When selected, the "Generate New" button 808 generates and displays a different randomly selected Wi-Fi name 806. The "Custom" button 810 advances to a new screen that allows the user to enter a custom Wi-Fi name. The "Set Name" button 812, when selected, accepts the currently displayed Wi-Fi name 806 and advances to a new screen. The back button 814 returns to the previous screen.

Figure 9B:
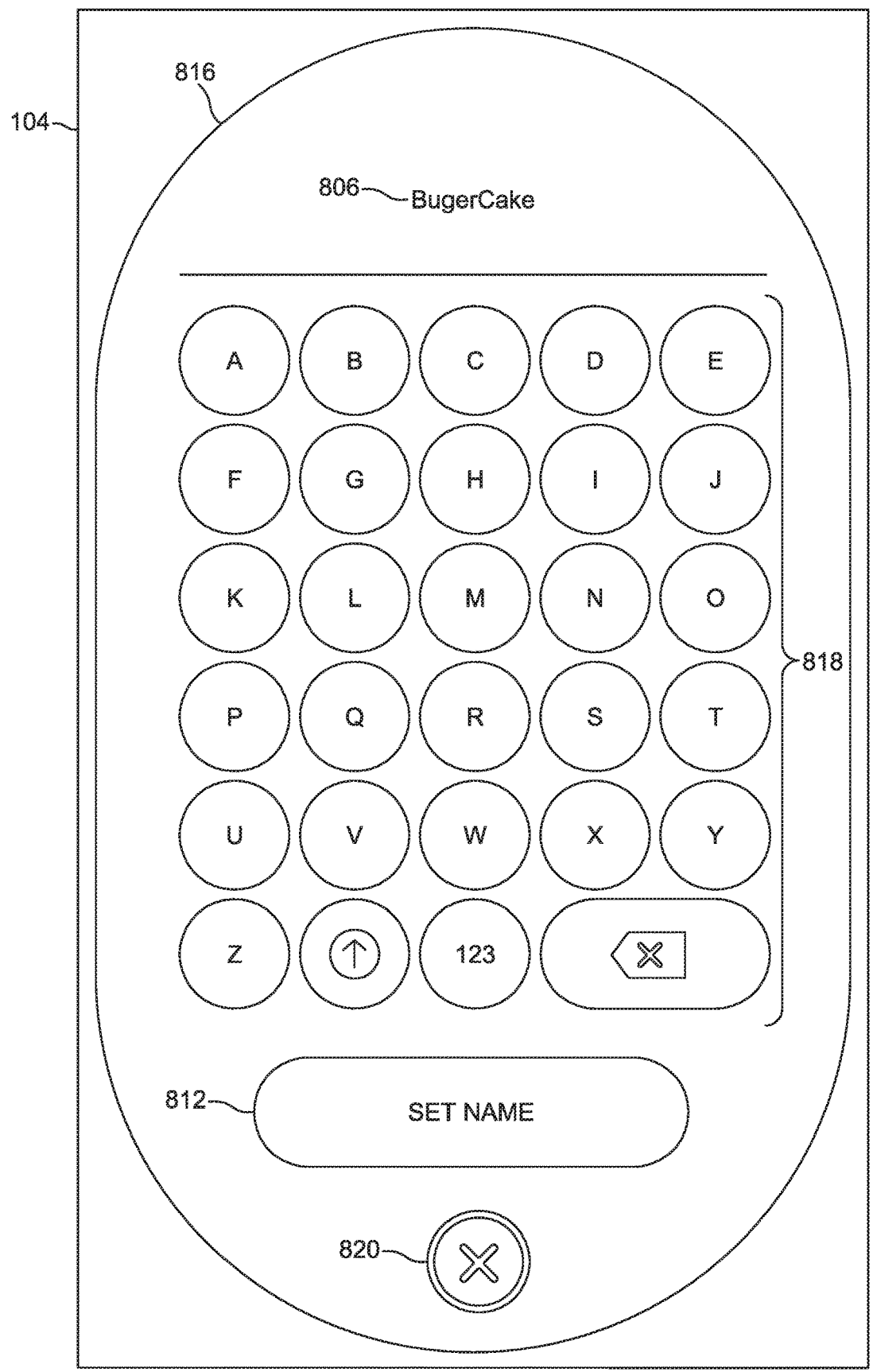
FIG. 9B shows an input Wi-Fi name screen of the graphical user interface.

FIG. 9B shows an input Wi-Fi name screen 816, which is displayed when the user selects the "Custom" button 810 on the Wi-Fi name screen 804. The screen includes a Wi-Fi name 806, which can be edited with a virtual touchscreen keyboard 818 that is displayed below the name. Below the keyboard 818 is a "Set Name" button 812 and a cancel button 820, which, when selected returns to the Wi-Fi name screen 804.

Figure 9C:
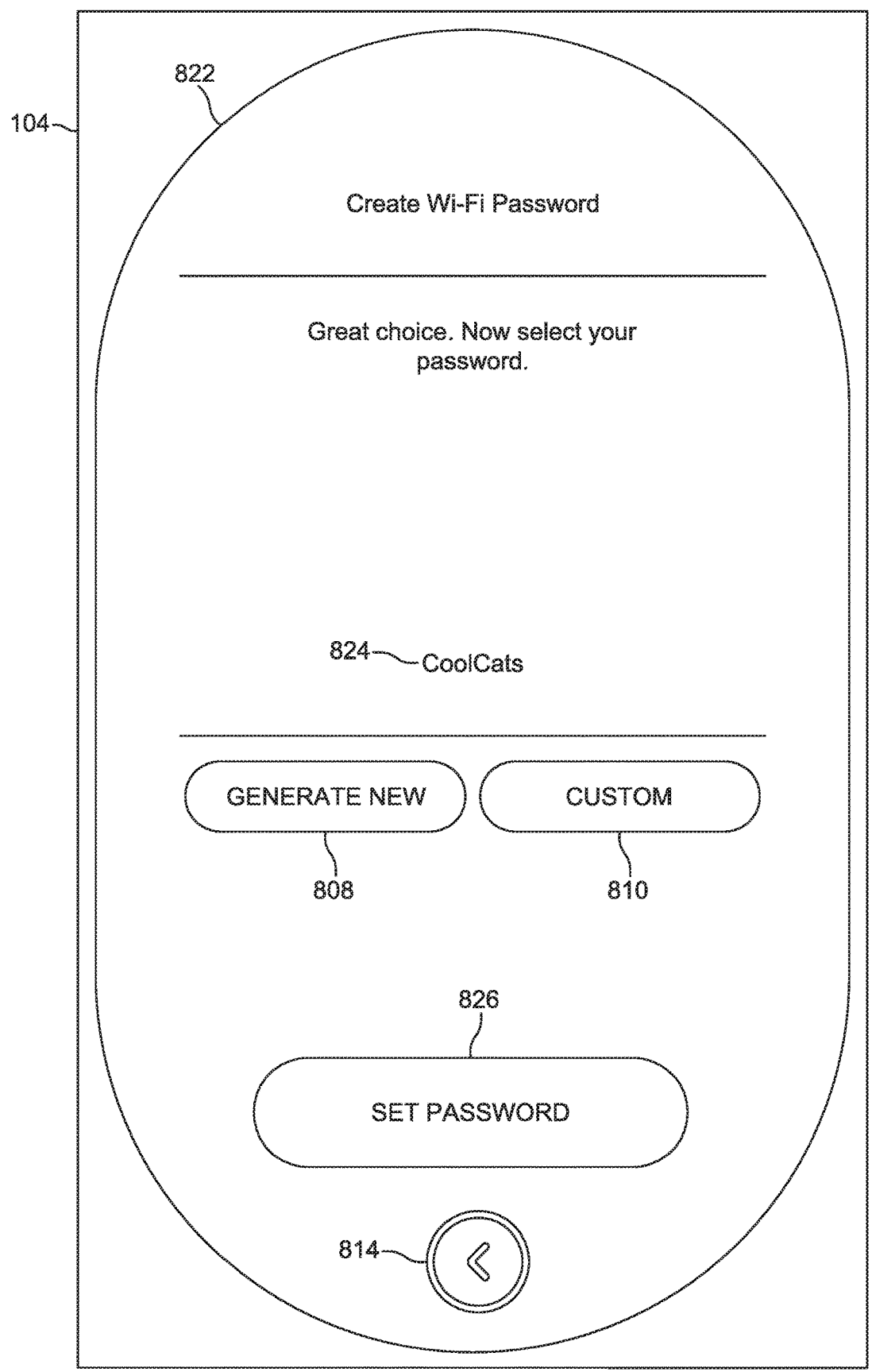
FIG. 9C shows a Wi-Fi password screen of the graphical user interface.

FIG. 9C shows a Wi-Fi password screen 822, which is displayed when the user selects the "Set Name" button on either the Wi-Fi name screen 804 or the input Wi-Fi name screen 816. The screen includes a title and instructional text. Also included is a Wi-Fi password 824 that is randomly selected using the same method as that used to select the Wi-Fi name 806 on the Wi-Fi name screen 804. Also included are the "Generate New" button 808, the "Custom" button 810, the back button 814, and a "Set Password" button 826, which when selected, accepts the currently displayed Wi-Fi password 824 and advances to the next screen.

Figure 9D:
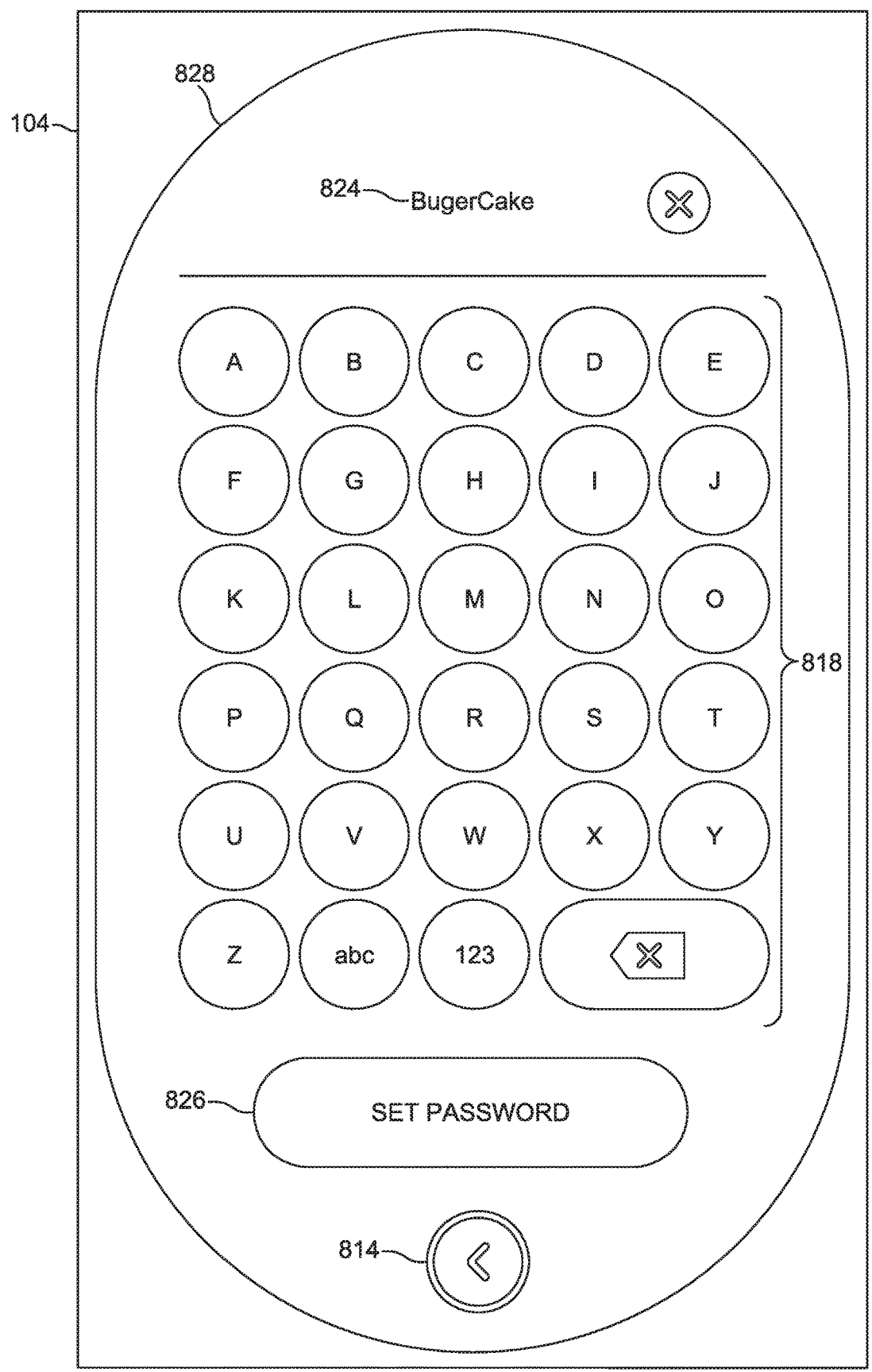
FIG. 9D shows an input Wi-Fi password screen of the graphical user interface.

FIG. 9D shows an input Wi-Fi password screen 828, which is displayed when the user selects the "Custom" button 810 on the Wi-Fi password screen 822. The screen includes a Wi-Fi password 824, which can be edited with a virtual keyboard 818. Also included are a "Set Password" button 826 and a back button 814.

Figure 10A:
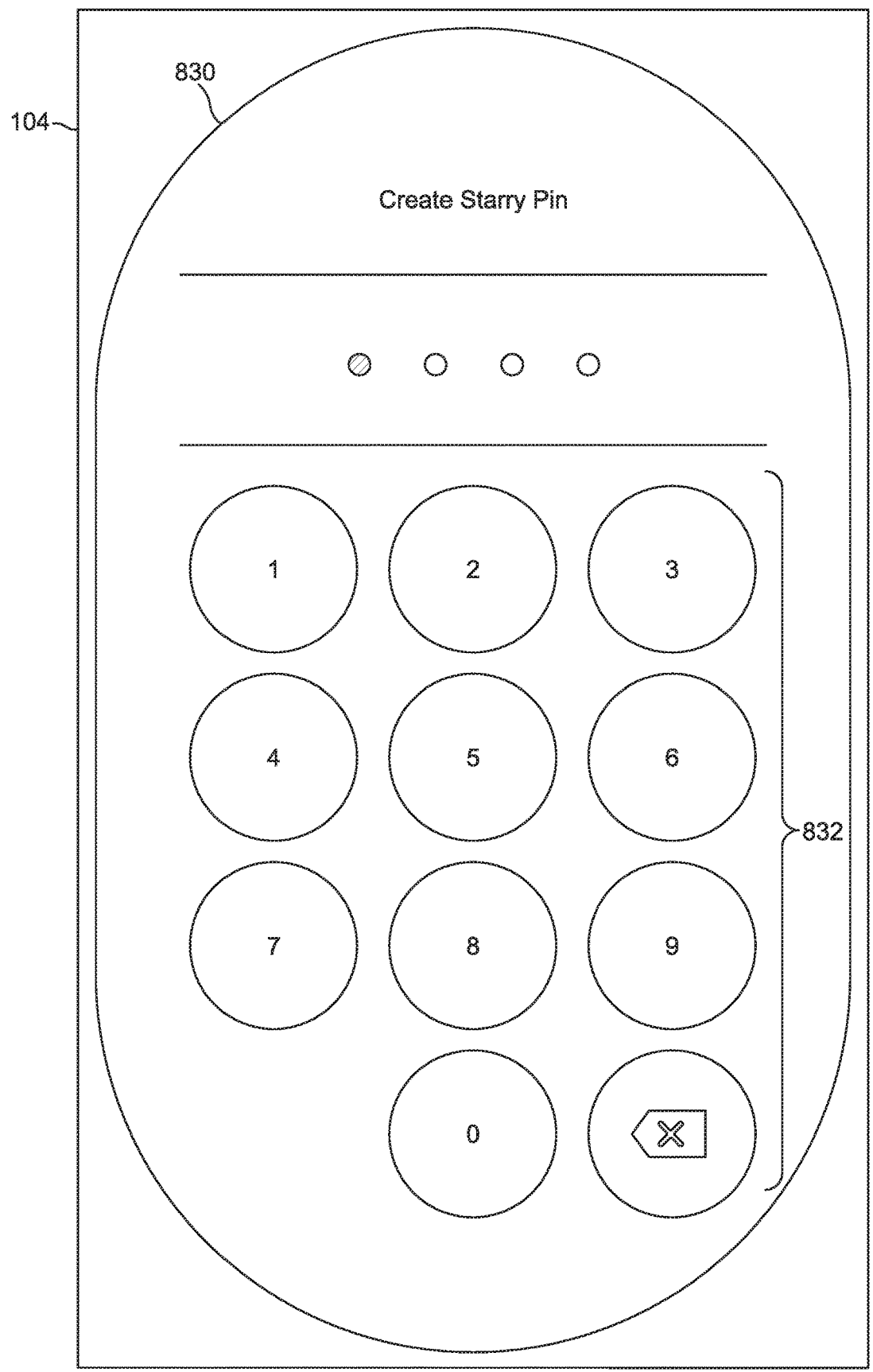
FIG. 10A shows a create PIN screen of the graphical user interface.

FIG. 10A shows a create PIN screen 830, which is displayed when the user selects the "Set Password" button on either the Wi-Fi password screen 822 or the input Wi-Fi password screen 828. The screen includes a virtual number pad 832, which can be used by the user to input four numerical digits.

Figure 10B:
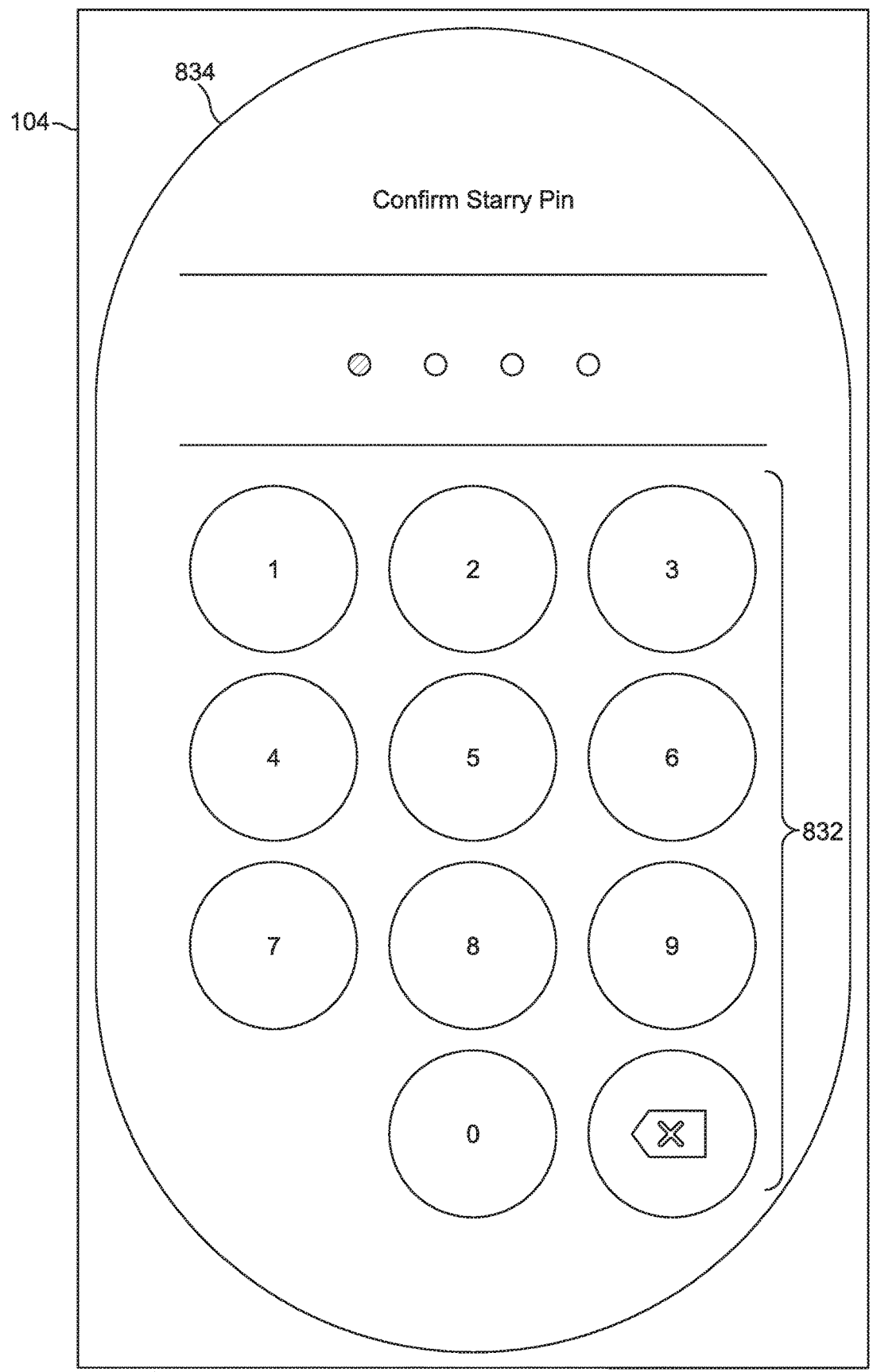
FIG. 10B shows a confirm PIN screen of the graphical user interface.

FIG. 10B shows a confirm PIN screen 834, which is displayed when the user inputs four numerical digits on the number pad 832 on the create PIN screen 830. The screen also includes a number pad 832, which can be used by the user to input four numerical digits.

Figure 11:
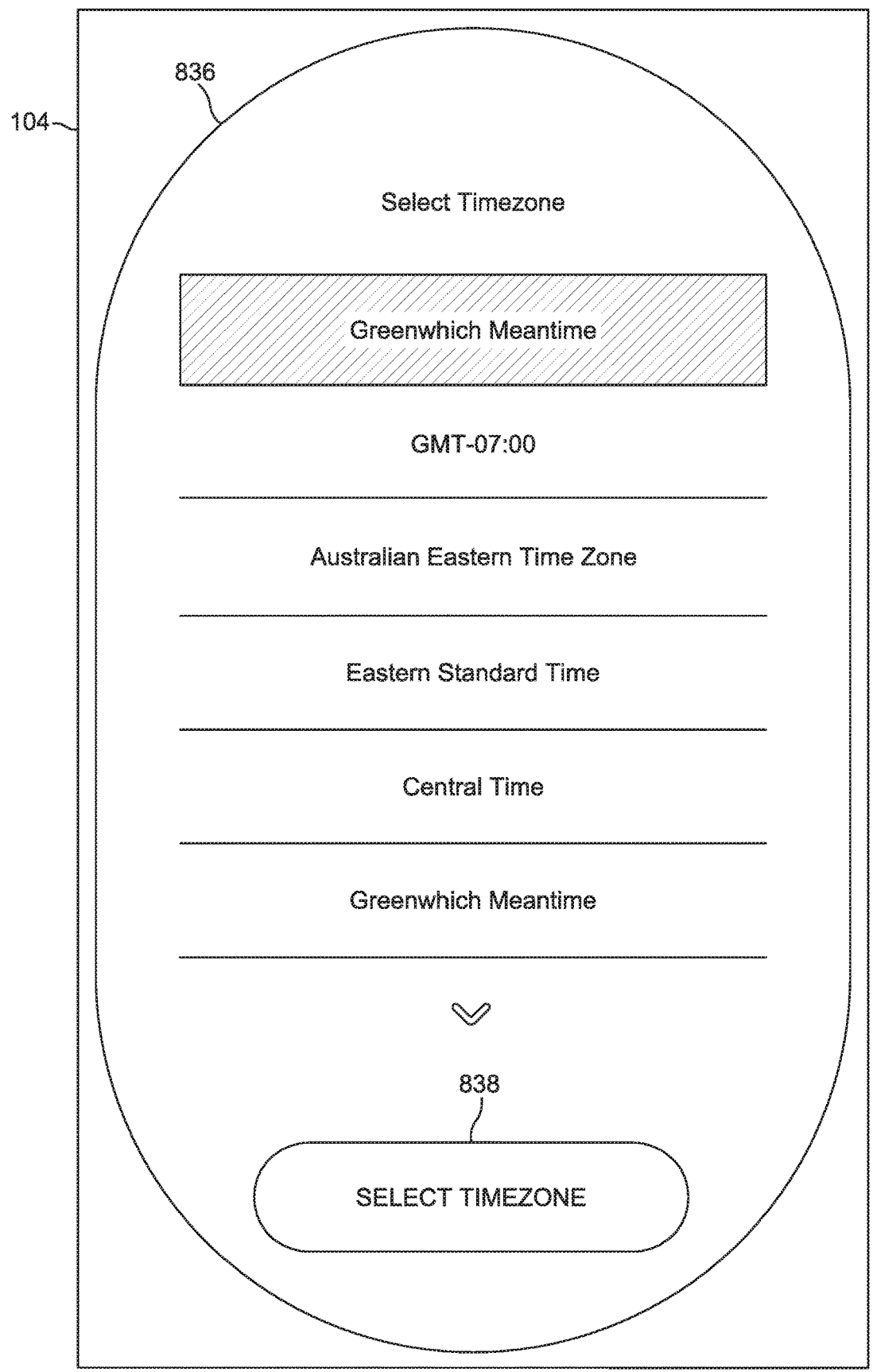
FIG. 11 shows a select timezone screen of the graphical user interface.

FIG. 11 shows a select timezone screen 836, which is displayed when the user inputs four numerical digits on the number pad 832 on the create PIN screen 830, and then inputs the same four numerical digits on the confirm PIN screen 834. The screen includes instructional text and a scrollable list of timezones that can be selected by the user. Also included is a "Select Timezone" button 838.

Figure 12A:
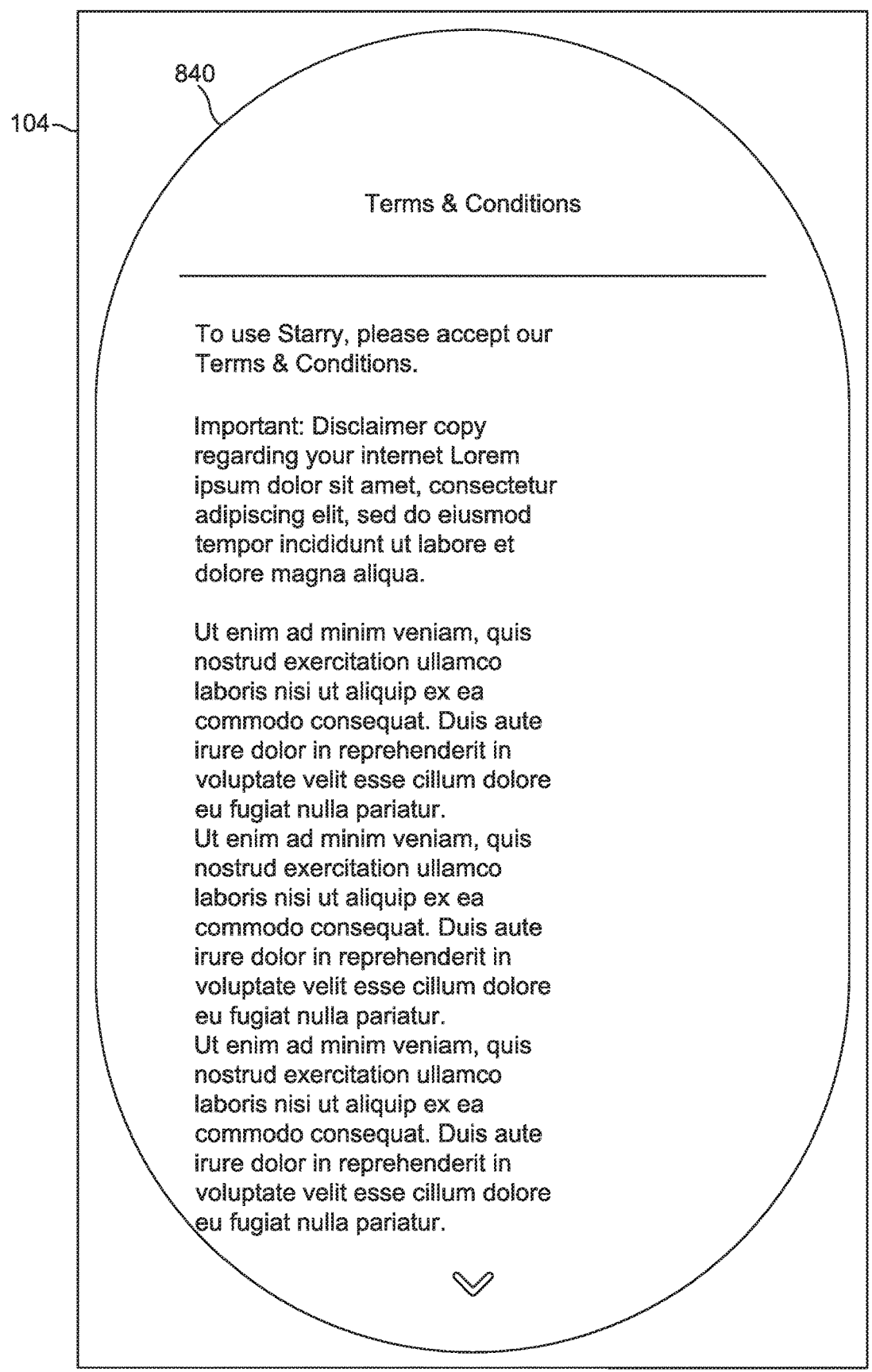
FIG. 12A shows the top portion of a terms and conditions screen of the graphical user interface.
Figure 12B:
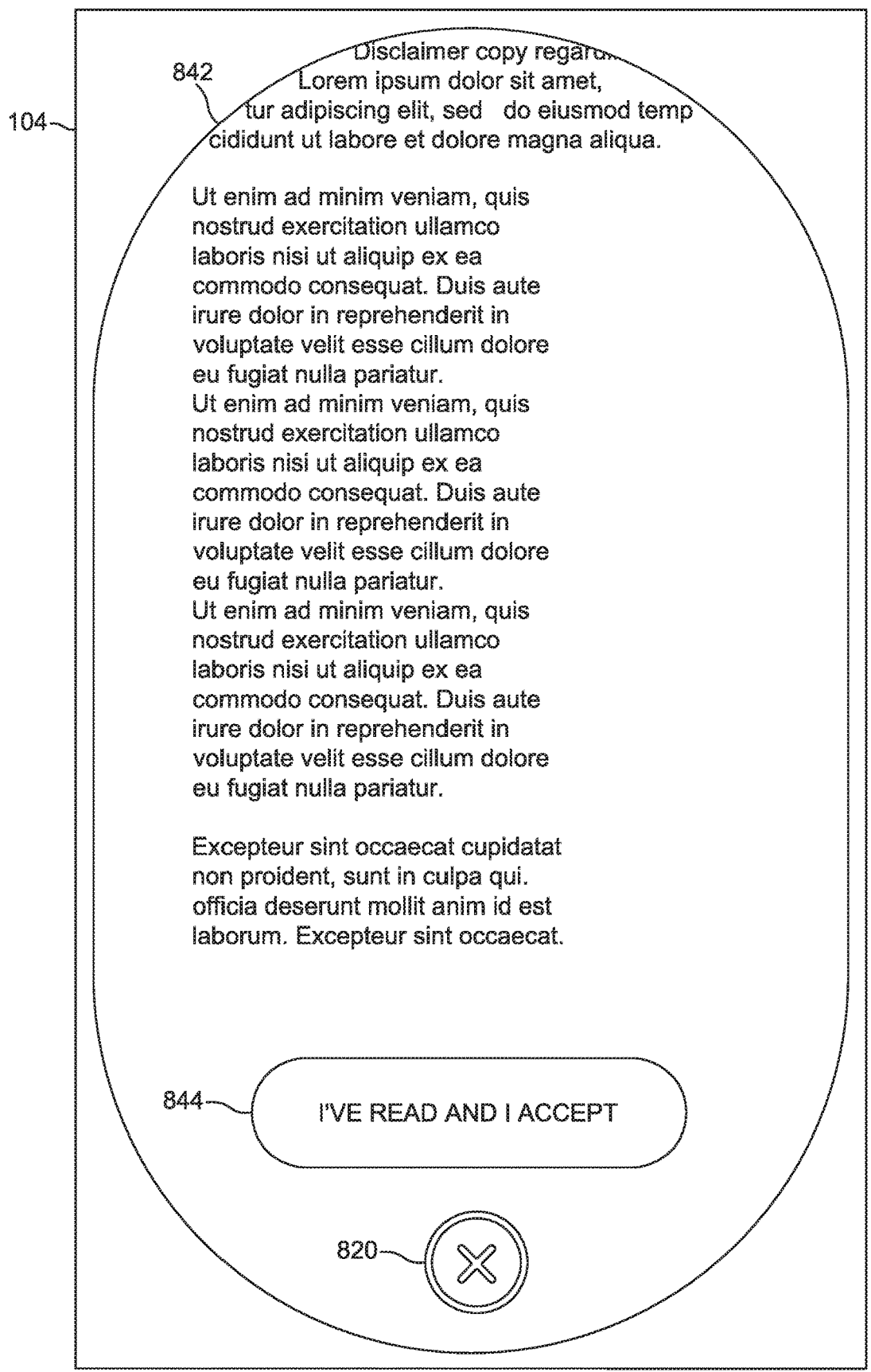
FIG. 12B shows the bottom portion of the terms and conditions screen of the graphical user interface.
Figure 13A:
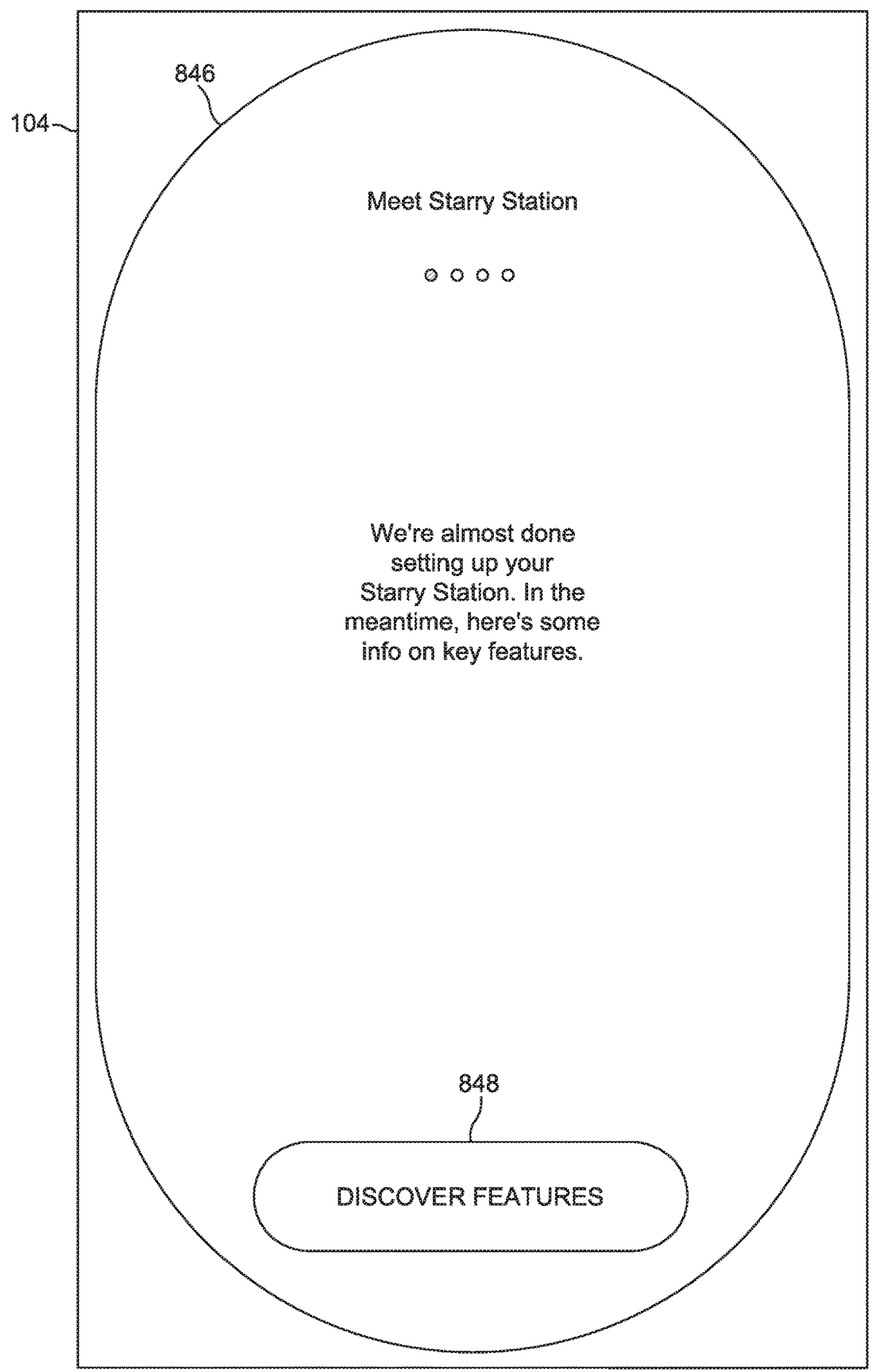
FIG. 13A shows a "Meet Starry Station" screen of the graphical user interface.
Figure 13B:
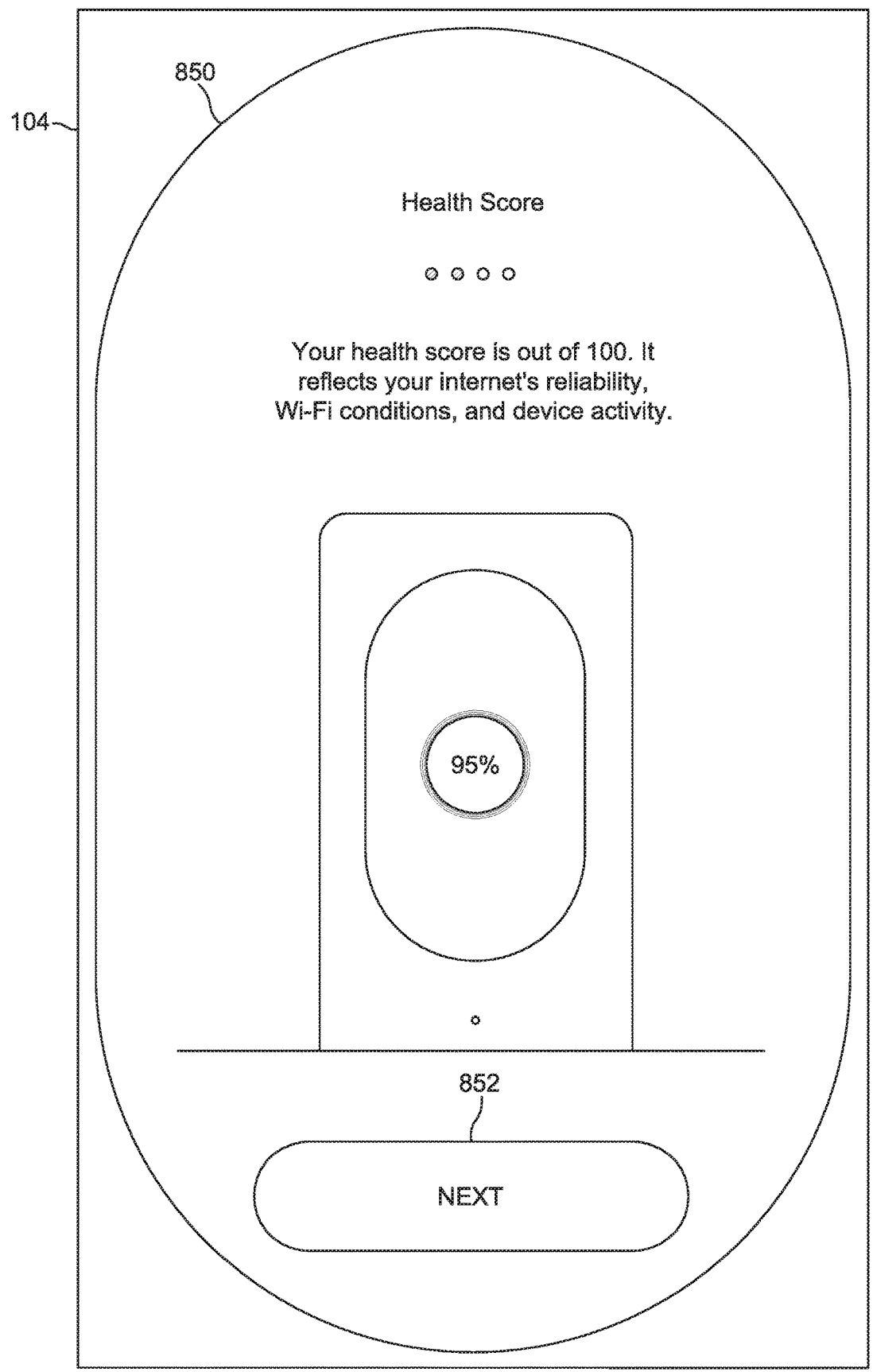
FIG. 13B shows a health score introductory screen of the graphical user interface.
Figure 13C:
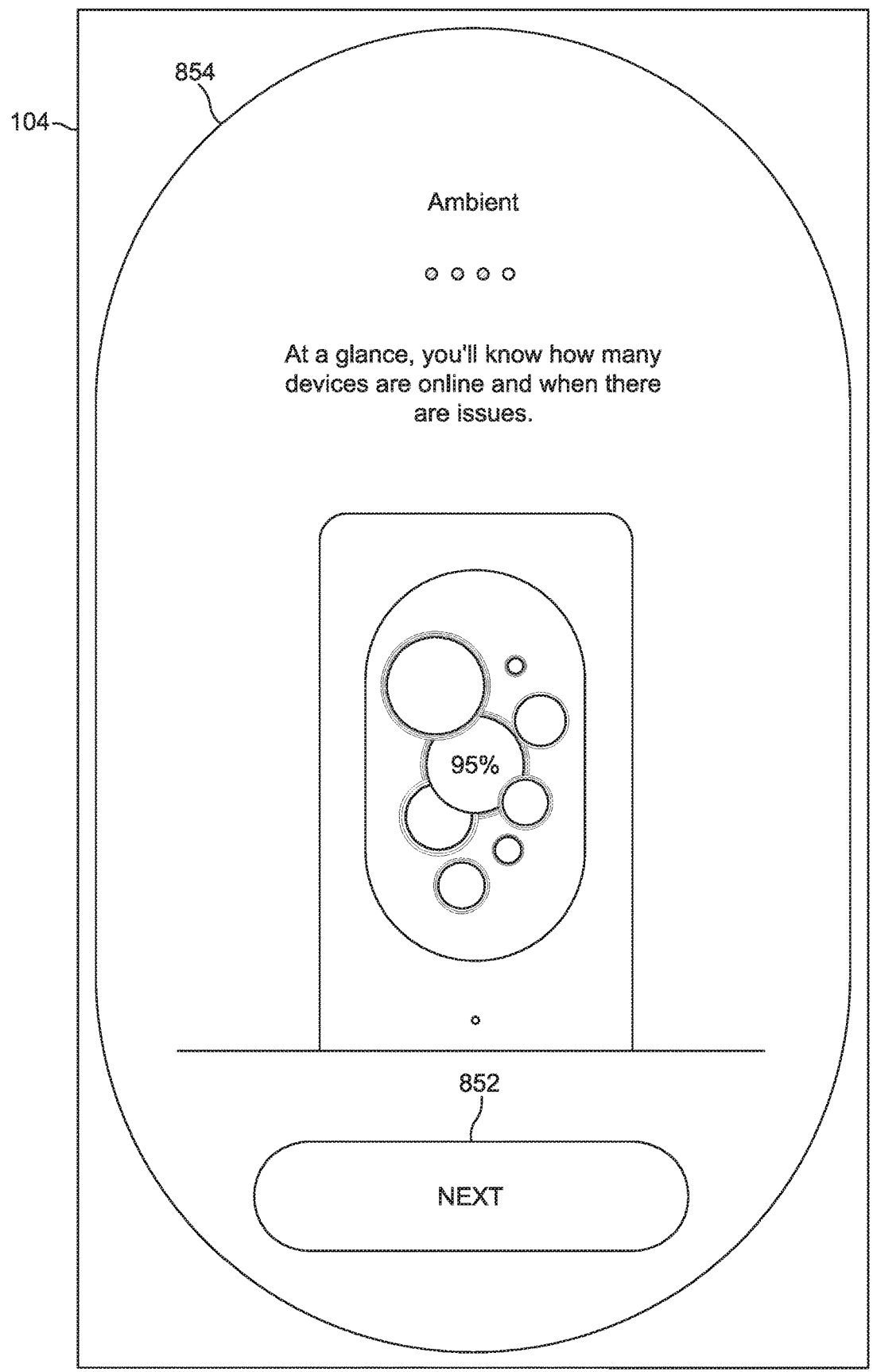
FIG. 13C shows an ambient introductory screen of the graphical user interface.
Figure 13D:
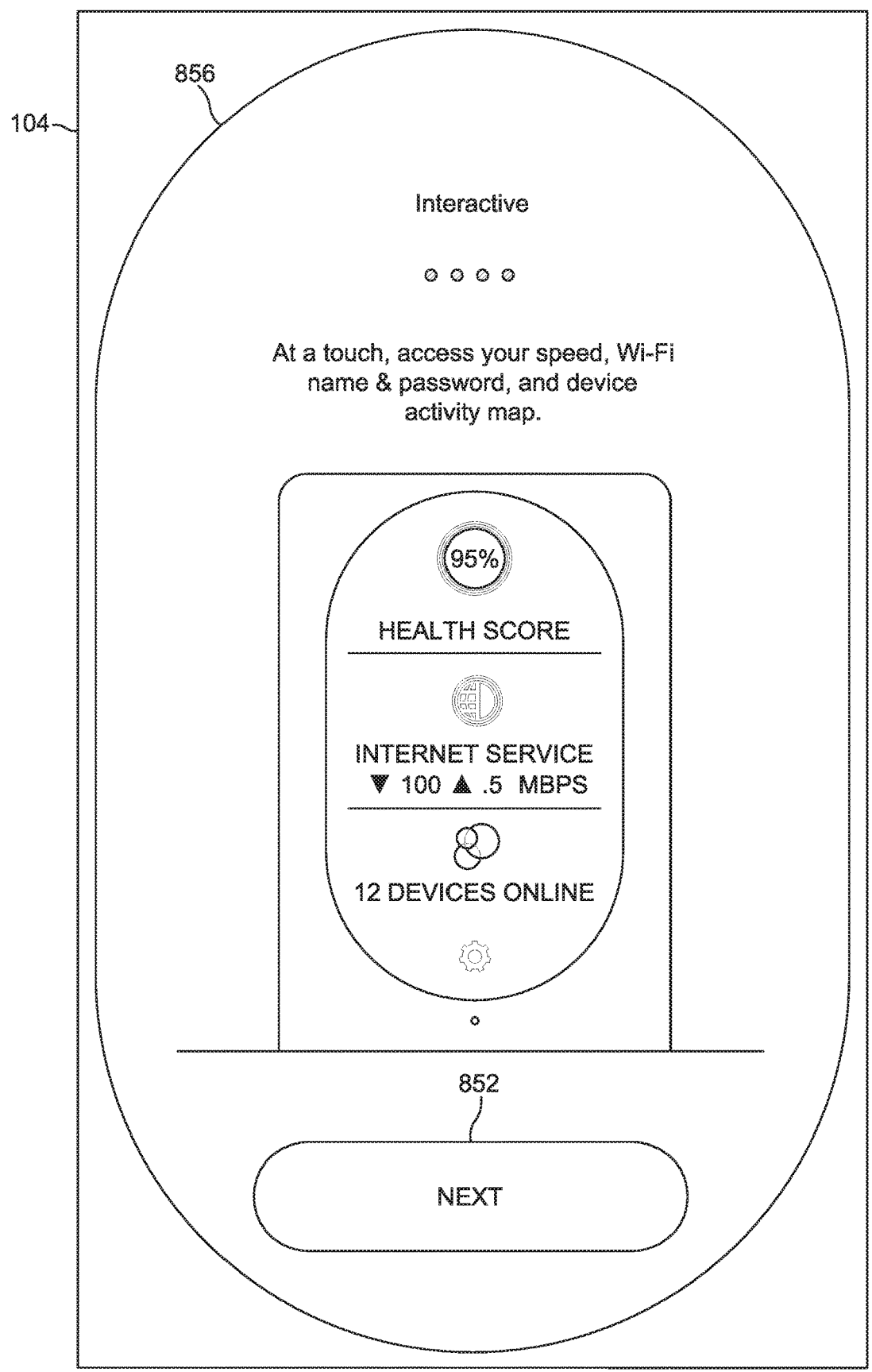
FIG. 13D shows an interactive introductory screen of the graphical user interface.

FIG. 12A shows the top portion of a terms and conditions screen 840, which is displayed when the user selects the "Select Timezone" button 838 on the select timezone screen 836. The screen includes a title and scrollable text comprising the Terms and Conditions to which the user must agree to continue using the premises networking device 100. FIG. 12B shows the bottom portion of the terms and conditions screen 842, which is displayed when the user scrolls to the bottom of the Terms and Conditions text on the top portion of the terms and conditions screen 840. Below the Terms and Conditions text is an "I've read and I Accept" button 844 and a cancel button 820.

FIGS. 13A-13D show a series of introductory screens, which are displayed when the user selects the "I've read and I accept" button 844 on the bottom portion of the terms and conditions screen 842. The introductory screens include information about the premises networking device 100. The "Meet Starry Station" screen 846 includes a "Discover Features" button 848. Each of the health score introductory screen 850, the ambient introductory screen 854, and the interactive introductory screen 856, include a next button 852, which, when selected, advances to the next screen.

Figure 14:
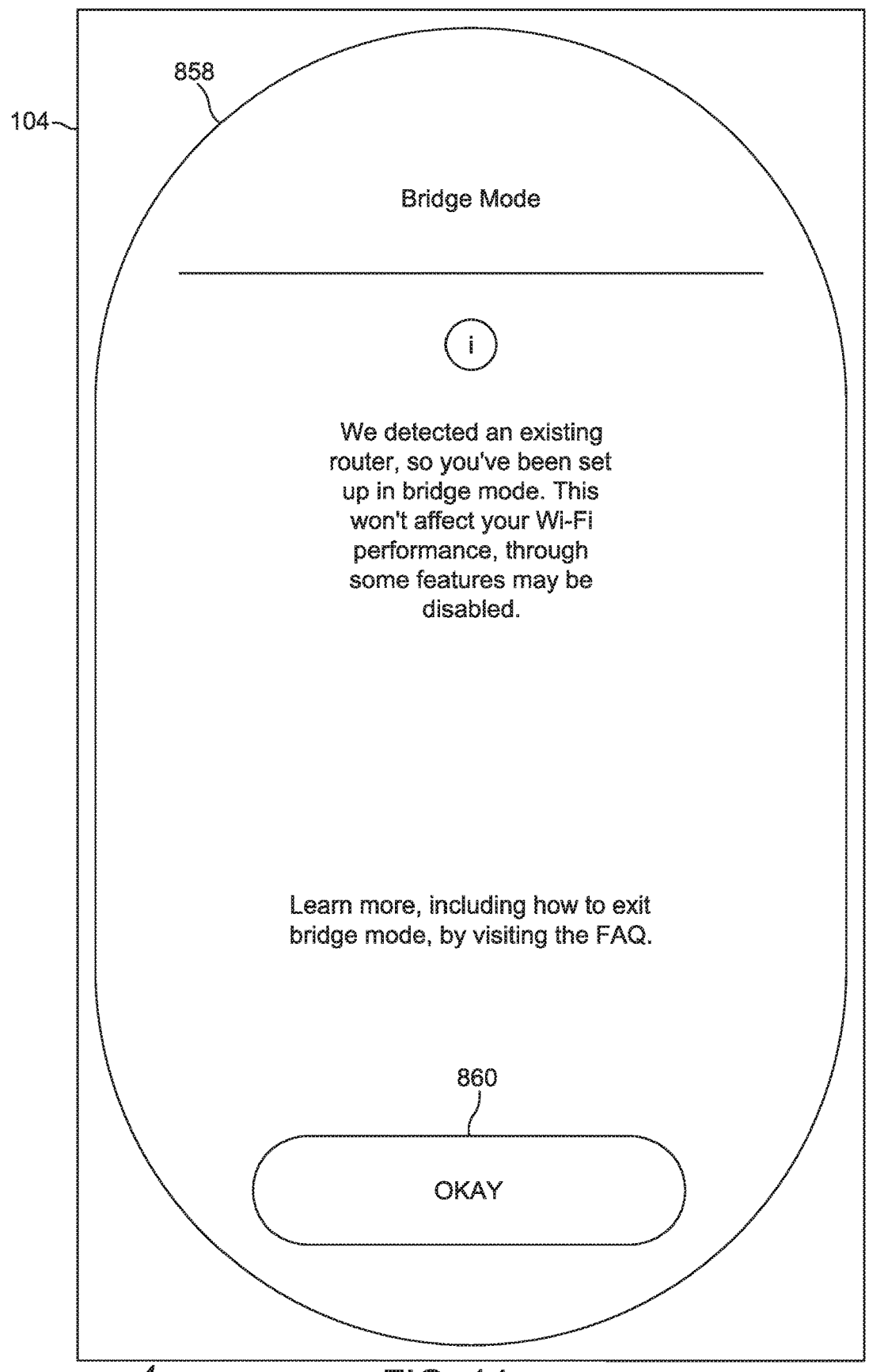
FIG. 14 shows a bridge mode screen of the graphical user interface.

FIG. 14 shows a bridge mode screen 858, which is displayed when the premises networking device 100 detects an existing router on the network, and when the user selects the next button 852 on the interactive introductory screen 856. The screen includes a title and explanatory text regarding bridge mode. Also included is an "Okay" button 860, which, when selected, advances to the next screen.

Figure 15:
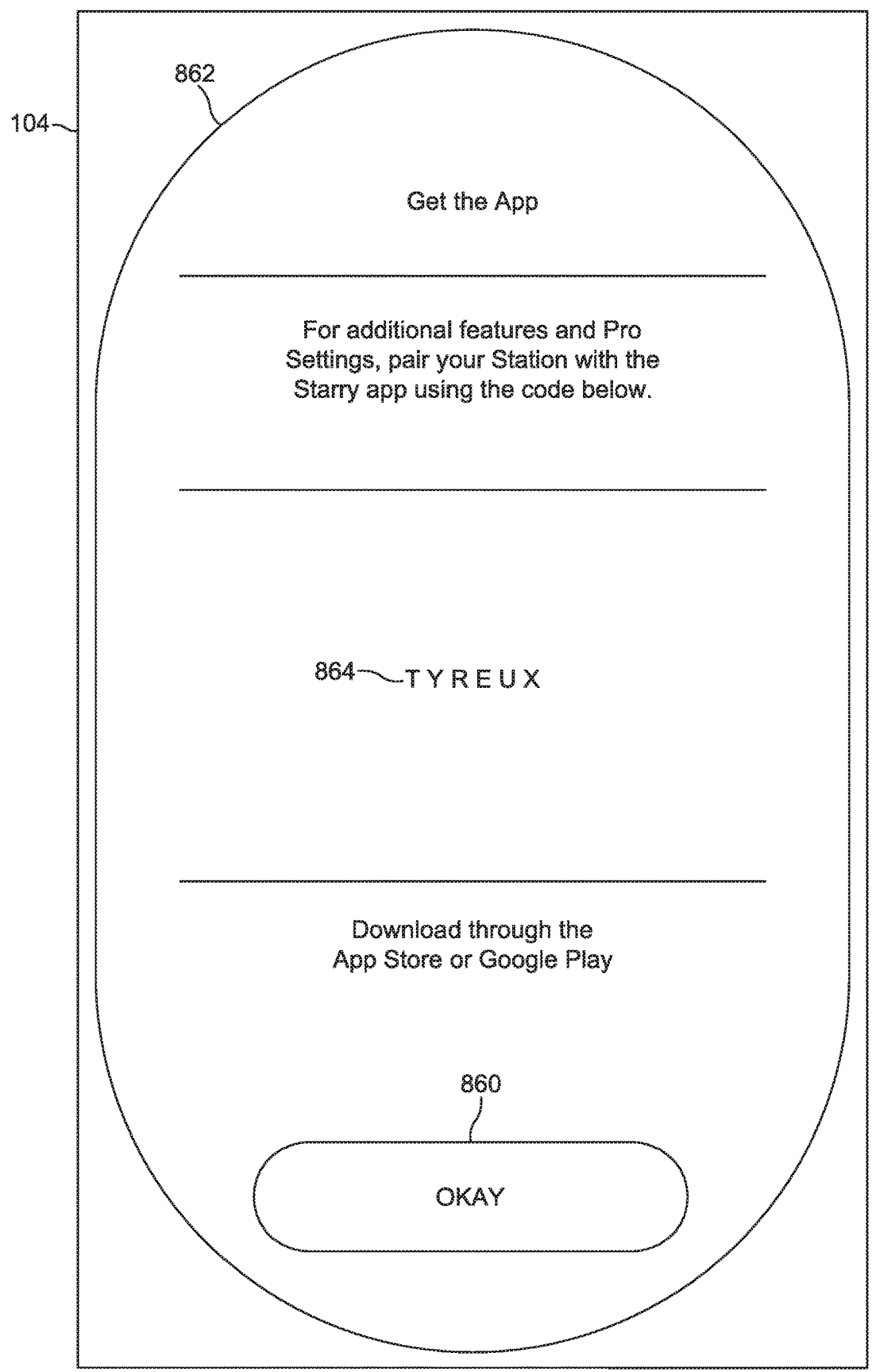
FIG. 15 shows an initial application pairing screen of the graphical user interface.

FIG. 15 shows an initial application pairing screen 862, which is displayed when the user selects either the next button 852 on the interactive introductory screen 856, or the "Okay" button 860 on the bridge mode screen 858. The screen includes a title and instructional text. Also included is a randomly selected pairing key 864 and an "Okay" button 860. The pairing key 864 can be input by the user into a user device 122 running a configuration application 124, allowing the user to use the configuration application 124 to change the configuration settings of the premises networking device 100.

Figure 16:
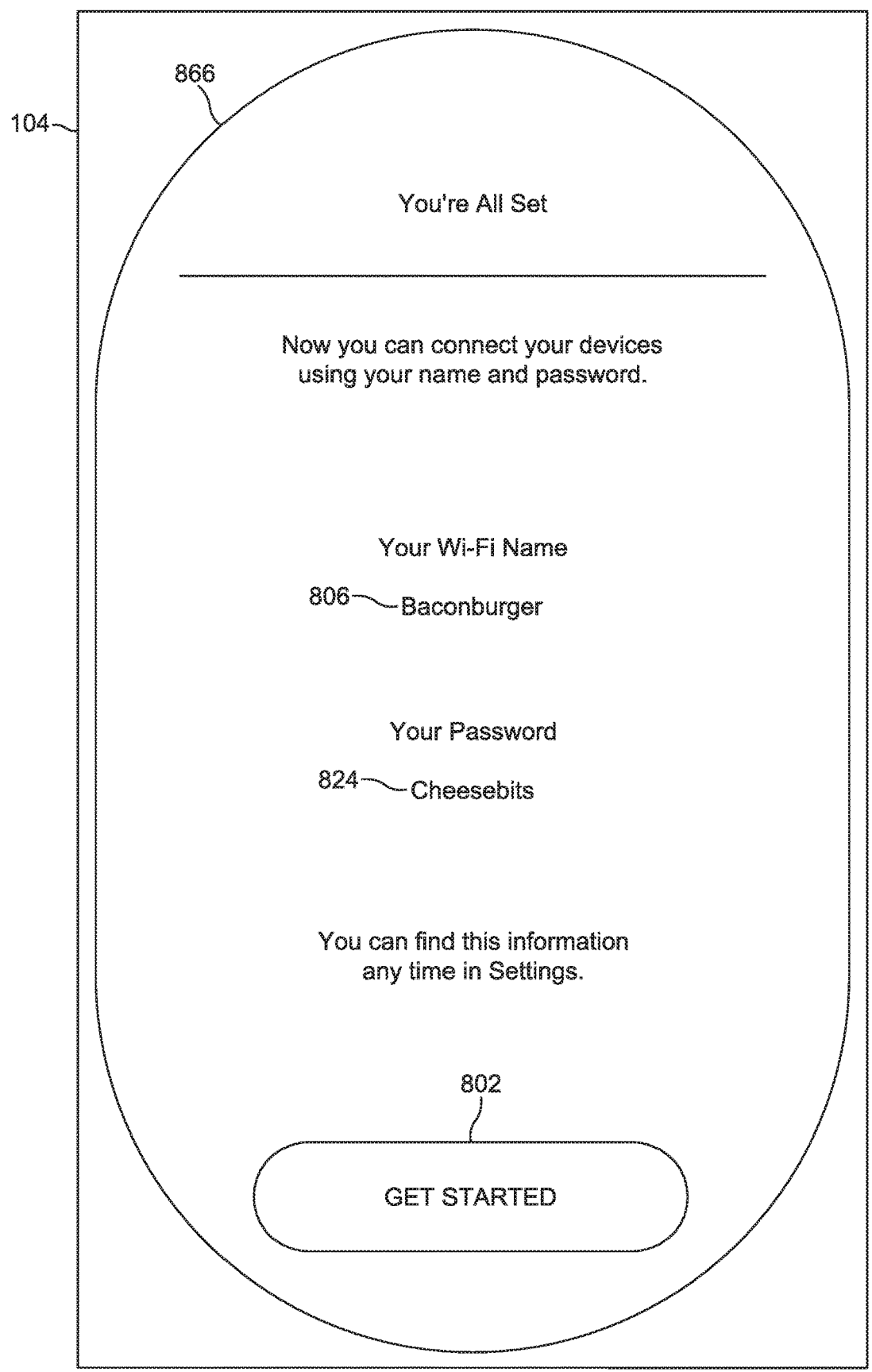
FIG. 16 shows a configuration summary screen of the graphical user interface.

FIG. 16 shows a configuration summary screen 866, which is displayed when the user selects the "Okay" button 860 on the initial application pairing screen 862. The screen includes a title and instructional text. Also included is the Wi-Fi name 806 and Wi-Fi password 824 selected by the user on the Wi-Fi name screen 804 and Wi-Fi password screen 822. Also included is a "Get Started" button 802.

Interactive Mode

Figure 17:
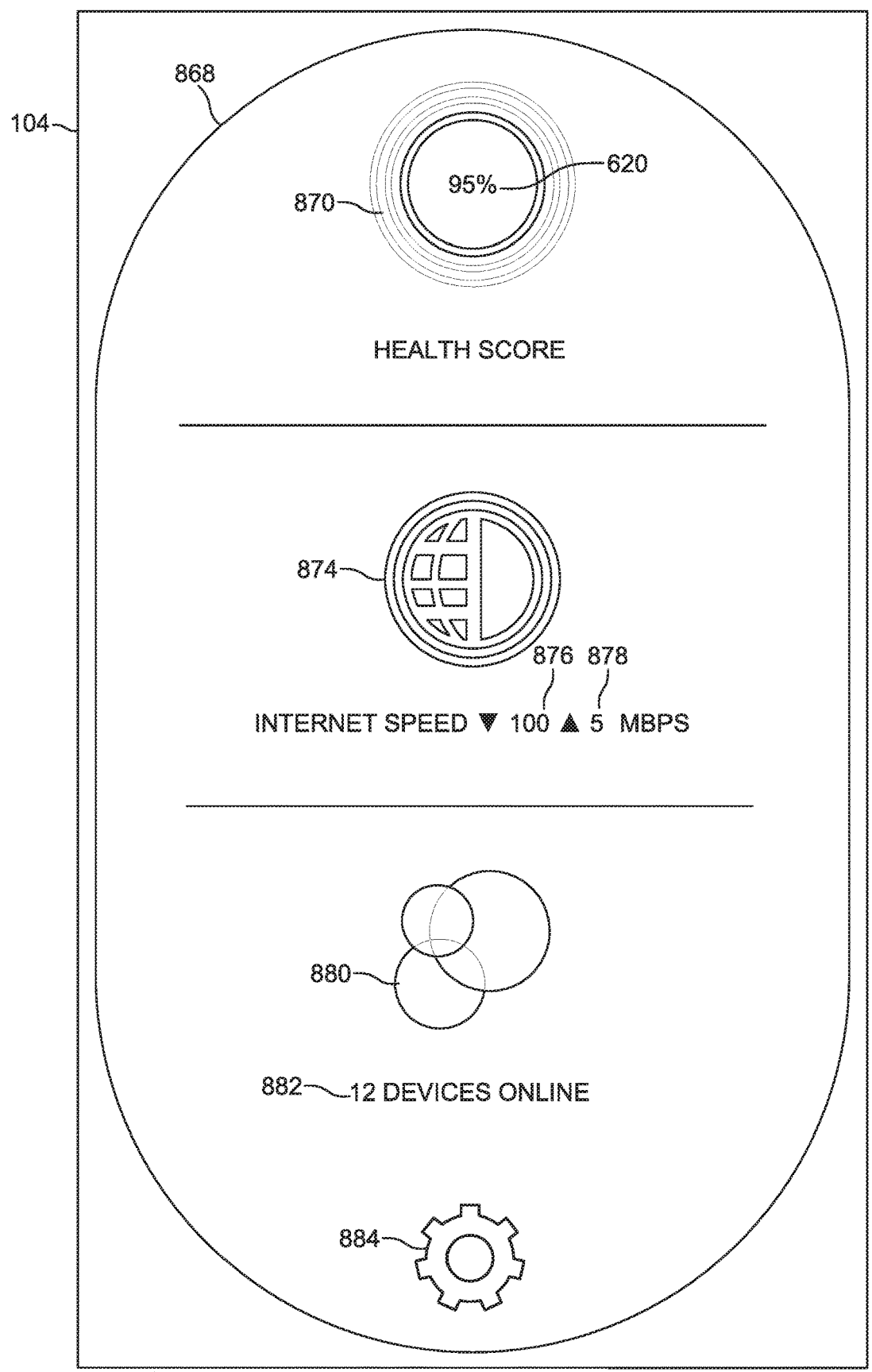
FIG. 17 shows an initial menu screen of the graphical user interface.

FIG. 17 shows an initial menu screen 868, which is displayed when the user selects the "Get Started" button 802 on the configuration summary screen 866. This represents the transition from the provisioning mode 700 to the interactive mode 702 by the GUI process 320 executing on the display processor 130.

The initial menu screen 868 is divided into three display regions. The first display region includes the "Health Score" button 870, which comprises a graphic and text, the text including a real time calculated health score 620. The second display region includes the "Internet Speed" button 874, which comprises a graphic and text, the text including the available download speed 876 and available upload speed 878. On this screen, the text of the "Internet Speed" button 874 includes the generic text "Internet Speed," which indicates that an internet service provider has not yet been confirmed by the user. The third display region includes the devices button 880, which comprises a graphic and text, the text including the current number of connected devices 882. Also included on the initial menu screen 868 is the settings button 884.

Figure 18A:
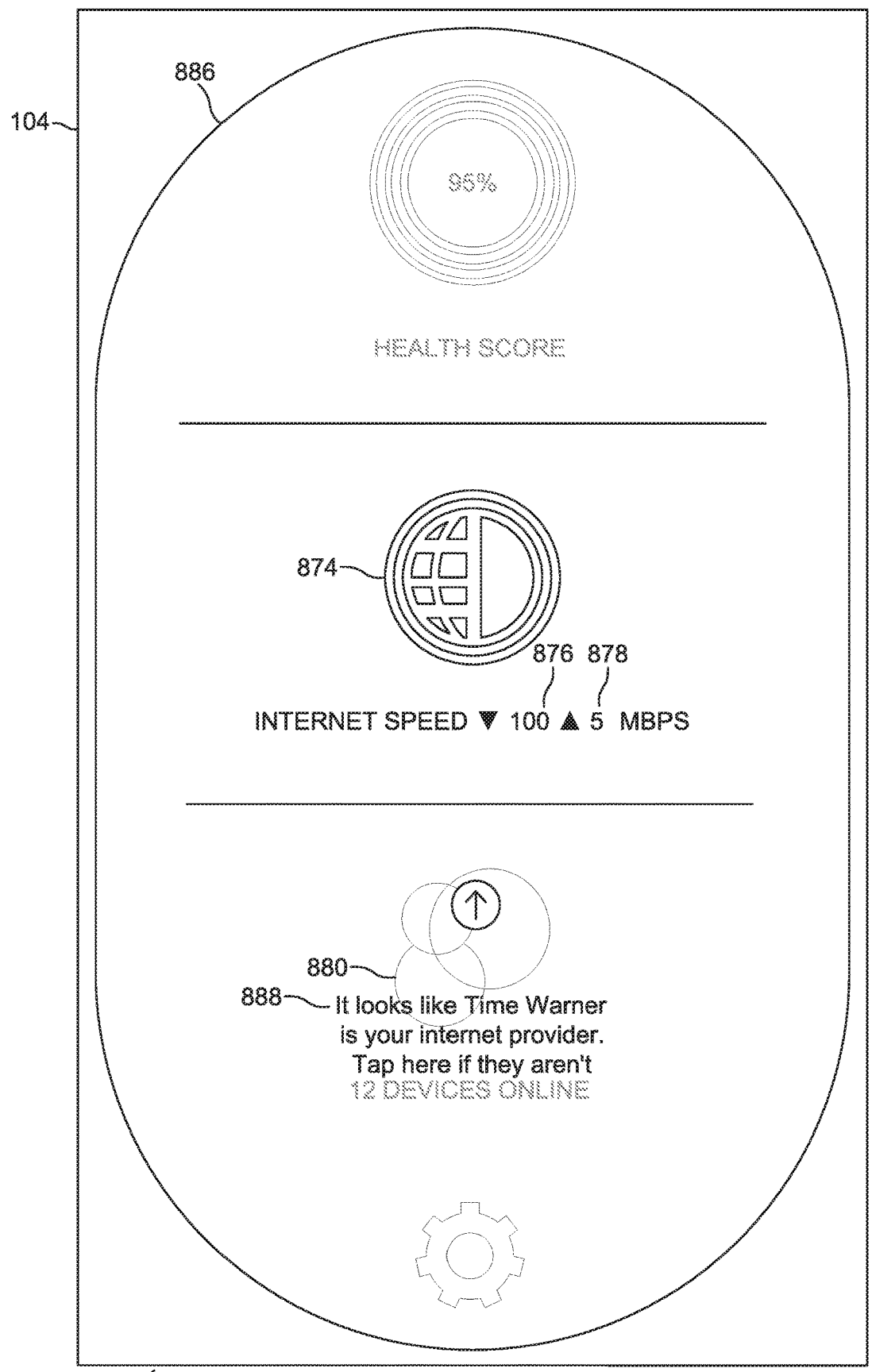
FIG. 18A shows an internet service provider identification screen of the graphical user interface.

FIG. 18A shows an internet service provider identification screen 886, which is displayed when the user selects the "Internet Speed" button 874 on the initial menu screen 868, before having selected the internet service provider. The screen is divided into two display regions. The first display region includes an "Internet Speed" button 874. The second display region includes a change internet service provider button 888, which comprises instructional text and a graphic.

Figure 18B:
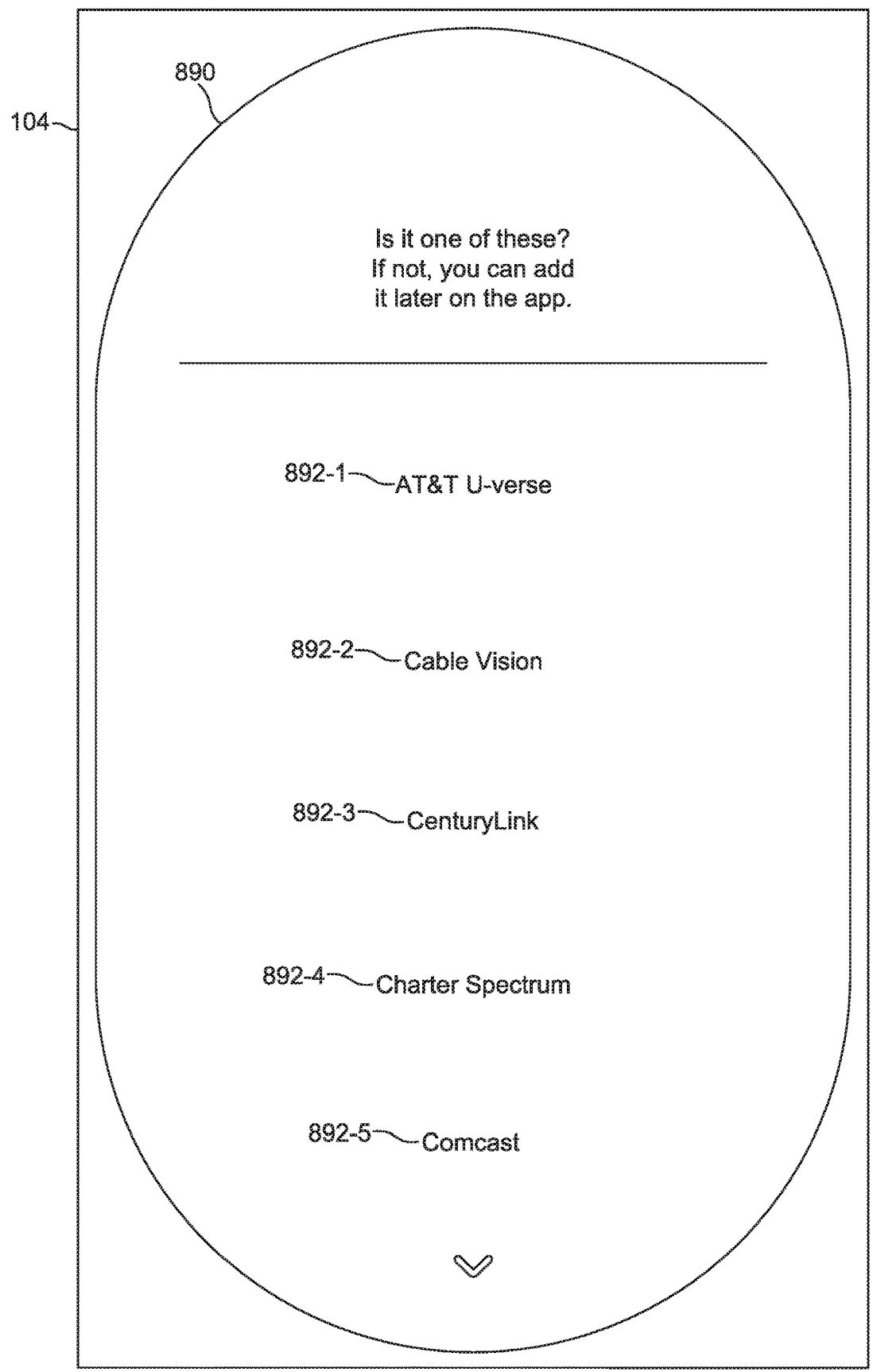
FIG. 18B shows an internet service provider selection screen of the graphical user interface.

FIG. 18B shows an internet service provider selection screen 890, which is displayed when the user selects the change internet service provider button 888 on the internet service provider identification screen 886. The screen includes a scrollable list of internet service providers 892. The name of each internet service provider 892 comprises a virtual button that can be selected by the user.

FIGS. 19-28G show additional screens that are displayed while the GUI 126 is in interactive mode 702.

Figure 19:
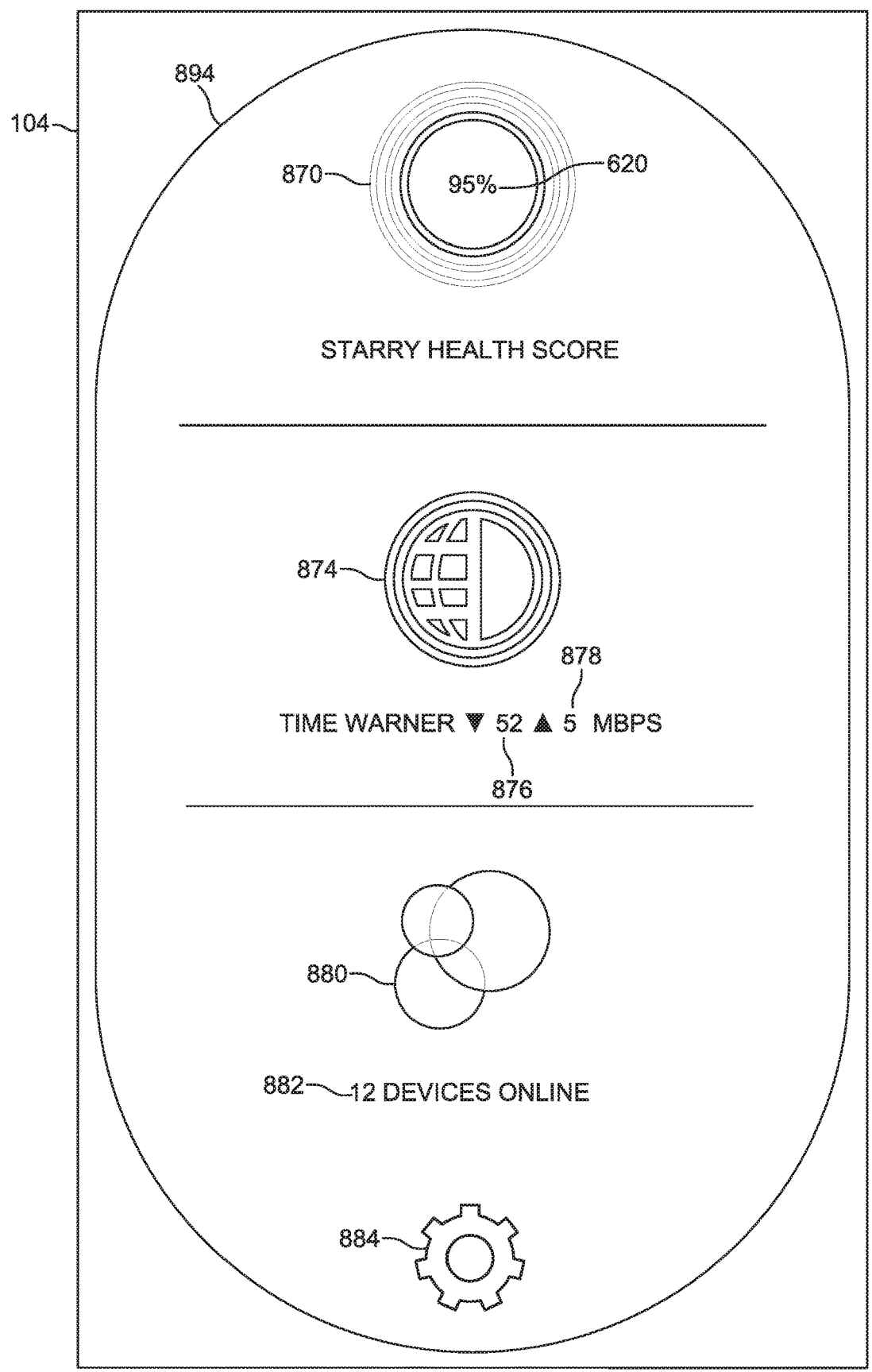
FIG. 19 shows an interactive mode screen of the graphical user interface.

FIG. 19 shows an interactive mode screen 894 that is displayed after the user has either confirmed the selection of the internet service provider on the internet service provider identification screen 886 or selected an internet service provider on the internet service provider selection screen 890. Like the initial menu screen 868, the interactive mode screen 894 is divided into three display regions and includes the "Health Score" button 870, the "Internet Speed" button 874, the devices button 880, and the settings button 884. The text associated with the "Internet Speed" button 874 on the interactive mode screen 894 displays the name of the internet service provider instead of the generic text "Internet Speed."

Figure 20A:
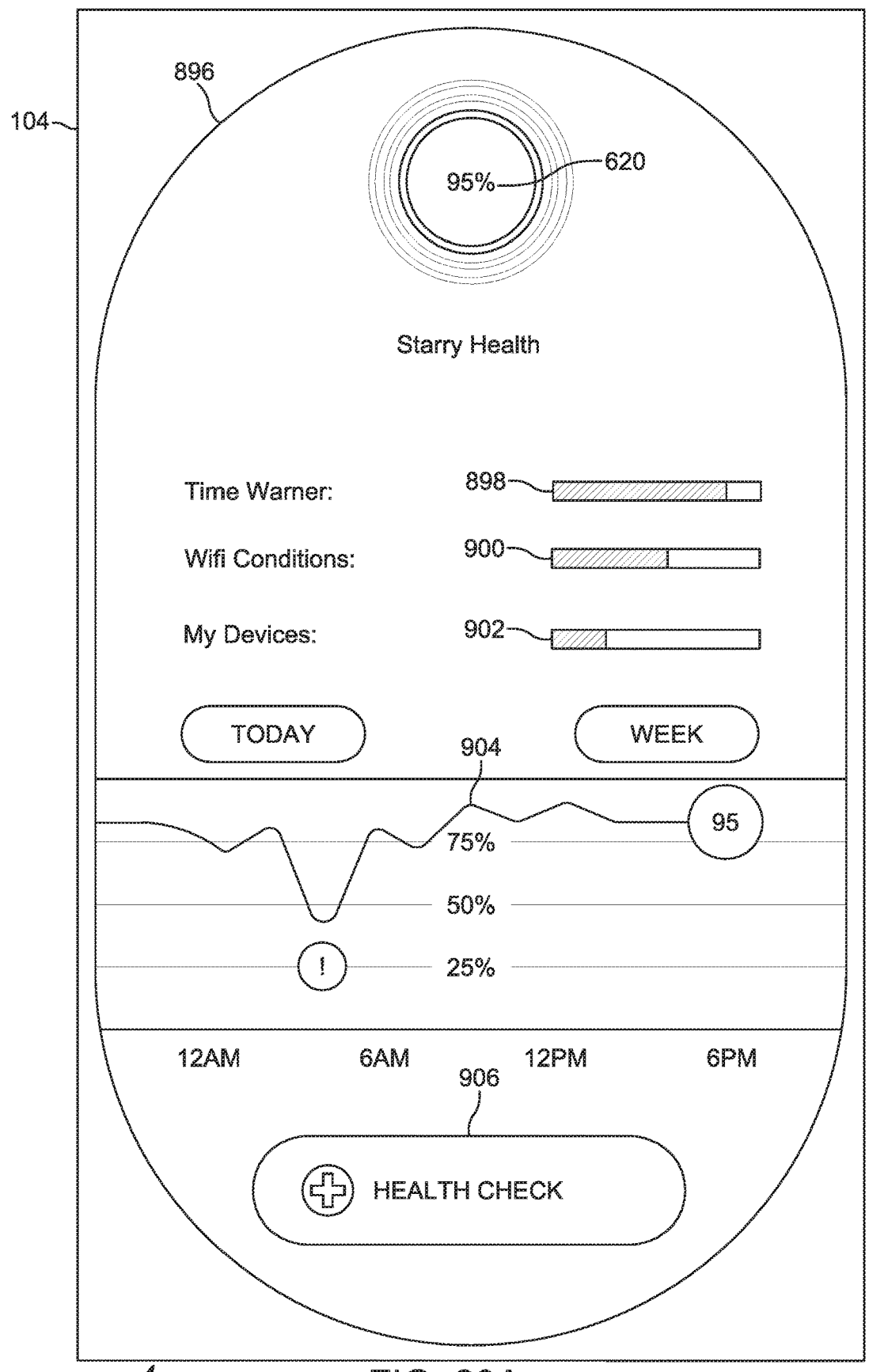
FIG. 20A shows a health screen of the graphical user interface.

FIG. 20A shows a health screen 896, which is displayed when the user selects the "Health Score" button 870 on either the initial menu screen 868 or the interactive mode screen 894. The screen includes the health score 620 and a title. The internet service provider health indicator 898 is a graphical depiction of the strength of the connection between the premises networking device 100 and the internet service provider. The Wi-Fi conditions health indicator 900 is a graphical depiction of the strength of the radio signal for the WLAN channel currently in use by the premises networking device 100. The devices health indicator 902 is a graphical depiction of the strength of the connection between the user devices 122 and the premises networking device 100. Also included is a chart of the health score 620 over the course of the previous day or the previous week, and a "Health Check" button 906.

Figure 20B:
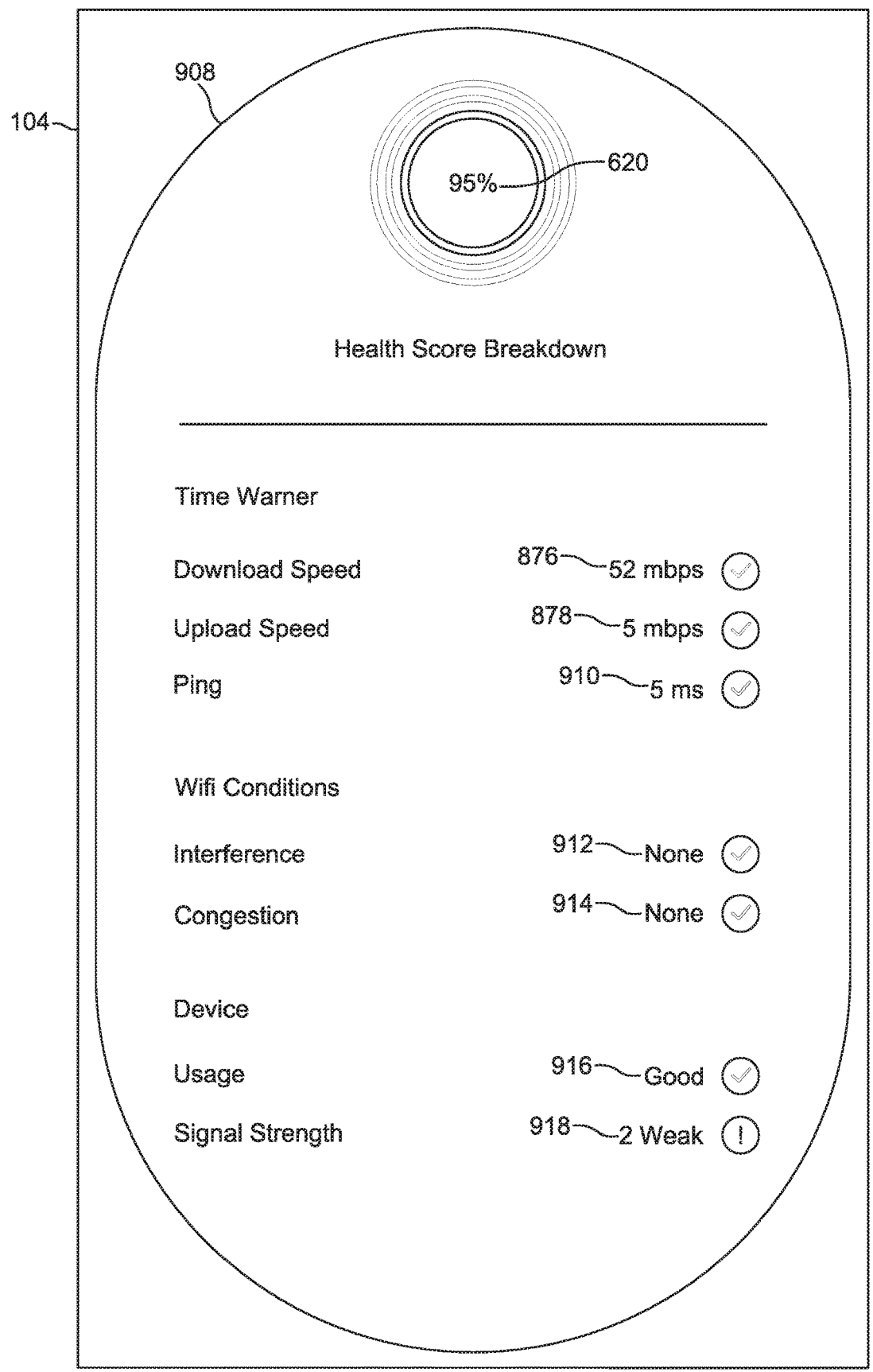
FIG. 20B shows a health score breakdown screen of the graphical user interface.

FIG. 20B shows a health score breakdown screen 908, which is displayed when the user selects the "Health Check" button 906 on the health screen 896. The screen includes the health score 620 and a title. The screen also includes three sub-titled display regions including detailed information related to the internet service provider health indicator 898, Wi-Fi conditions health indicator 900, and devices health indicator 902, respectively. The first display region includes the available download speed 876, available upload speed 878 and ping speed 910. The second display region includes the interference status 912, which is an indication of whether interference is detected on the WLAN channel currently in use, and the congestion status 914, which is an indication of whether several wireless access points are using the WLAN channel currently in use, relative to other channels. The third display region includes the device usage status 916, which is an indication of whether any particular user devices 122 have a high amount of data transmitted across the local area network, and the signal strength status 918, which is an indication of whether the wireless signals of particular user devices 122 have a low signal strength.

Figure 21A:
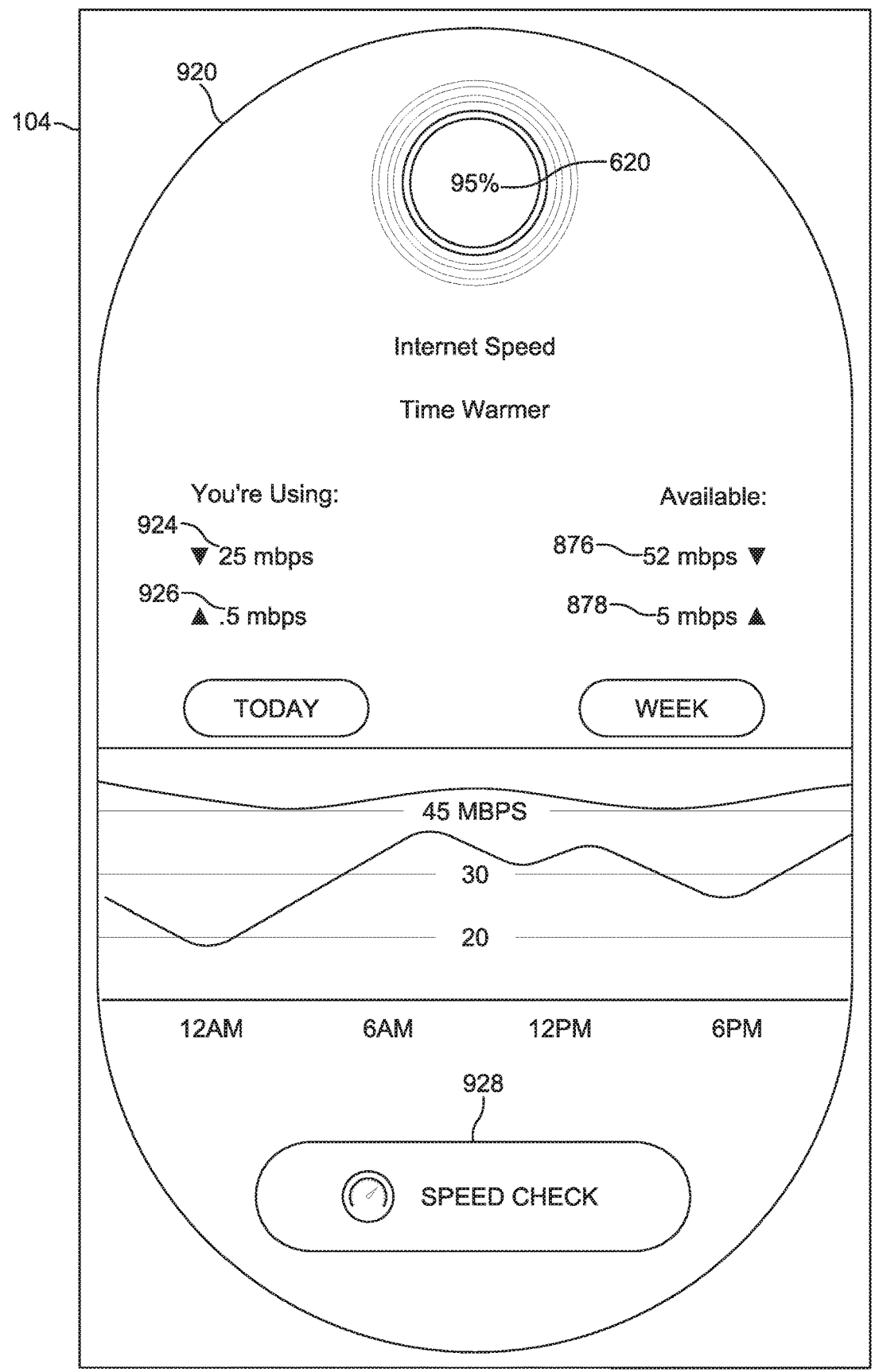
FIG. 21A shows an internet speed screen of the graphical user interface.

FIG. 21A shows an internet speed screen 920, which is displayed when the user selects the "Internet Speed" button 874 on the interactive mode screen 894. The screen includes the health score 620. Also included is title text, the name of the internet service provider, the available download speed 876 and the available upload speed 878. The screen also includes the actual download speed 924, which is the measured speed of transmission of data from the internet to the premises networking device 100, and the actual upload speed 926, which is the measured speed of transmission of data from the premises networking device 100 to the internet. Also included are a chart of the actual download speed 924 and actual upload speed 926 over the course of the previous day or the previous week, and a "Speed Check" button 928.

Figure 21B:
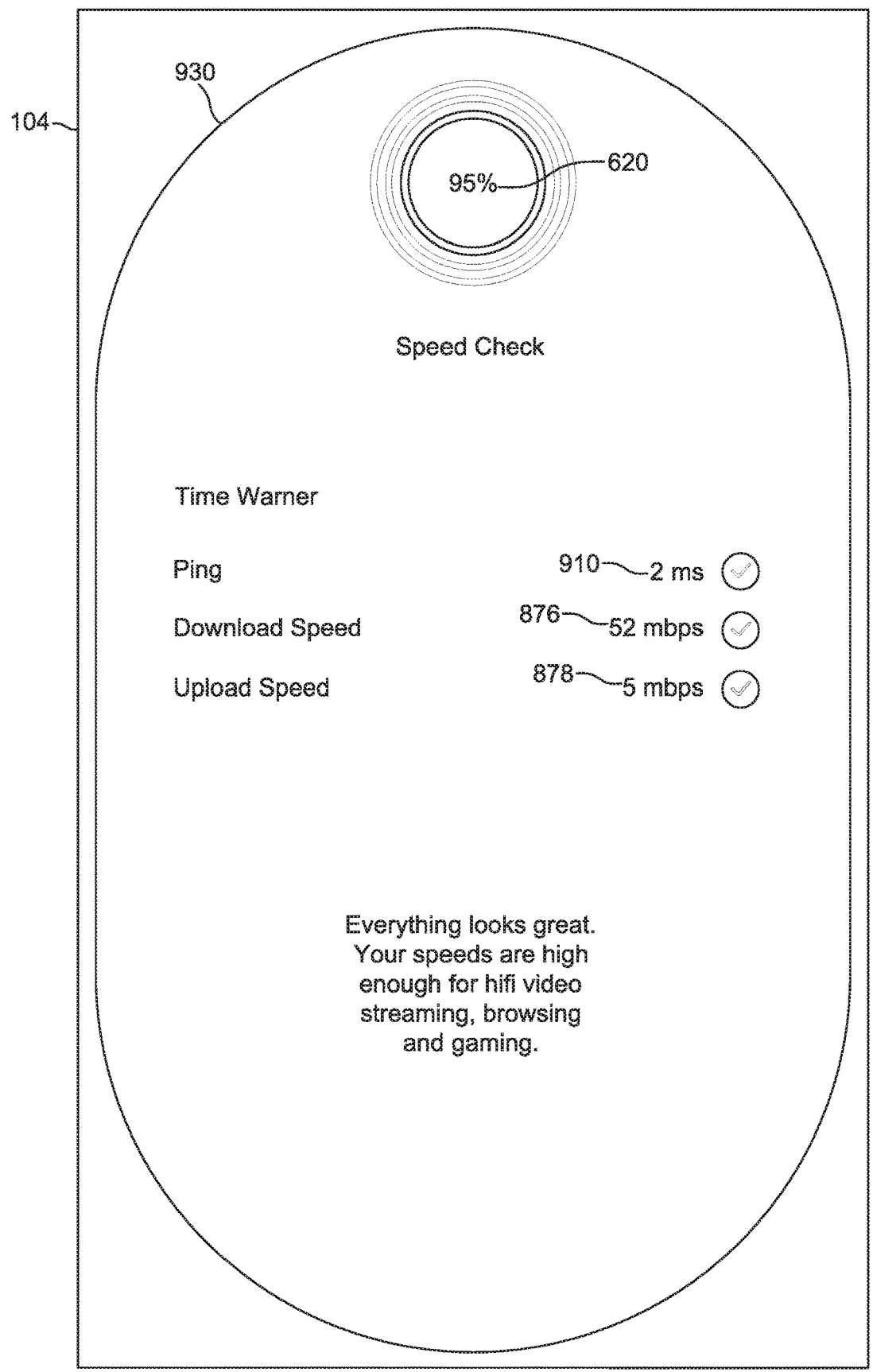
FIG. 21B shows a speed check screen of the graphical user interface.

FIG. 21B shows a speed check screen 930, which is displayed when the user selects the "Speed Check" button 928 on the internet speed screen 920. The screen includes the health score 620, the ping speed 910, the available download speed 876, and the available upload speed 878. Also included is informative text about potential internet activities that are optimal based on the available download speed 876, available upload speed 878 and ping speed 910.

Figure 22A:
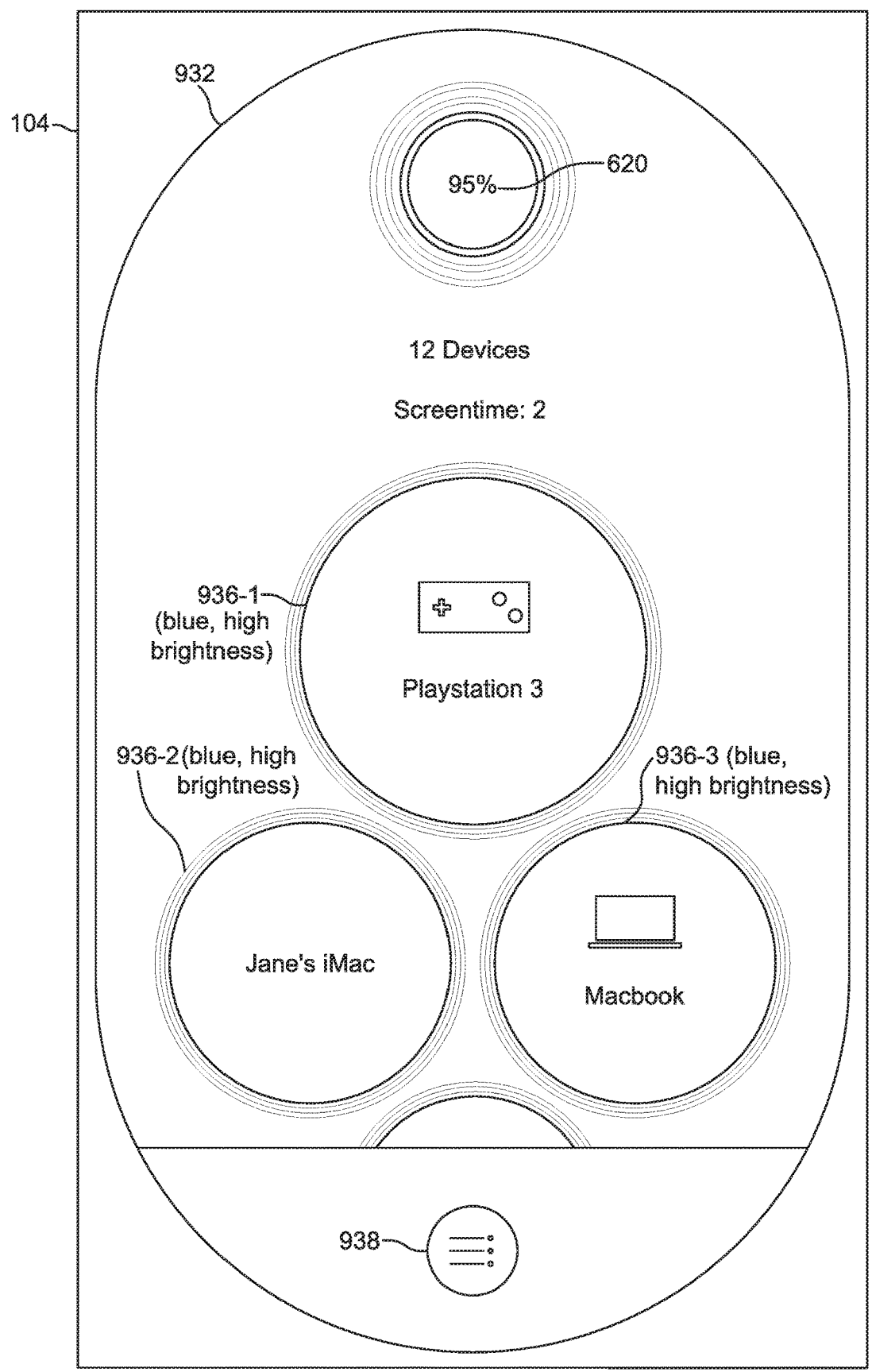
FIG. 22A shows a devices screen of the graphical user interface.
Figure 22B:
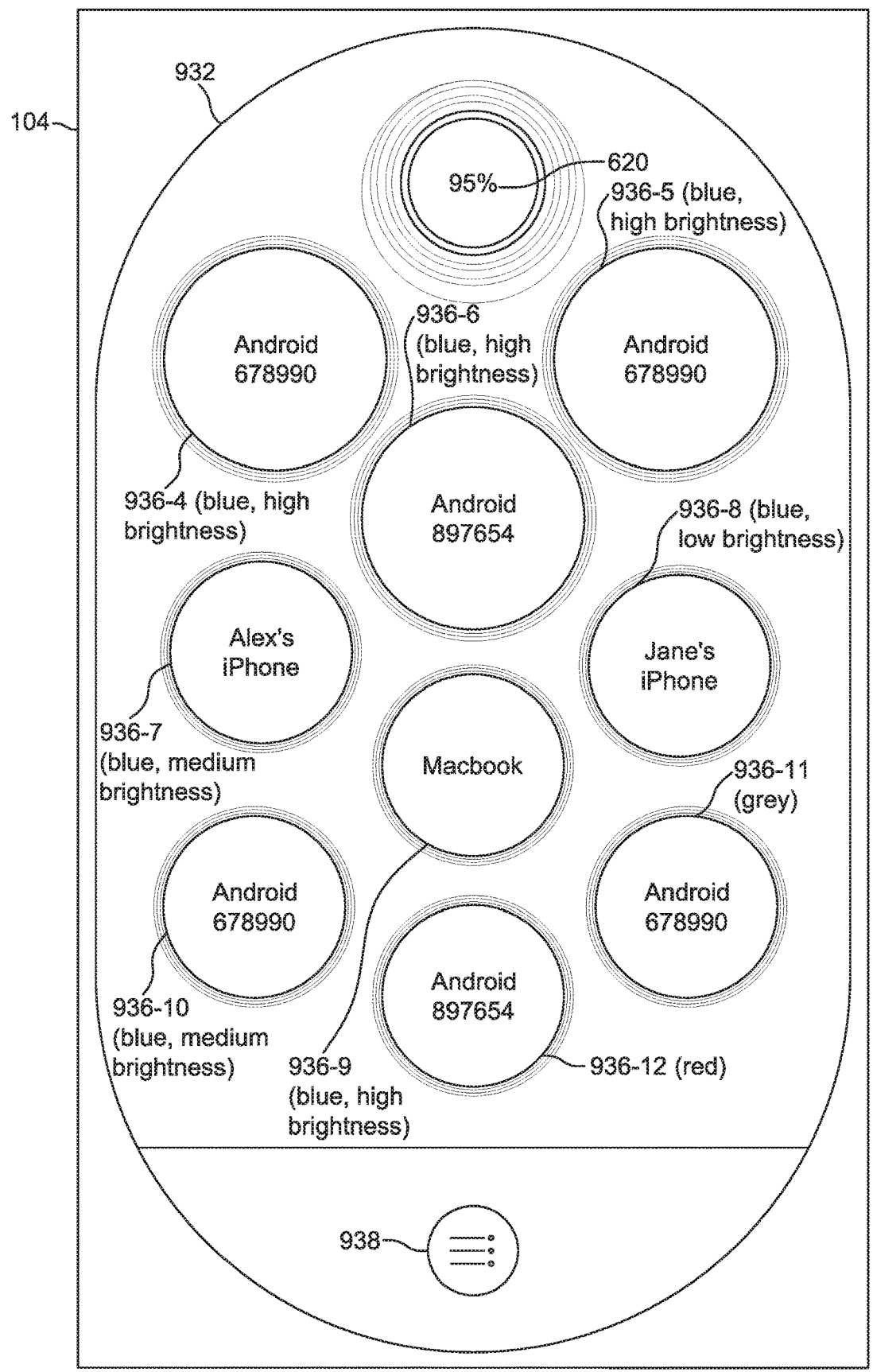
FIG. 22B shows the devices screen of the graphical user interface after it has been scrolled down to reveal additional device status graphics.

FIG. 22A shows a devices screen 932, which is displayed when the user selects the devices button 880 on either the initial menu screen 868 or the interactive mode screen 894. The screen includes the health score 620. The devices screen 932 also includes text indicating how many user devices are connected and, of those, how many are in Screentime mode, which is a parental control setting that disables access to internet access for selected user devices 122 for a preset period of time. Also included are one or more device status graphics 936 and the devices list button 938. The display region including the device status graphics 936 can be scrolled down to display further device status graphics 936 outside the initial display area of the devices screen. FIG. 22B shows the devices screen 932 after it has been scrolled down to reveal additional device status graphics 936.

Device status graphics 936 are graphical elements (for example, shapes) displayed on the GUI 126 that are representations of user devices 122 connected to the network. In general, variations in the visual characteristics of the device status graphics 936 correspond to the conditions of the network, such as the rate of transmission of data across the network, the rate of transmission of data between the local area network and a wide area network (such as the internet), error rates, the signal strength of wireless signals sent between the user devices 122 and the premises networking device 100, the amount of data transmitted across the network to or from the user devices 122, whether user devices 122 are connected to the internet, and whether user devices 122 are connected to the premises networking device 100, among other examples.

In the illustrated example, the device status graphics 936 are displayed as colored shapes (for example, bubbles) of varying size, each of which is associated with a user device 122 connected to the premises networking device 100. Device status graphics 936 can also include a unique identifier (such as text including the name of the associated user device 122) and/or an icon representing the type of device it is (e.g. video game console, laptop computer, desktop computer, smart phone). For example, device status graphic 936-1 includes the text "Playstation 3" and an icon depicting a video game controller.

Variations in visual characteristics of these graphical elements are indicative of conditions of the local area network and, more specifically, of the network conditions encountered by the associated user device. For example, the size of each device status graphic 936 is proportional to the amount of data transmitted across the network to or from the user device 122 associated with that device status graphic 936. The color of each device status graphic 936 can fall within a spectrum of colors with a constant hue (for example, blue) and variable brightness. A device status graphic 936 with relatively high brightness indicates that the signal strength of wireless signals (RSSI) sent between the associated user device 122 and the premises networking device 100 is higher than average, for example. On the other hand, a device status graphic 936 with relatively low brightness indicates that the signal strength is lower than average.

Device status graphics 936 can also be displayed in a different hue (for example, red or grey) to communicate further information about the network conditions and specifically the connection status of the associated user device 122. A device status graphic 936 that is red indicates that the associated user device 122 has a problem with its connection (there is no internet connection, or the signal strength of wireless signals received from the user device 122 indicates that the device is too far away from the premises networking device 100 to maintain a reliable connection, among other examples). A device status graphic 936 that is grey indicates that the associated user device 122 is currently not connected to the premises networking device 100.

For example, device status graphic 936-1 is the largest and among the brightest of the device status graphics 936 displayed on the devices screen 932, signifying that the user device 122 associated with device status graphic 936-1 is transmitting and receiving a relatively high amount of data across the network, and the signal strength of the wireless signals received from the user device 122 is relatively high. In another example, device status graphic 936-8 is among the smallest and the least bright of the device status graphics 936, signifying that the user device 122 associated with the device status graphic 936-8 is transmitting and receiving a relatively low amount of data over the network, and the signal strength of wireless signals received from the user device 122 is relatively low. Here, device status graphic 936-12 is colored with a red hue, signifying that there is a problem with the device's connection (for example, it is not connected to the internet). On the other hand, device status graphic 936-11 is colored with a grey hue, signifying that it is not currently connected to the premises networking device 100.

Figure 22C:
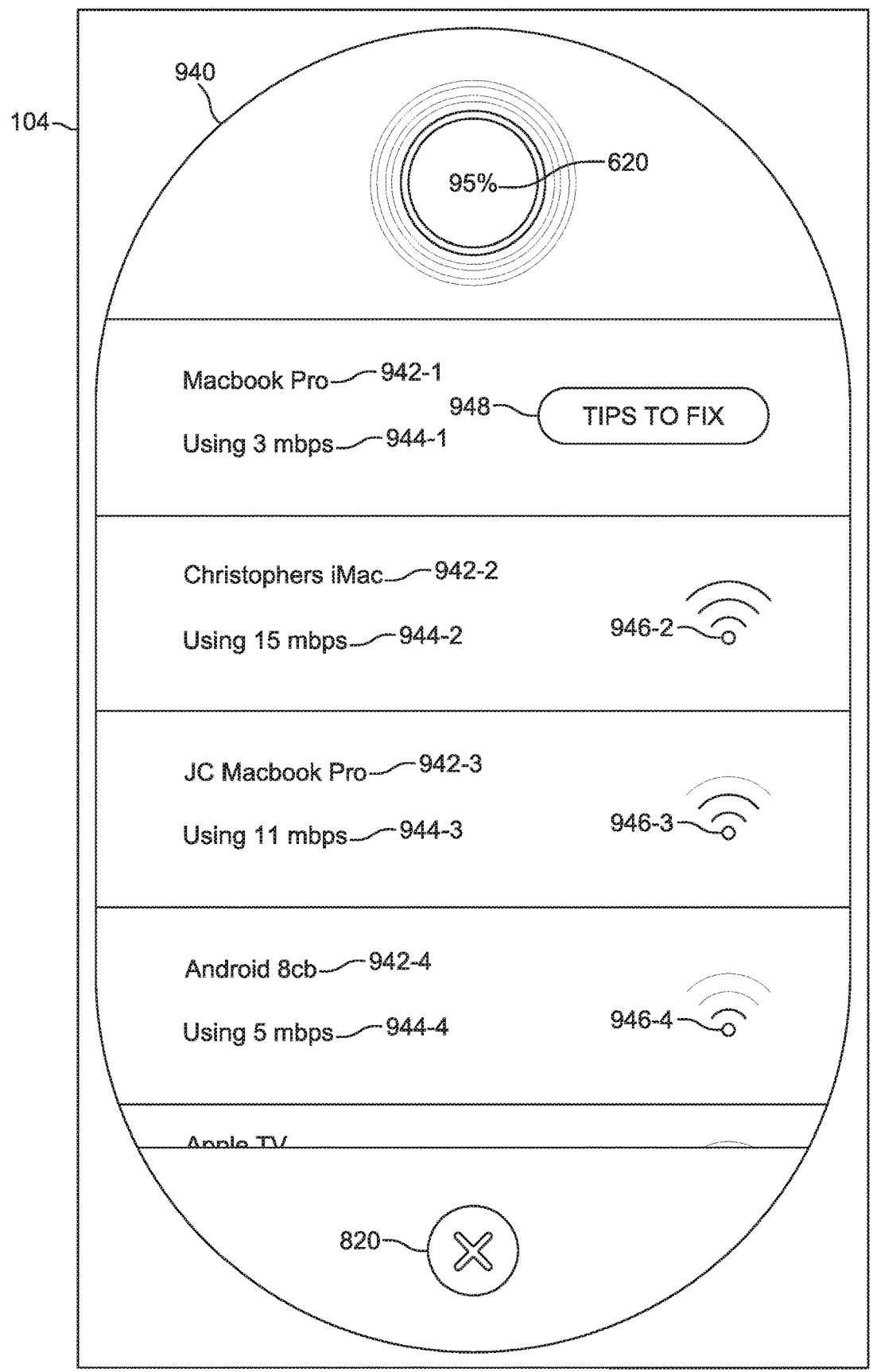
FIG. 22C shows a devices list screen of the graphical user interface.

FIG. 22C shows a devices list screen 940, which is displayed when the user selects the devices list button 938 on the devices screen 932. The screen includes the health score 620 and a cancel button 820. The devices list screen 940 shows the same information as the devices screen 932 in text format. Displayed is a list of device names 942 of user devices 122 that are connected to the premises networking device 100 along with a device connection strength graphic 946, which depicts the signal strength of the user device 122. Also displayed is the throughput 944 associated with each user device 122. The devices list screen 940 can also display a "Tips to Fix" button 948 next to any device name 942 with an associated user device 122 that is having a problem with its connection.

FIGS. 23A-23D show four device health screens, which are displayed when the user selects either a device status graphic 936 on the devices screen 932, or a device name 942 on the devices list screen 940. Each of the three device health screens have a top and a bottom display region. The top display region of each includes the health score 620. Also included in the top display region of each of the device health screens is the device name 942, and a "Having Trouble?" button 954. The device health screens are horizontally scrollable, such that the user can scroll to the right or left on any of the three screens to access the previous or next device health screen in the series.

Figure 23A:
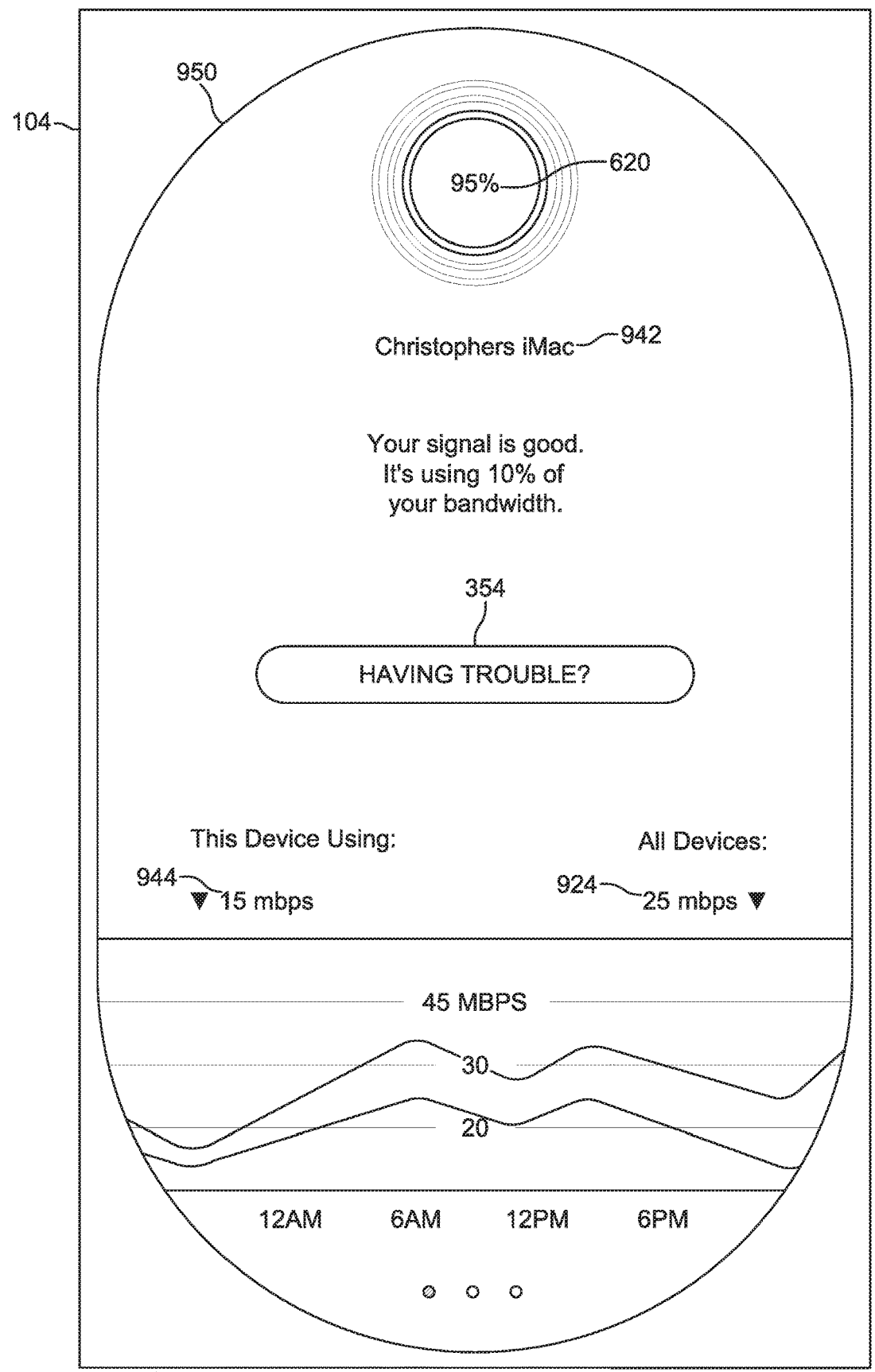
FIG. 23A shows a first example of a device health screen of the graphical user interface.

FIG. 23A shows a first example of a device health screen 950. In the bottom display region, the device's throughput 944, and the actual download speed 924 for all connected user devices 122 is displayed, as well as a chart of the device's throughput 944 and the actual download speed 924 for all devices over the course of the previous day.

Figure 23B:
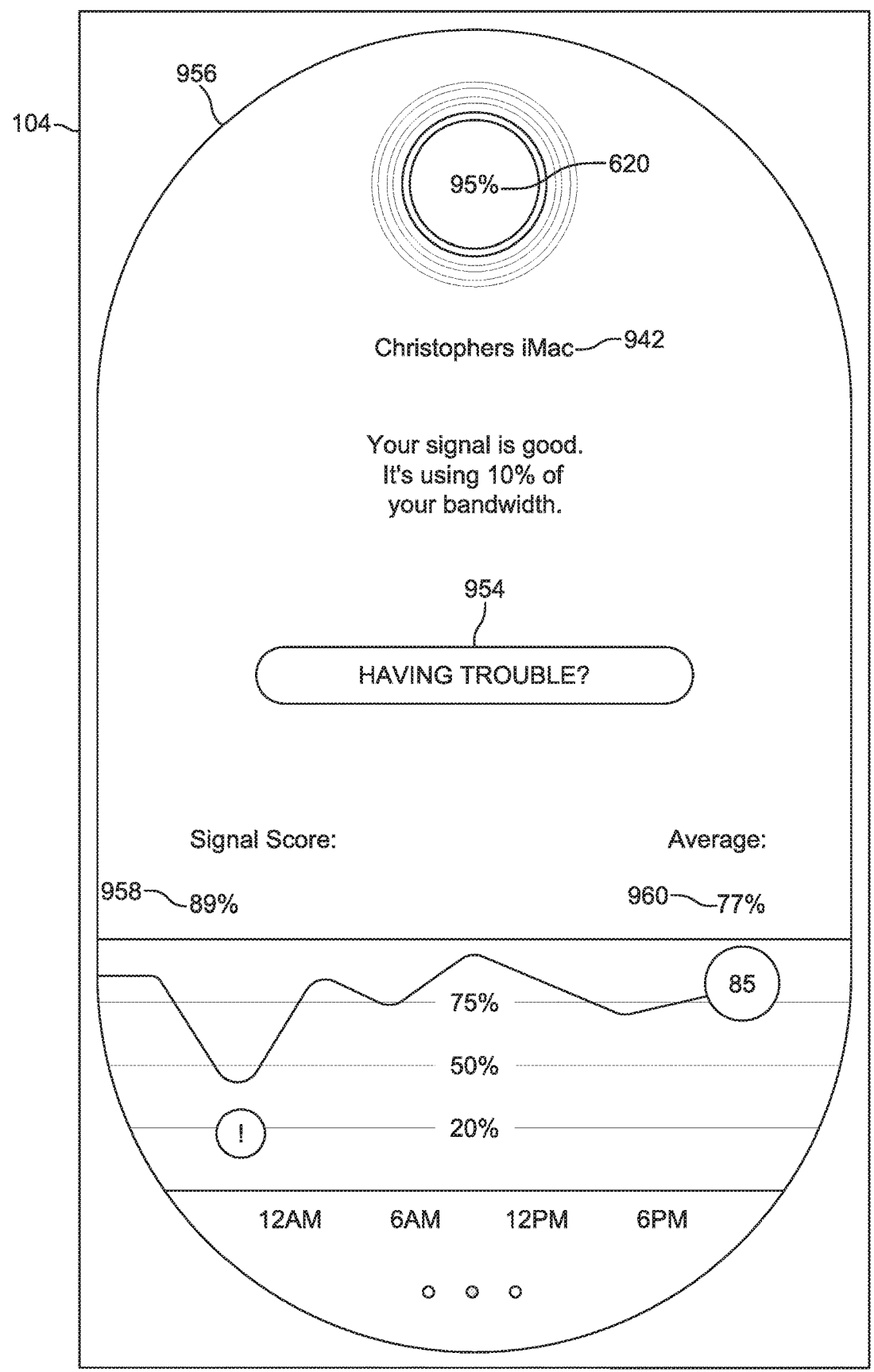
FIG. 23B shows a second example of a device health screen of the graphical user interface.

FIG. 23B shows a second example of a device health screen 956. In the bottom display region, a device signal score 958, which is calculated based on the signal strength of wireless signals received from the associated user device 122 by the premises networking device 100 is displayed. Also displayed is the average signal score 980 of all connected user devices 122. The screen also includes a chart of the device's signal score over the course of the previous day.

Figure 23C:
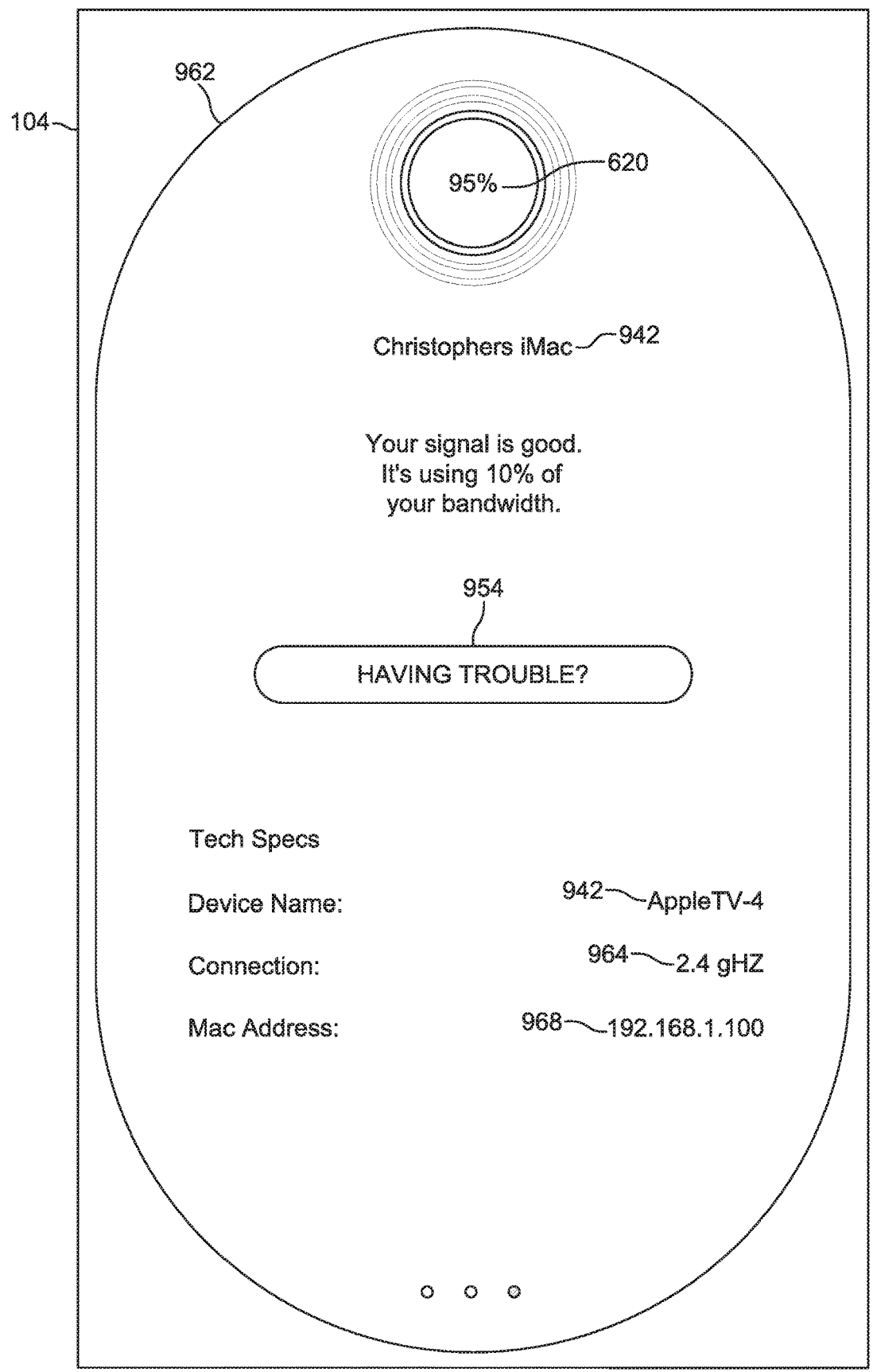
FIG. 23C shows a third example of a device health screen of the graphical user interface.

FIG. 23C shows a third example of a device health screen 962. In the bottom display region, the device name 942, the current wireless local area network (WLAN) frequency range 964, and the MAC (non-routable IP) address 968 of the associated user device 122 are displayed.

Figure 23D:
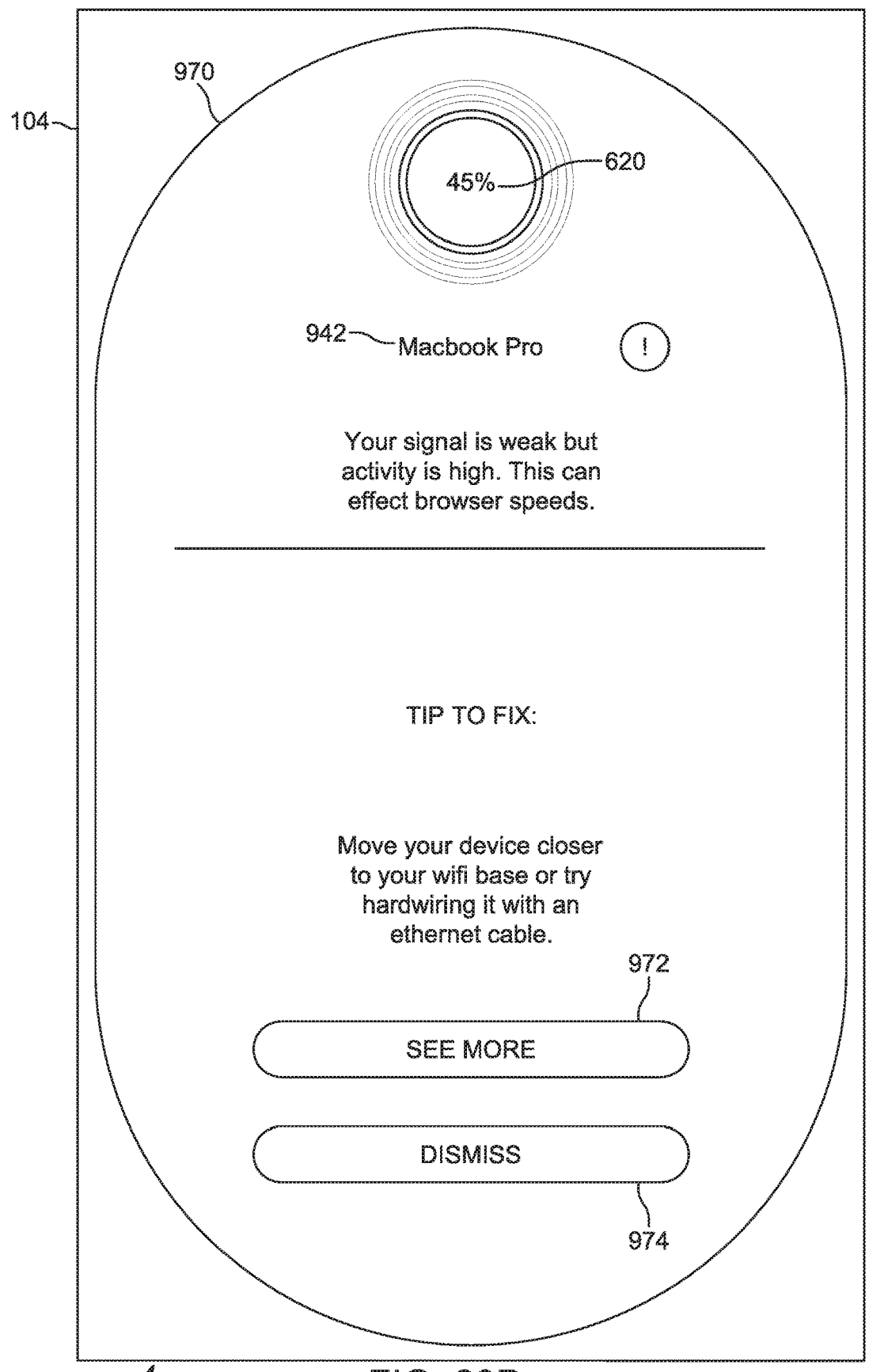
FIG. 23D shows a problem device health screen of the graphical user interface.

FIG. 23D shows a problem device health screen 970, which is displayed when there is a problem with the connection of the associated user device 122. The problem device health screen 970 is displayed in place of either the first, second or third device health screens 950, 956, 962. The bottom display region includes a tip, which comprises instructional text on how to fix the detected problem with the associated user device 122. Also included are a "See More" button 972, which displays additional instructional text, or a "Dismiss" button 974, which returns to the first, second or third device health screen 950, 956, 962.

Figure 23E:
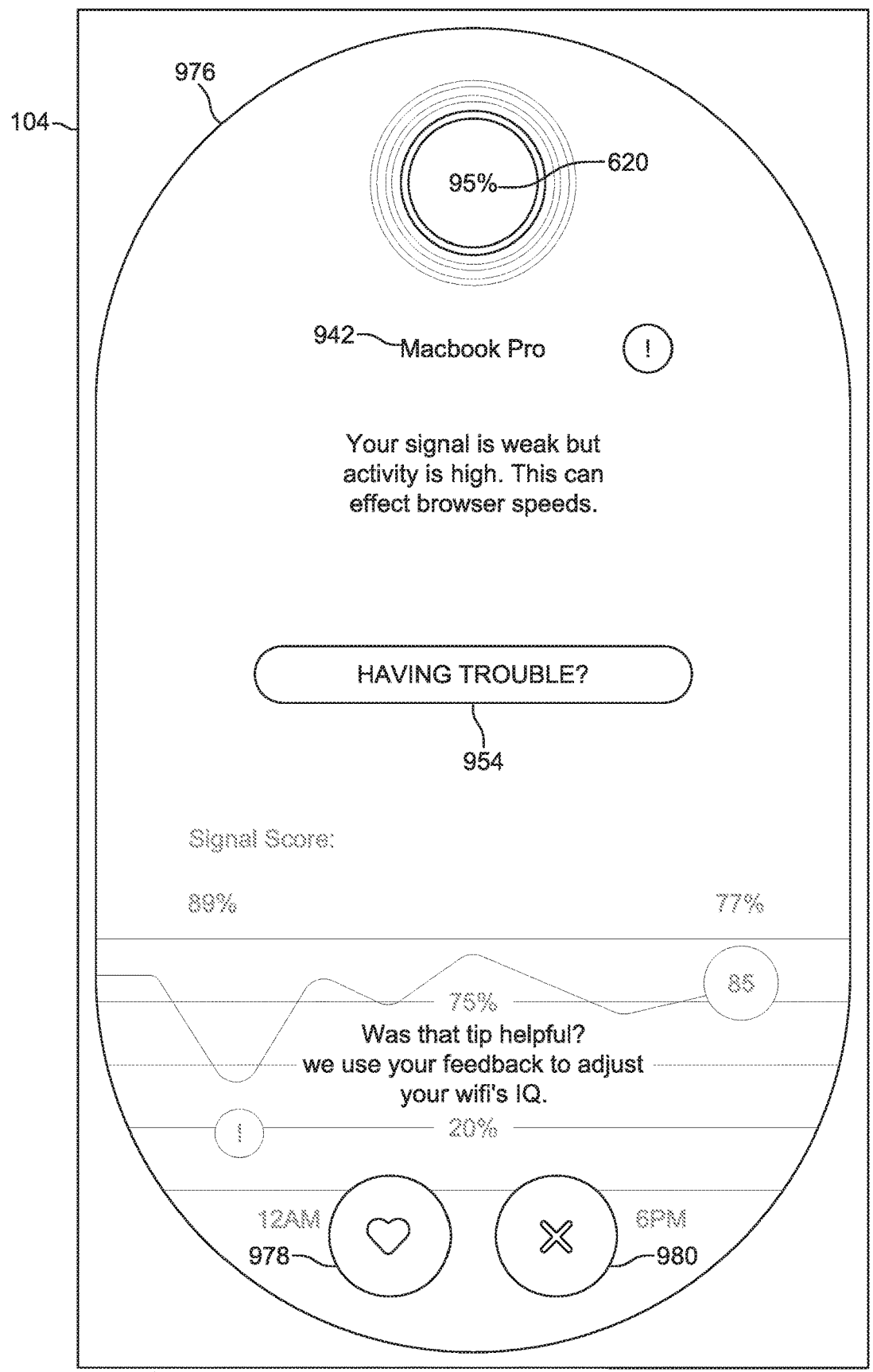
FIG. 23E shows a tip feedback screen of the graphical user interface.

FIG. 23E shows a tip feedback screen 976, which is displayed when the user selects either the "See More" button 972 or the "Dismiss" button 974 on the problem device health screen 970. The screen includes text asking the user if the previous tip was effective, along with a "Yes" button 978 and a "No" button 980. When the user selects either button, the first, second or third device health screen 950, 956, 962 is displayed. The feedback data that is input by the user is stored on the network management platform 113 and used to determine which tips to display in the future. The feedback data is also used to determine whether changes to the configuration settings of the premises networking device 100 should be made automatically and/or displayed as an option to the user via the GUI 126.

Figure 24A:
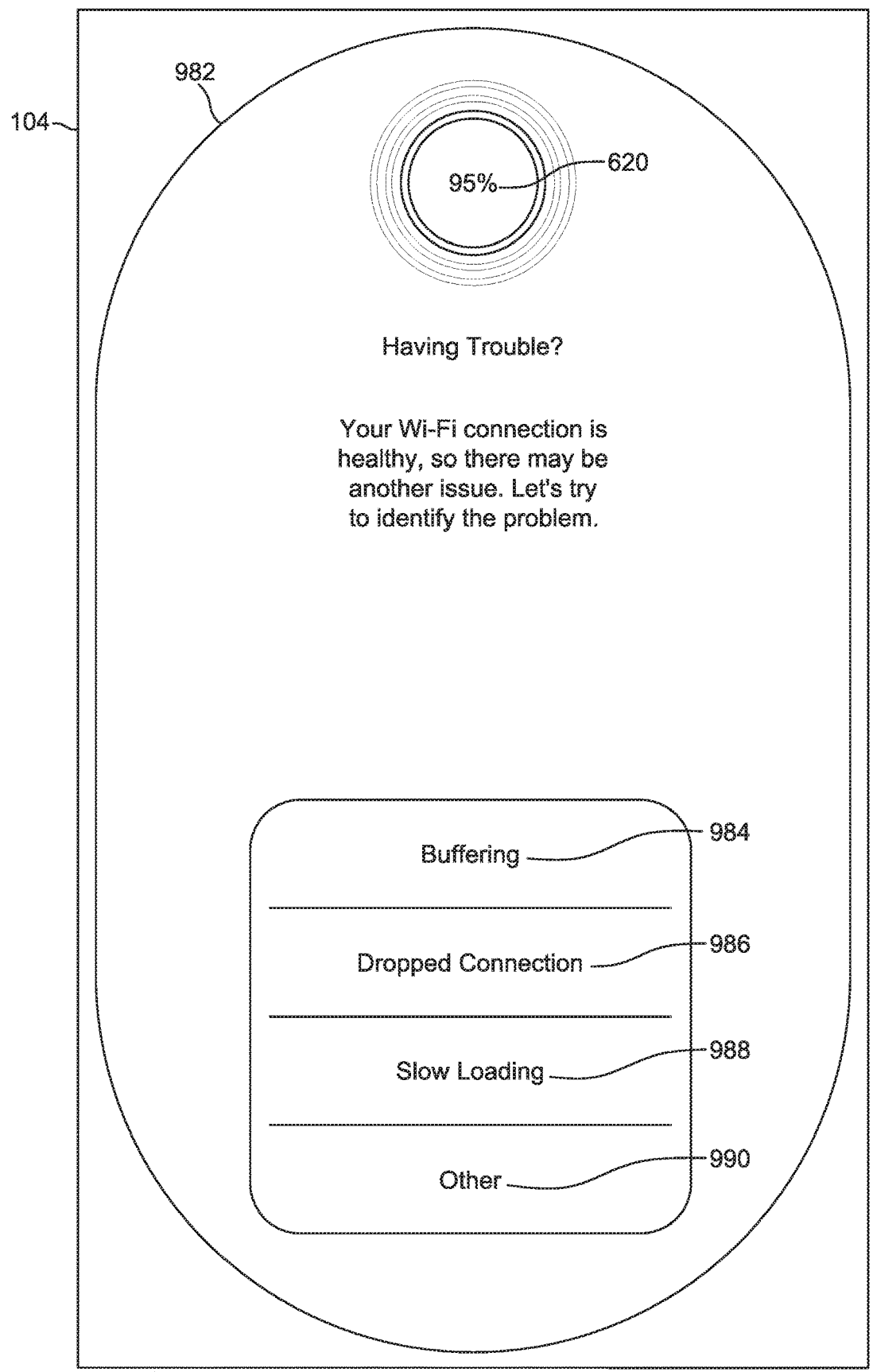
FIG. 24A shows a trouble screen of the graphical user interface.

FIG. 24A shows a trouble screen 982, which is displayed when the user selects the "Having Trouble?" button 954 on either the first, second or third of the device health screens 950, 956, 962. The screen includes the health score 620, instructional text, the "Buffering" button 984, the "Dropped Connection" button 986, the "Slow Loading" button 988, and the "Other" button 990.

Figure 24B:
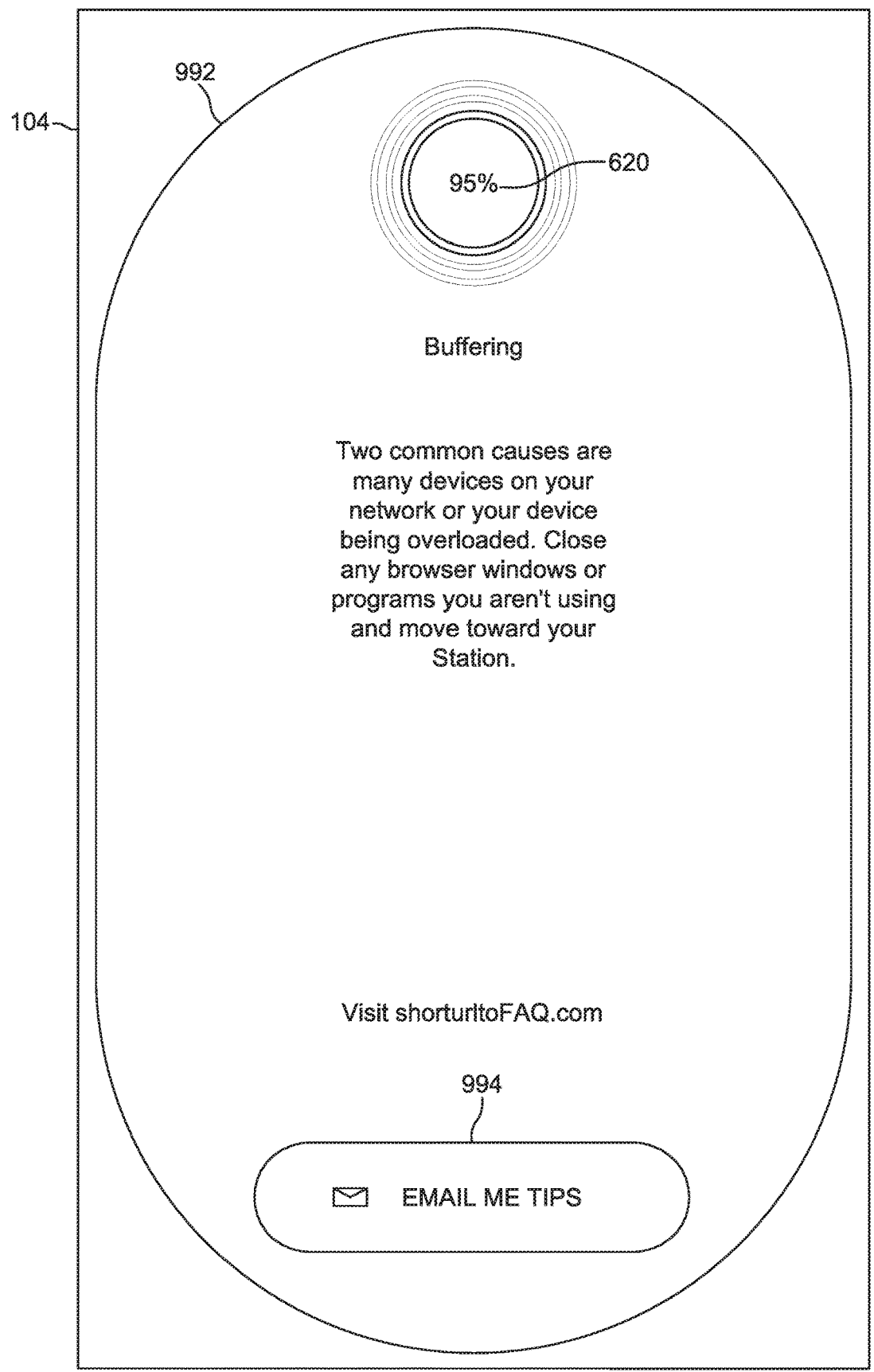
FIG. 24B shows a buffering screen of the graphical user interface.
Figure 24C:
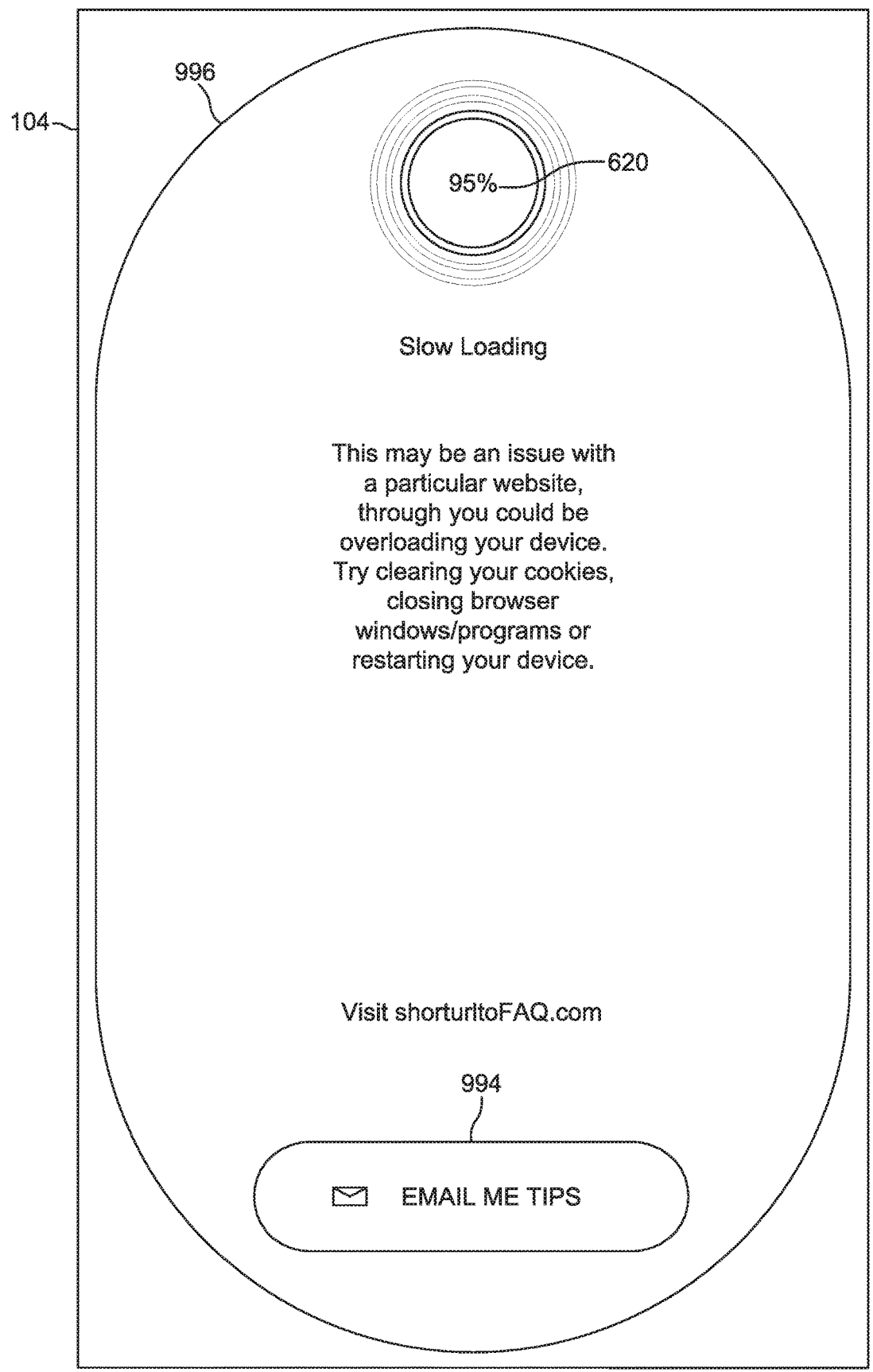
FIG. 24C shows a slow loading screen of the graphical user interface.
Figure 24D:
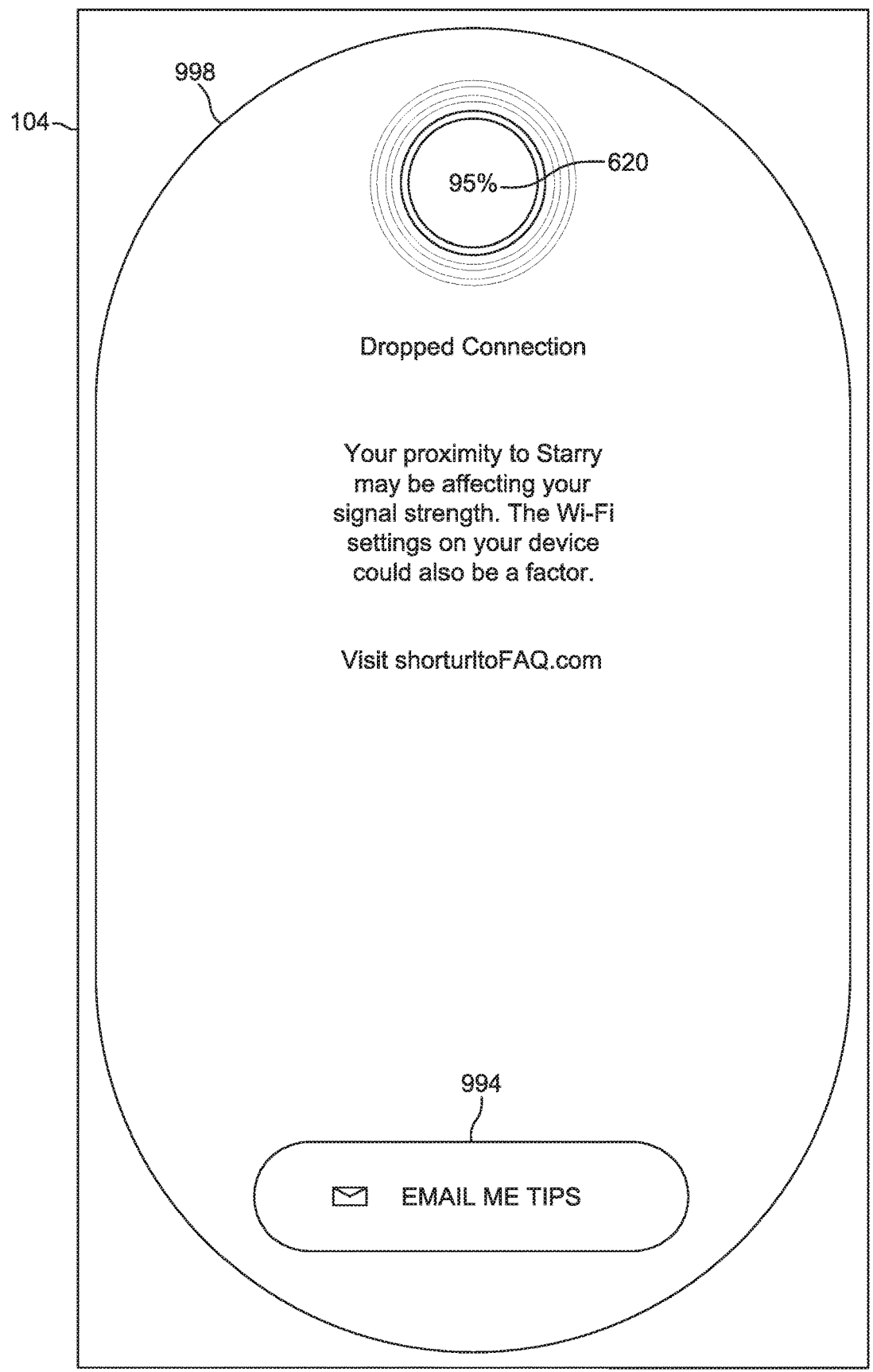
FIG. 24D shows a dropped connection screen of the graphical user interface.
Figure 24E:
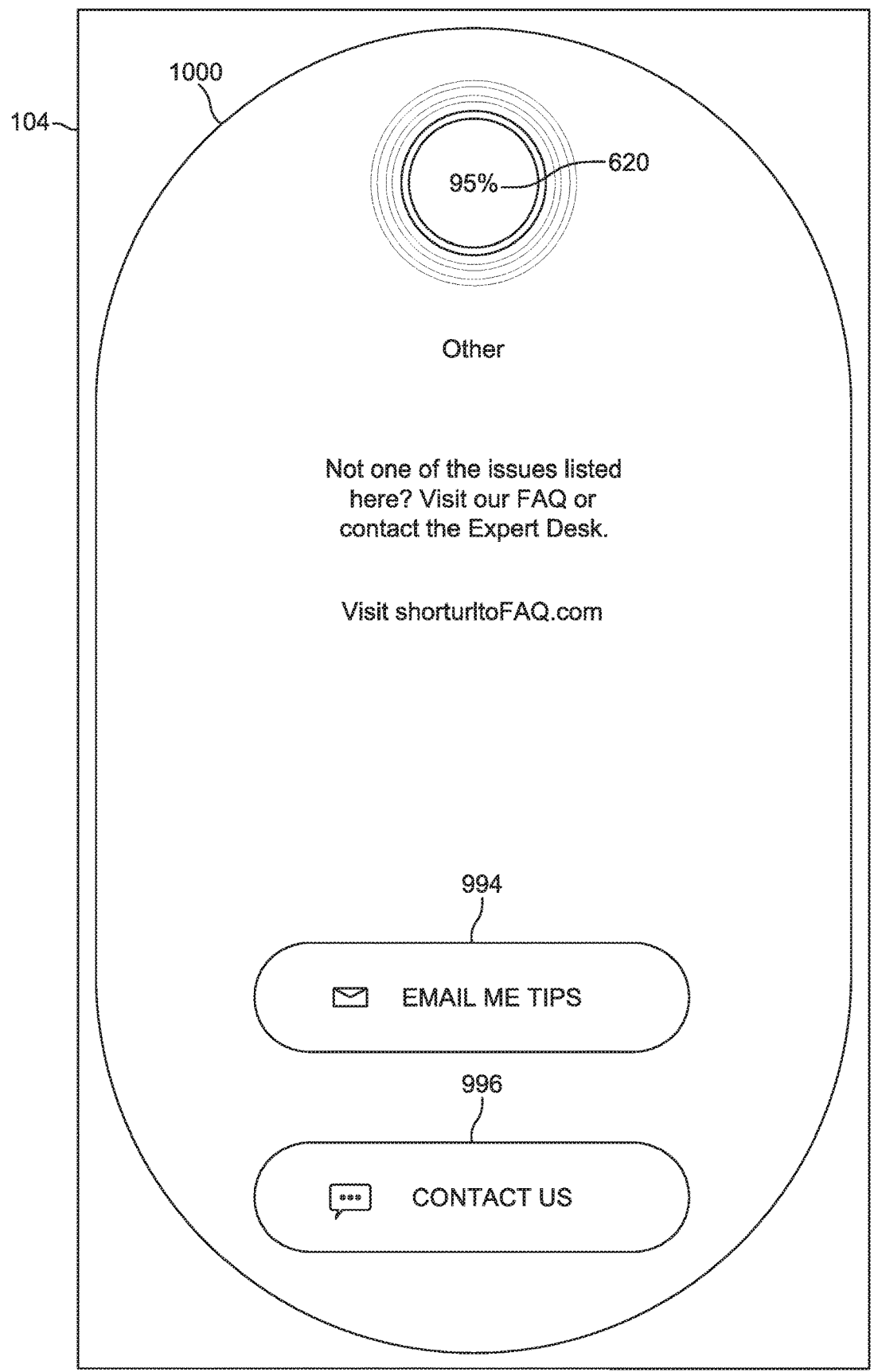
FIG. 24E shows another issue screen of the graphical user interface.

FIGS. 24B-24E, respectively, show a series of troubleshooting screens that appear when the user selects either of the buttons displayed on the trouble screen 982. Each of the troubleshooting screens includes the health score 620, instructional text and the "Email Me Tips" button 994. The "Email Me Tips" button 994 sends a request for further information to the party responsible for technical support for the premises networking device 100 (for example, the manufacturer). In response to the request, technical support then sends further information about the issue to the user's email address. FIG. 24B shows the buffering screen 992, which is displayed when the user selects the "Buffering" button 984. FIG. 24C shows the slow loading screen 996, which is displayed when the user selects the "Slow Loading" button 988. FIG. 24D shows the dropped connection screen 998, which is displayed when the user selects the "Dropped Connection" button. FIG. 24E shows the other issue screen 1000, which is displayed when the user selects the "Other" button 990. Also included on the other issue screen 1000 is the "Contact Us" button 996.

Figure 25:
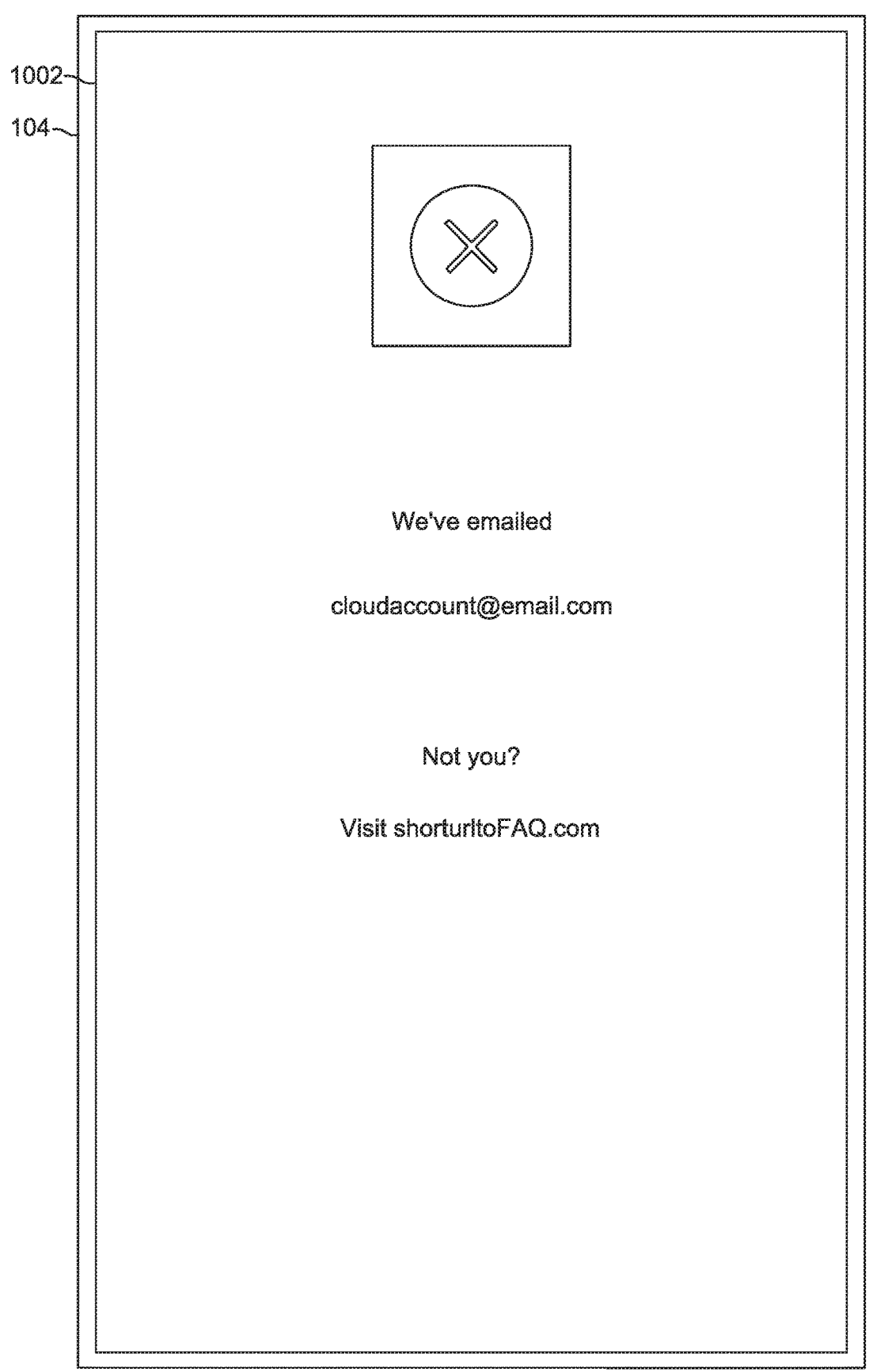
FIG. 25 shows an email confirmation screen of the graphical user interface.

FIG. 25 shows an email confirmation screen 1002, which is displayed when the user selects the "Email Me Tips" button 994 on either the buffering screen 992, the slow loading screen 996, or the dropped connection screen 998.

Figure 26A:
FIG. 26A shows a contact us screen of the graphical user interface.

FIG. 26A shows a contact us screen 1004, which is displayed when the user selects the "Contact Us" button 996 on the other issue screen 1000. The screen includes the health score 620, instructional text and the "Request Call" button 1006.

Figure 26B:
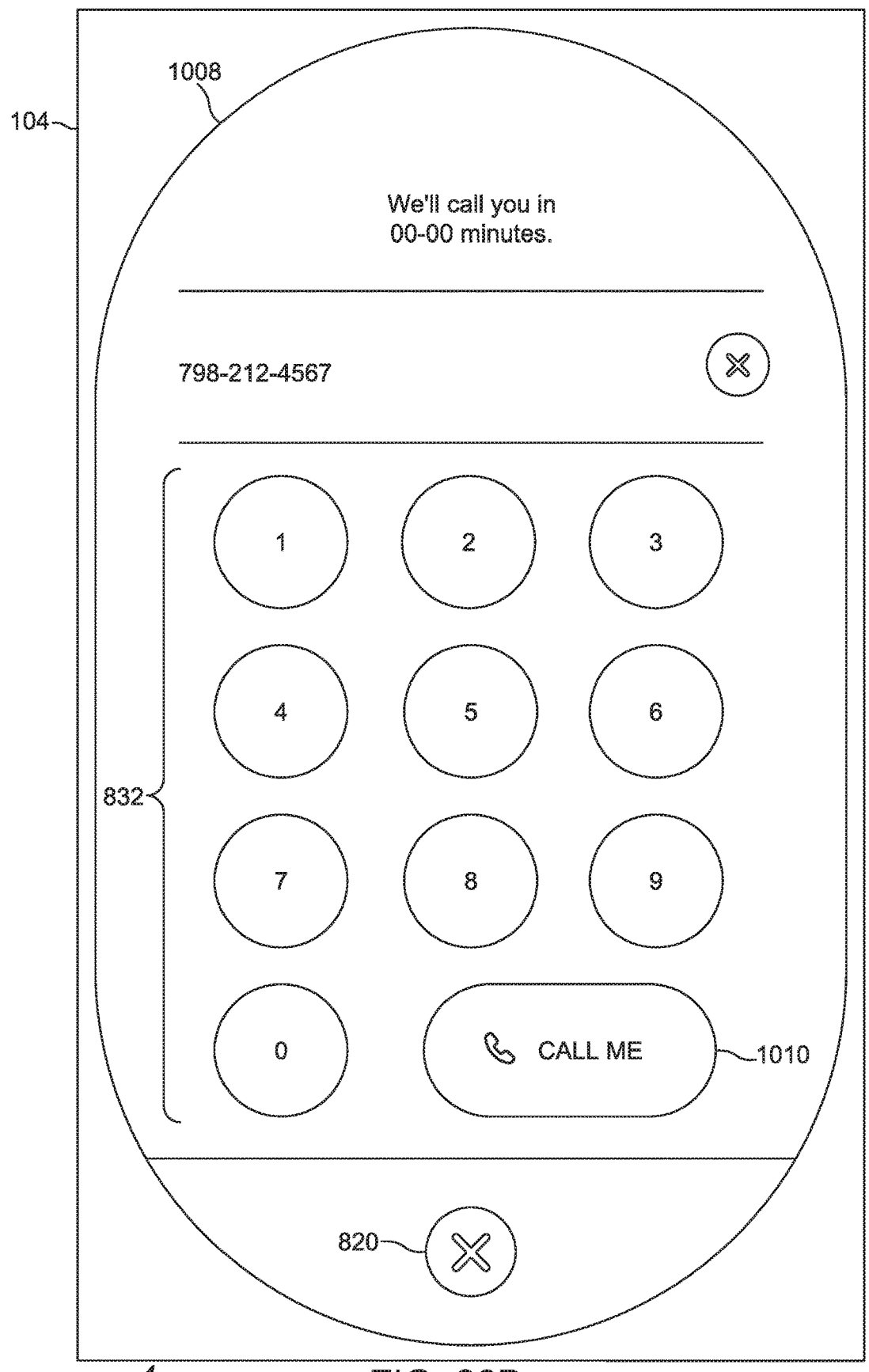
FIG. 26B shows a dialer screen of the graphical user interface.

FIG. 26B shows a dialer screen 1008, which is displayed when the user selects the "Request Call" button 1006 on the contact us screen 1004. The screen includes a number pad 832, a "Call Me" button 1010 and a cancel button 820. The "Call Me" button 1010 sends a request for technical support to contact the user at the telephone entered by the user using the number pad 832.

Figure 26C:
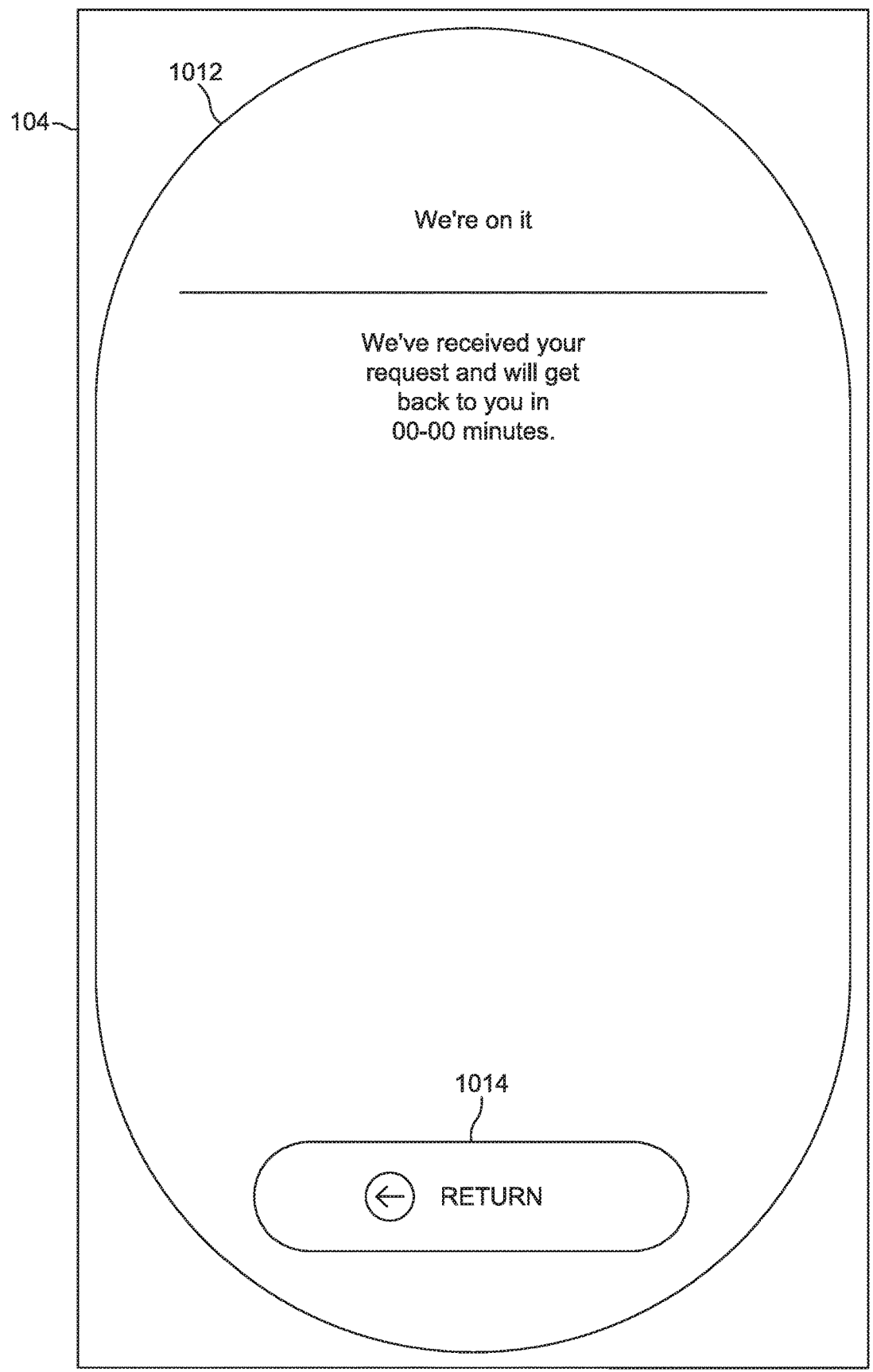
FIG. 26C shows a request call confirmation screen of the graphical user interface.

FIG. 26C shows a request call confirmation screen 1012, which is displayed when the user enters a telephone number and selects the "Call Me" button 1010 on the dialer screen 1008. The screen includes confirmation text, which can include an estimate of when the user will receive a telephone call from technical support. Also included is a return button 1014, which returns to the previous screen.

Figure 27A:
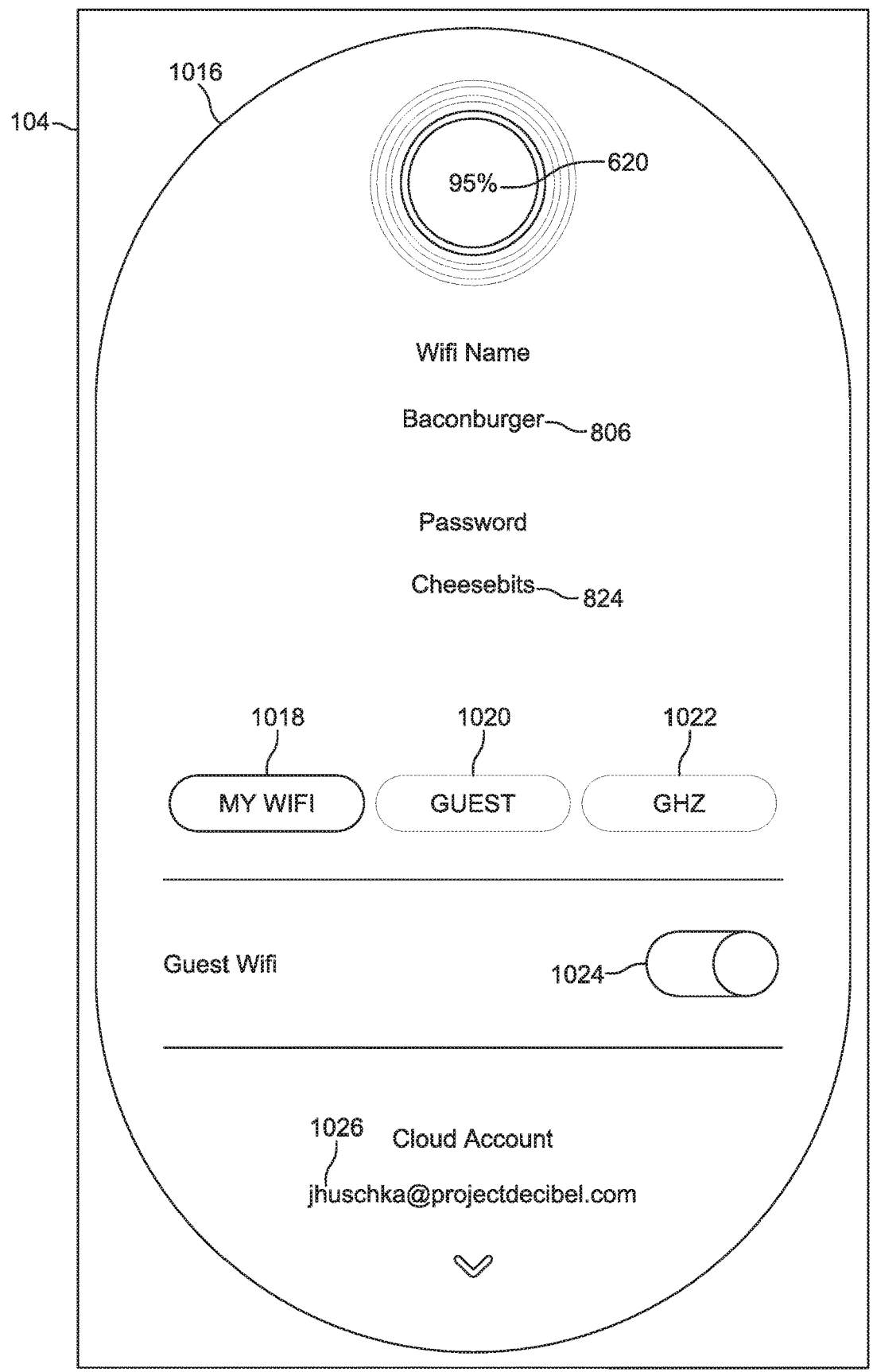
FIG. 27A shows a settings screen of the graphical user interface.

FIG. 27A shows a settings screen 1016, which is displayed when the user selects the settings button 884 on either the initial menu screen 868 or the interactive mode screen 894. The screen includes the health score 620, Wi-Fi name 806 and Wi-Fi password 824. Also included is the "My Wi-Fi" button 1018, the "Guest" button 1020 and the "5 GHZ" button 1022, each of which changes the Wi-Fi name 806 and Wi-Fi password 824 displayed to those pertaining to the main wireless network, guest wireless network, or secondary 5 GHz network respectively. The "Guest Wi-Fi" virtual switch 1024 can be selected by the user to enable or disable the guest wireless network. The "Cloud Account" button 1026 comprises text that includes the email address associated with the user's account with the manufacturer.

Figure 27B:
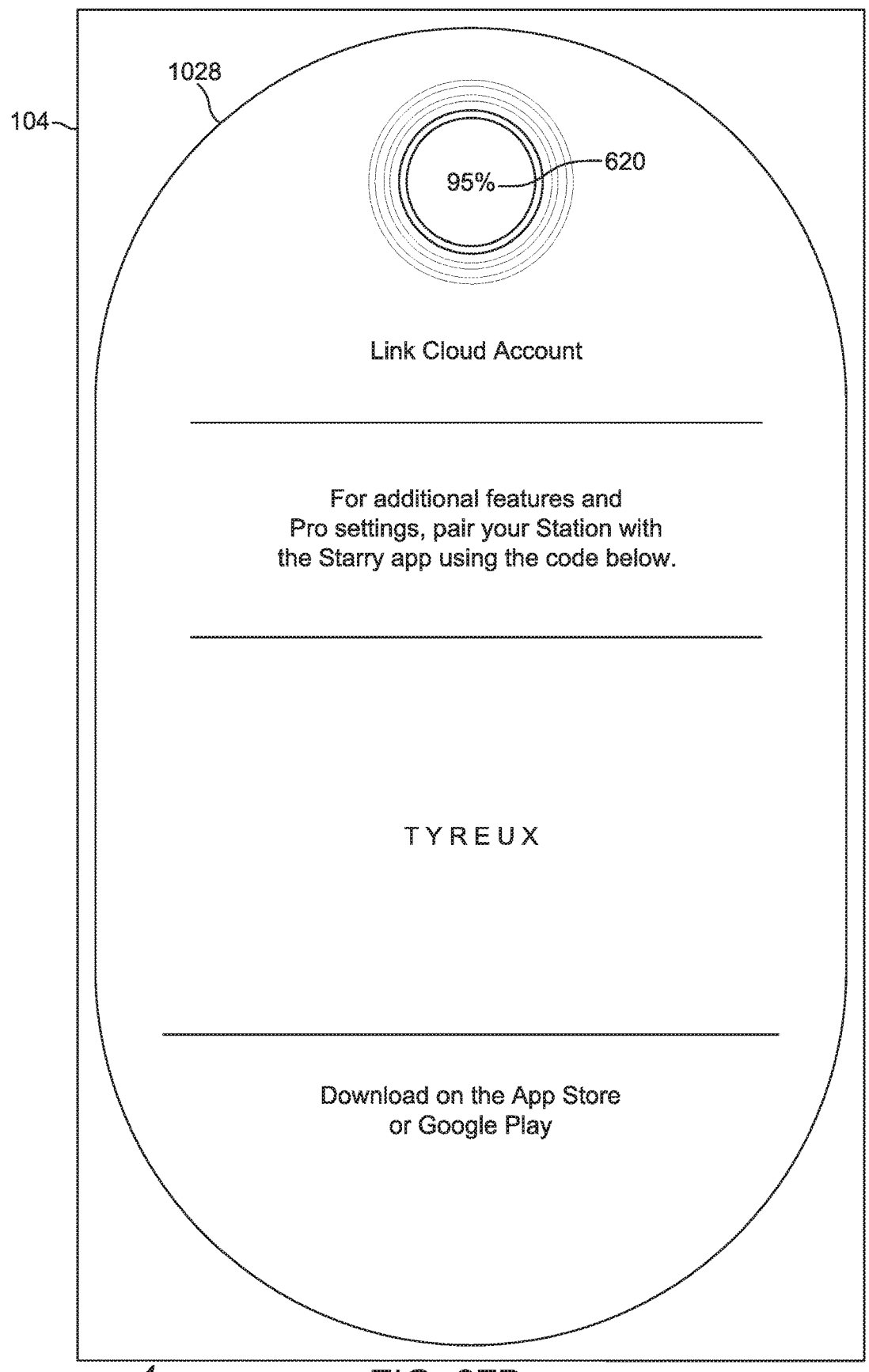
FIG. 27B shows an application pairing screen of the graphical user interface.

FIG. 27B shows an application pairing screen 1028, which is displayed when the user selects the "Cloud Account" button 1026 on the settings screen 1016. The screen includes a title and instructional text. Also included is a randomly selected pairing key 864. The pairing key 864 can be input by the user into a user device 122 running a configuration application 124, allowing the user to use the configuration application 124 to change the configuration settings of the premises networking device 100.

Figure 27C:
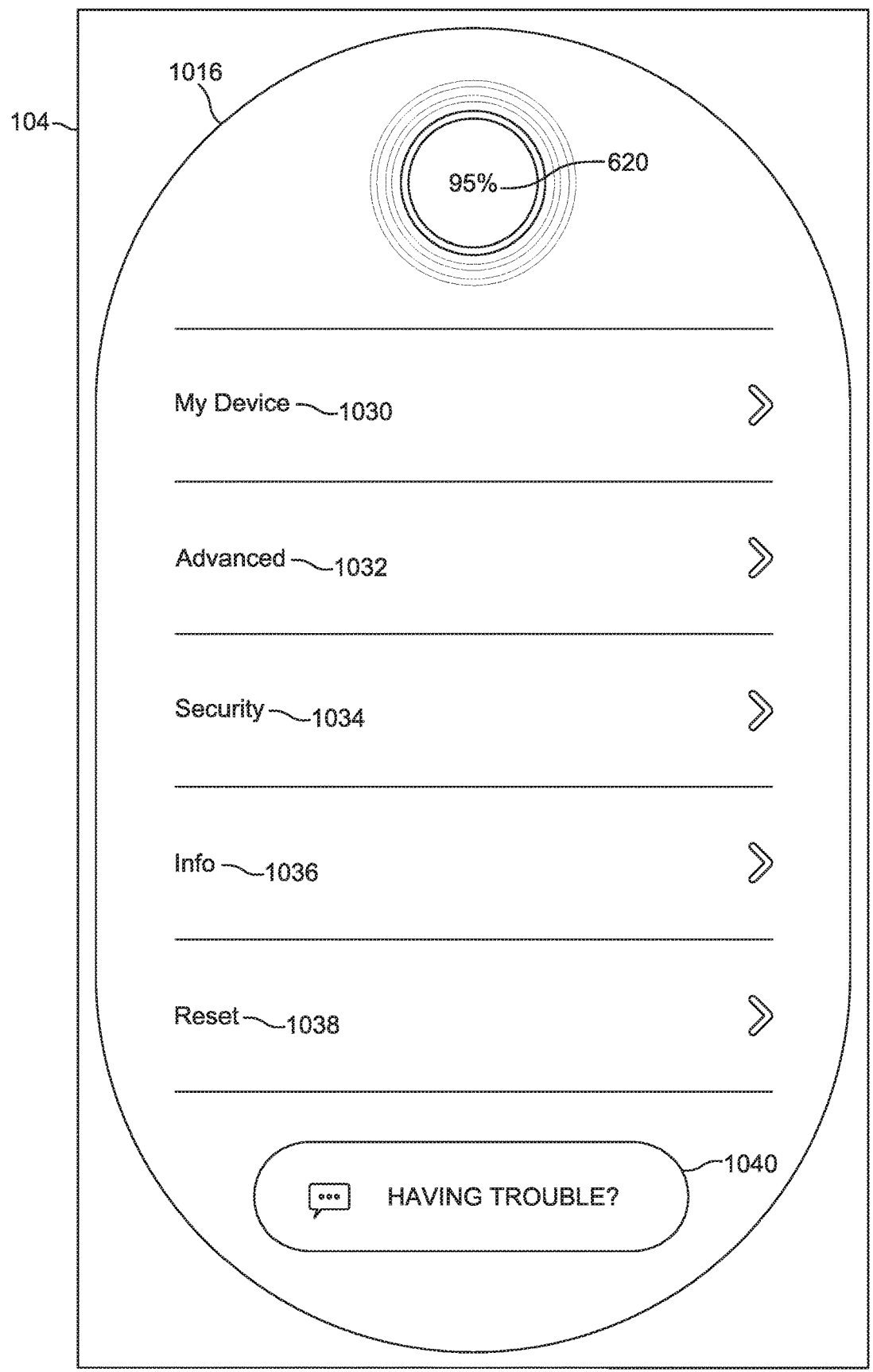
FIG. 27C shows the settings screen of the graphical user interface after being scrolled down by the user to reveal further menu options.

FIG. 27C shows a settings screen 1016 after being scrolled down by the user to reveal further menu options outside the display area shown in FIG. 27A. The screen includes the "My Device" button 1030, the "Advanced" button 1032, the "Security" button 1034, the "Info" button 1036, the "Reset" button 1038, and the "Having Trouble?" button 1040.

Figure 27D:
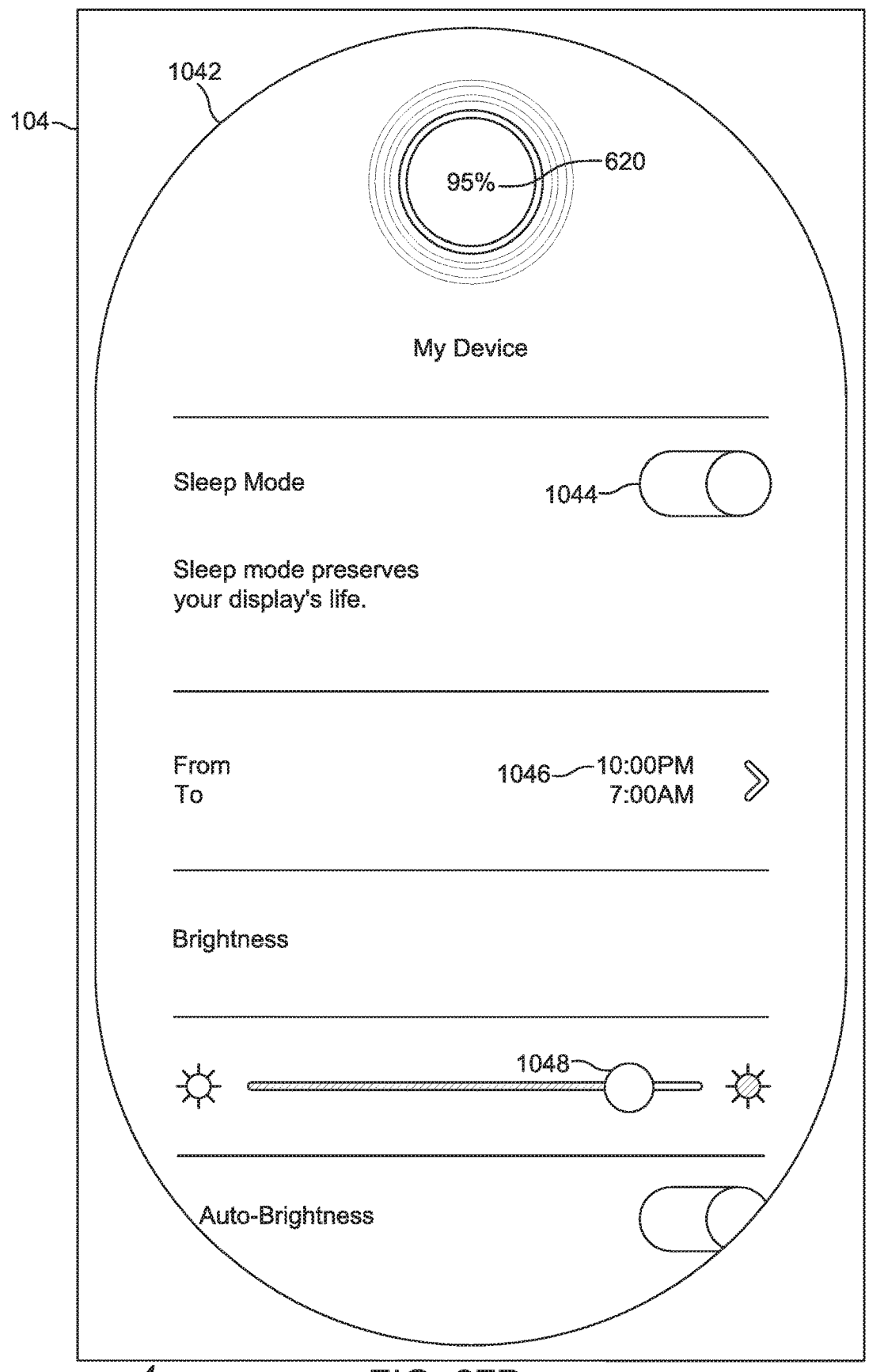
FIG. 27D shows a my device settings screen of the graphical user interface.

FIG. 27D shows a my device settings screen 1042, which is displayed when the user selects the "My Device" button 1030 on the settings screen 1016. The screen includes title text and the health score 620. Also included is the sleep mode switch 1044, which, when selected, toggles sleep mode on and off. Sleep mode is a configuration setting that disables the touch screen display 104 for a preset interval of time, which can be input by the user by selecting the sleep mode time setting button 1046 and entering the beginning and end time. The brightness slider 1048 increases and decreases the brightness of the touch screen display 104.

Figure 27E:
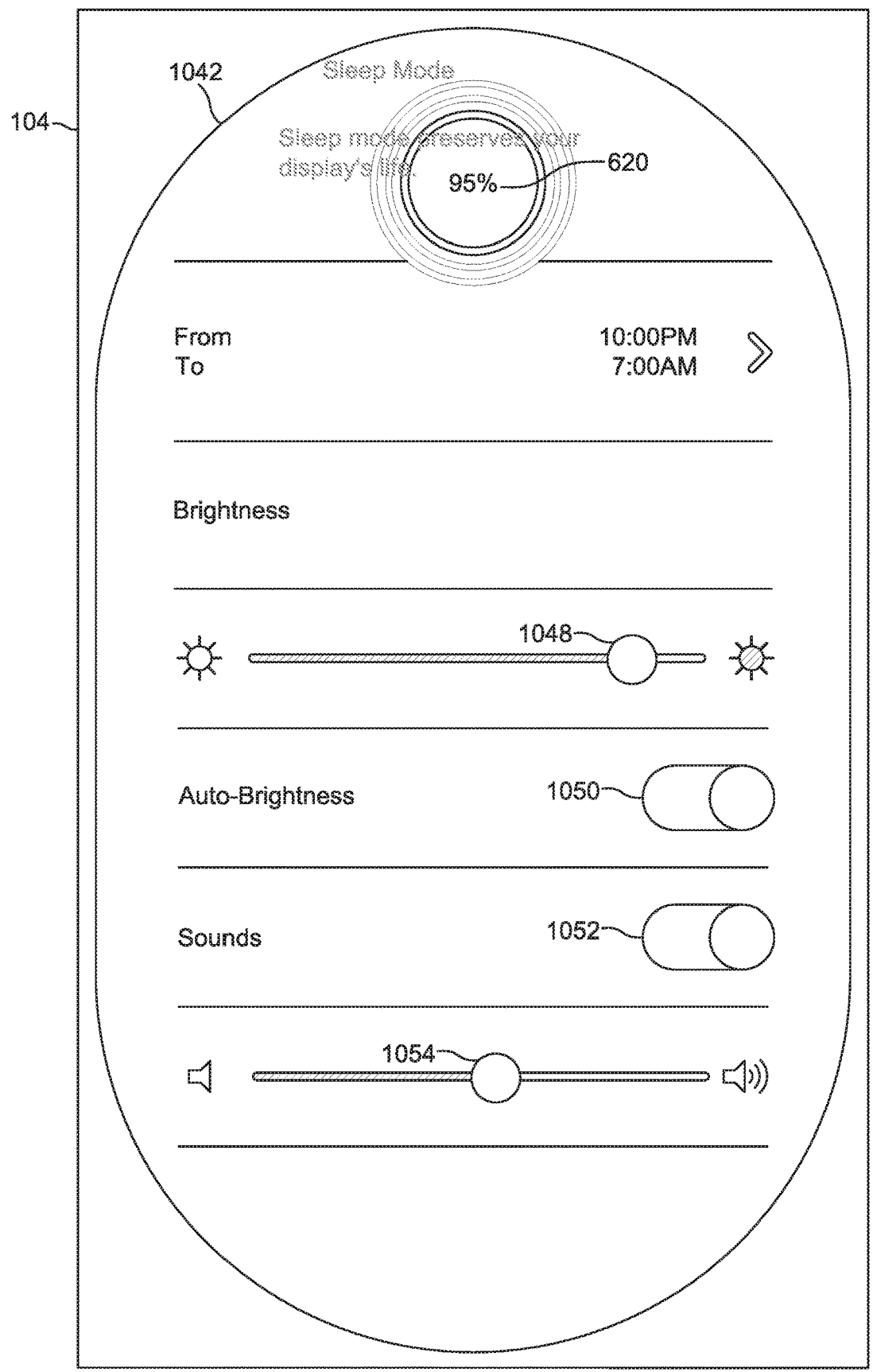
FIG. 27E shows the my device settings screen of the graphical user interface after being scrolled down by the user to reveal further menu options.

FIG. 27E shows the my device settings screen 1042 after being scrolled down by the user to reveal further menu options outside the display area shown in FIG. 27D. The auto-brightness switch 1050, when selected, toggles auto-brightness mode on and off. Auto-Brightness mode automatically adjusts the brightness of the touch screen display 104. The sounds switch 1052, when selected, enables and disables sounds. The volume slider 1054 increases and decreases the volume.

Figure 27F:
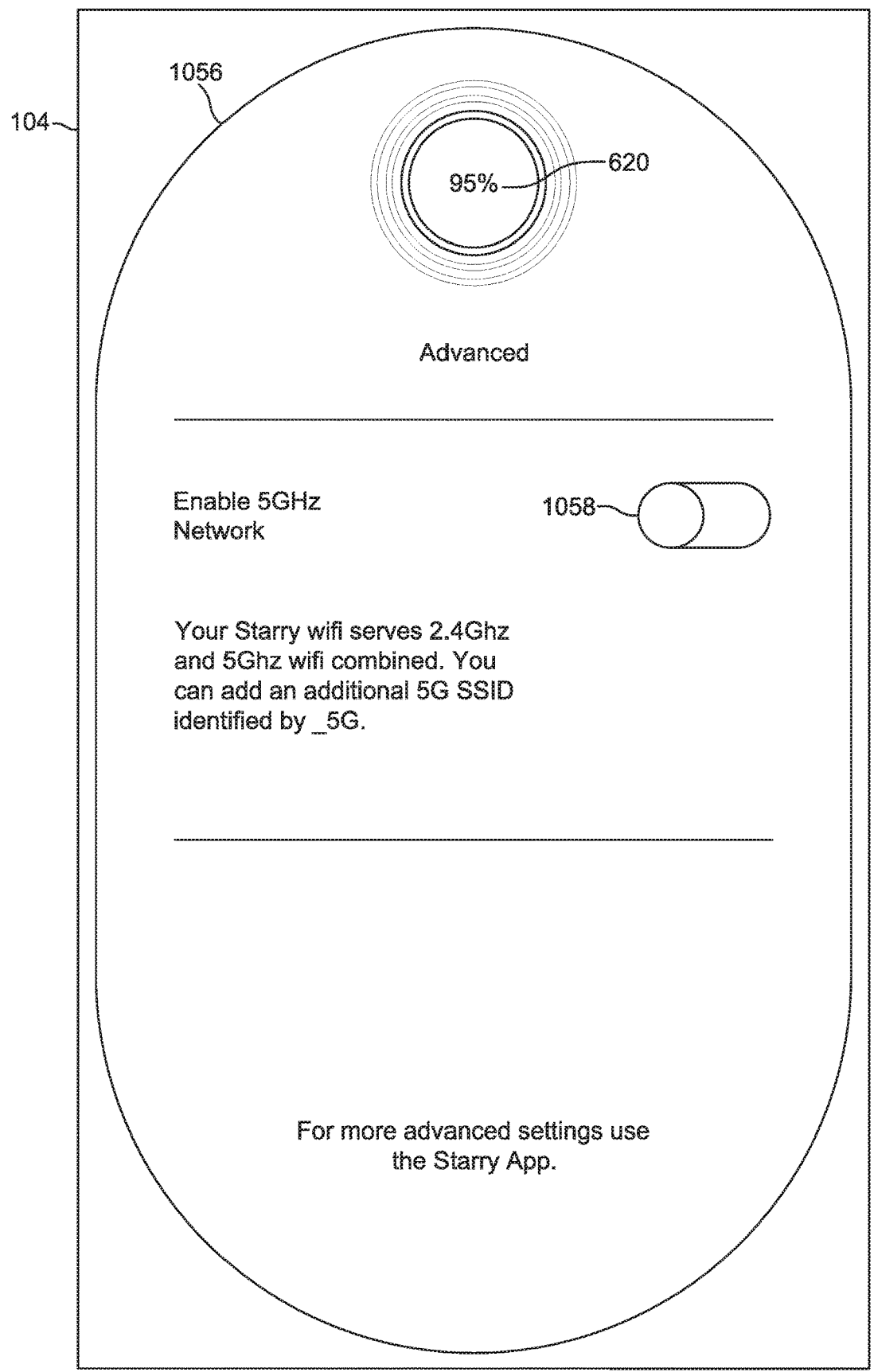
FIG. 27F shows an advanced settings screen of the graphical user interface.

FIG. 27F shows an advanced settings screen 1056, which is displayed when the user selects the "Advanced" button 1032 on the settings screen 1016. The screen includes the health score 620 and the 5 GHz network switch 1058, which, when selected enables the secondary wireless network using the 5 GHz frequency range.

Figure 27G:
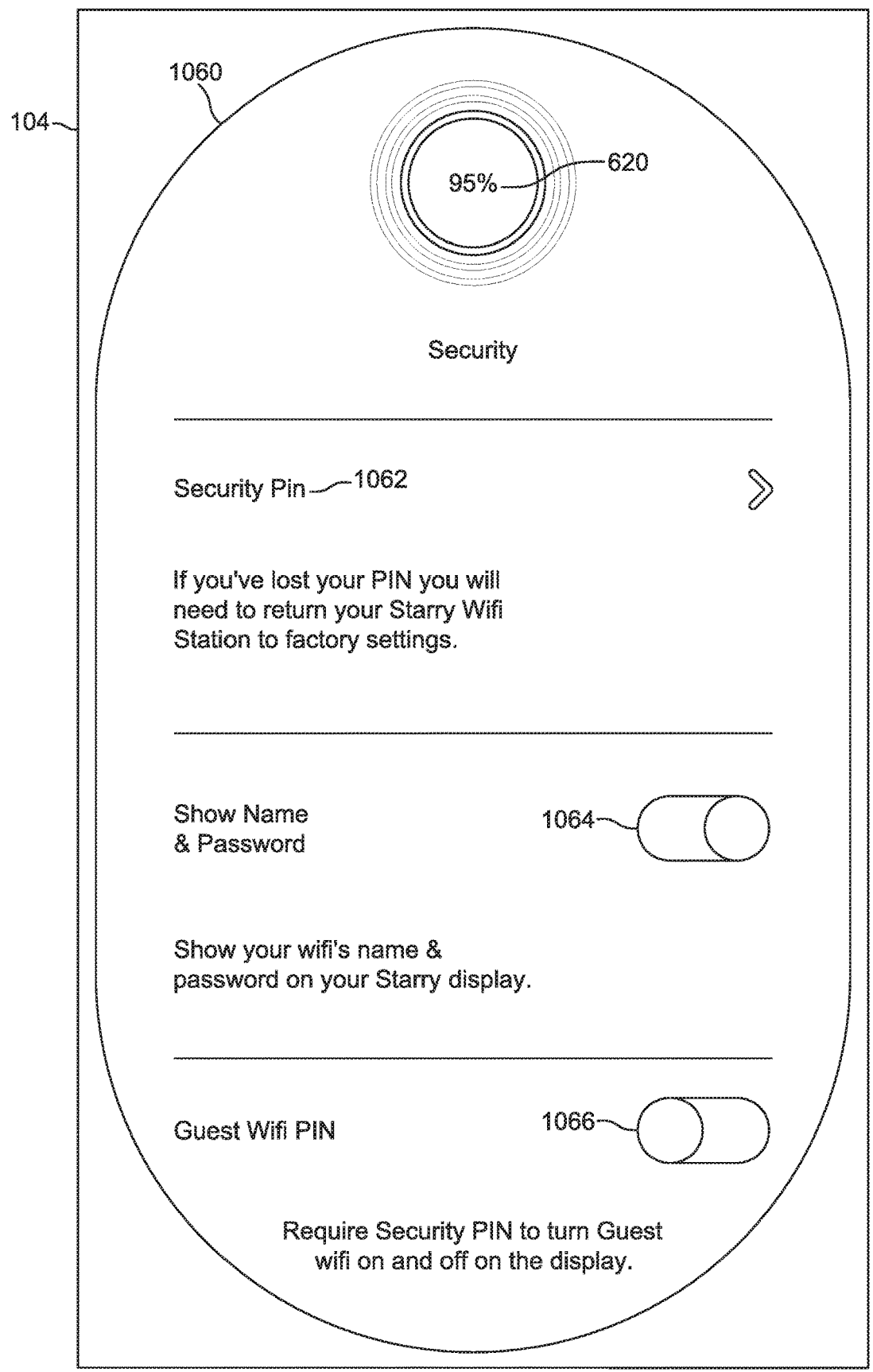
FIG. 27G shows a security settings screen of the graphical user interface.

FIG. 27G shows a security settings screen 1060, which is displayed when the user selects the "Security" button 1034 on the settings screen 1016. The screen includes the health score 620, the "Security Pin" button 1062, the "Show Name & Password" switch 1064 and the "Guest Wi-Fi PIN" switch 1066. The "Security Pin" button 1062, when selected, enables the user to select a new PIN. The "Show Name & Password" switch 1064, when selected, toggles on and off a setting that displays the Wi-Fi name 806 and Wi-Fi password 824. The "Guest Wi-Fi PIN" switch, when selected, toggles on and off a setting that requires the security PIN to be input by the user when the user selects the "Guest Wi-Fi" switch 1024 on the settings screen 1016.

Figure 27H:
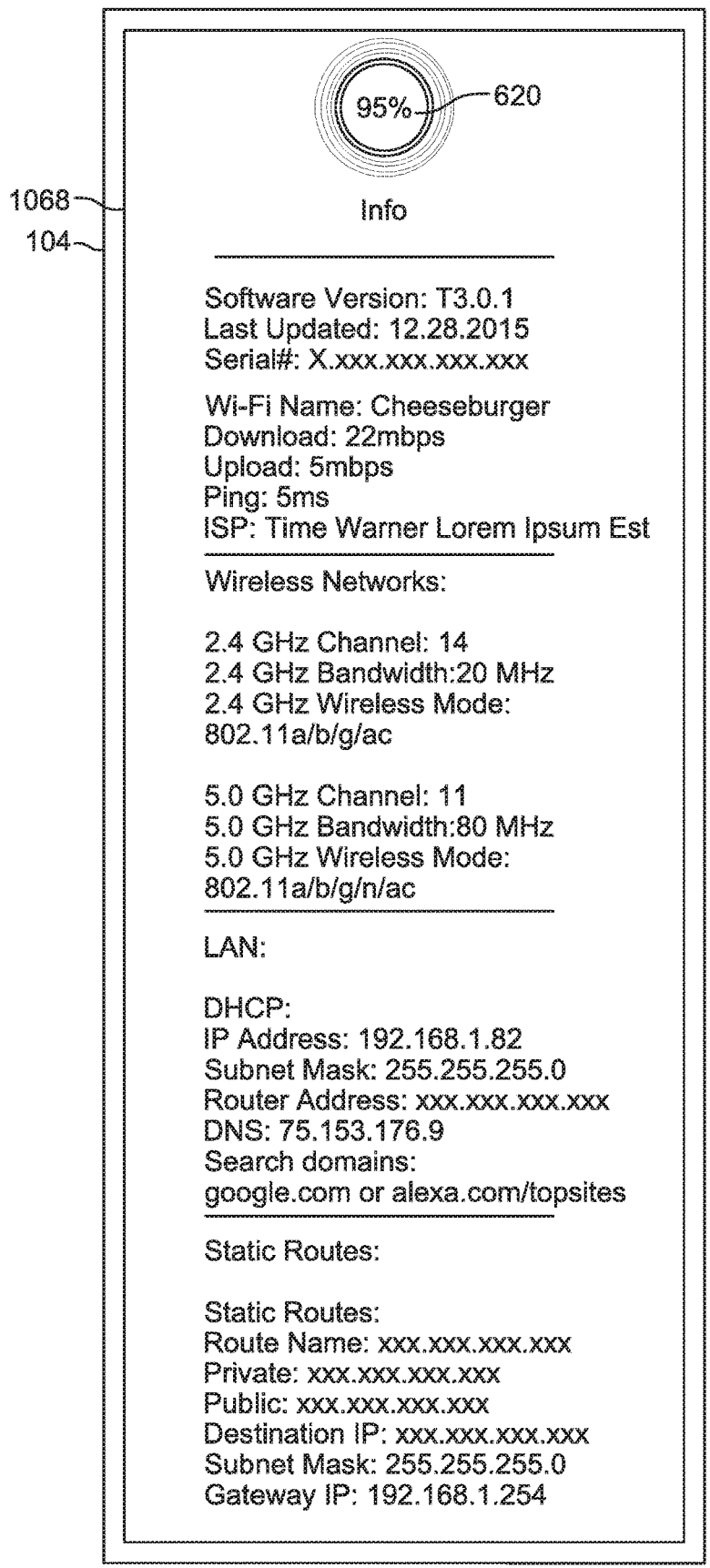
FIG. 27H shows an information screen of the graphical user interface.

FIG. 27H shows an information screen 1068, which is displayed when the user selects the "Info" button 1036 on the settings screen 1016. The screen includes the health score 620 and detailed information regarding the wireless network, including the Wi-Fi name, download speed, upload speed, ping, internet service provider, wireless network channel, bandwidth, and wireless mode, LAN information, including the DHCP server, IP address, subnet mask, router address, DNS server, search domains and static routing information.

Figure 27I:
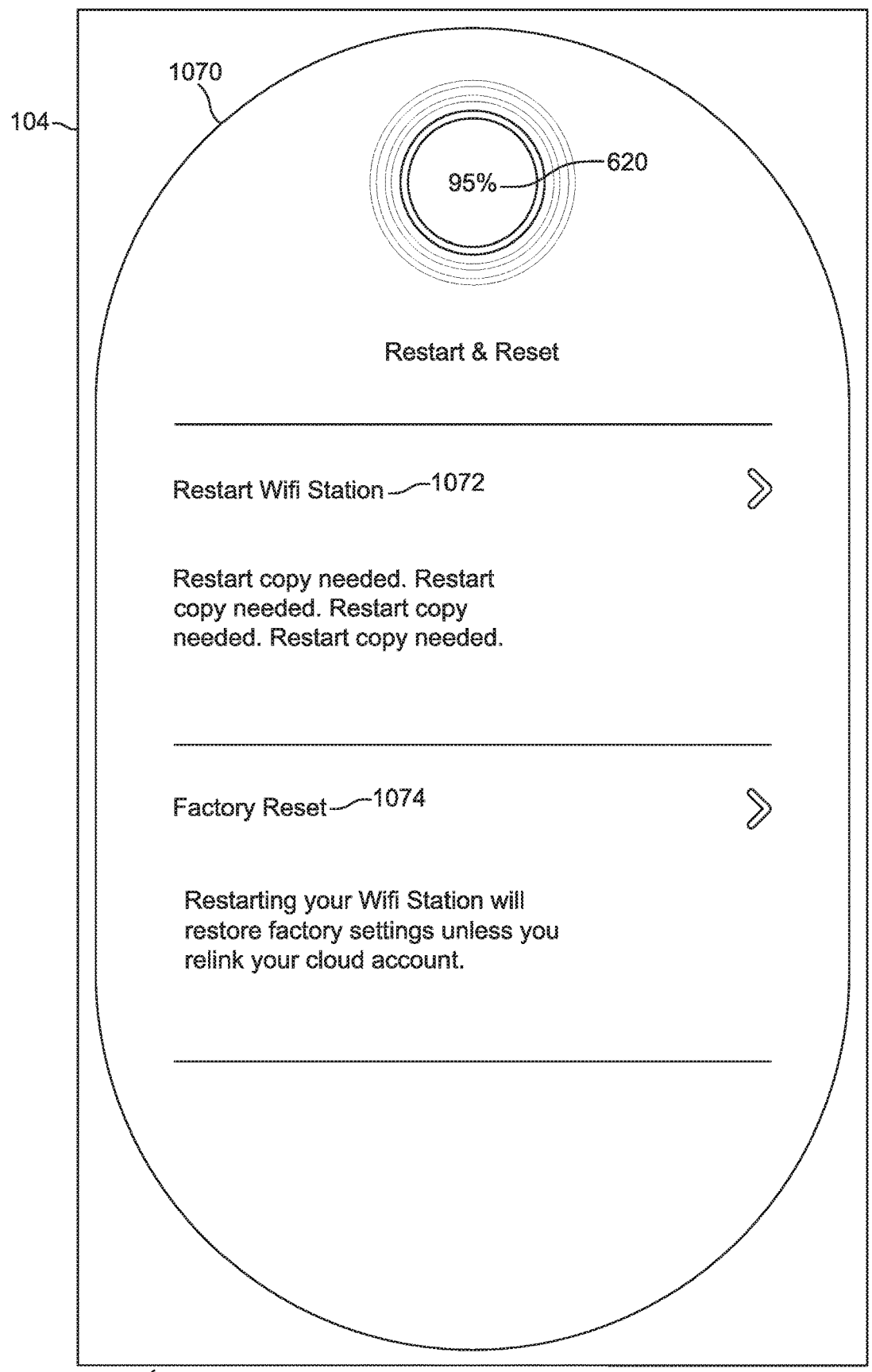
FIG. 27I shows a reset screen of the graphical user interface.

FIG. 27I shows a reset screen 1070, which is displayed when the user selects the "Reset" button 1038 on the settings screen 1016. The screen includes the health score 620, the "Restart Wi-Fi Station" button 1072 and the "Factory Reset" button 1074. The "Restart Wi-Fi Station" button 1072, when selected, restarts the premises networking device 100. The "Factory Reset" button 1074, when selected, restores factory settings to the premises networking device 100.

FIGS. 28A-28G show a series of problem solving screens that are displayed when interactive mode is activated, and a problem with the connection between the premises networking device 100 and the internet, or between the premises networking device 100 and one or more user devices 122 is detected. The problem solving screens are displayed in place of the interactive mode screen 894, and they each include the health score 620, a title and instructional text.

Figure 28A:
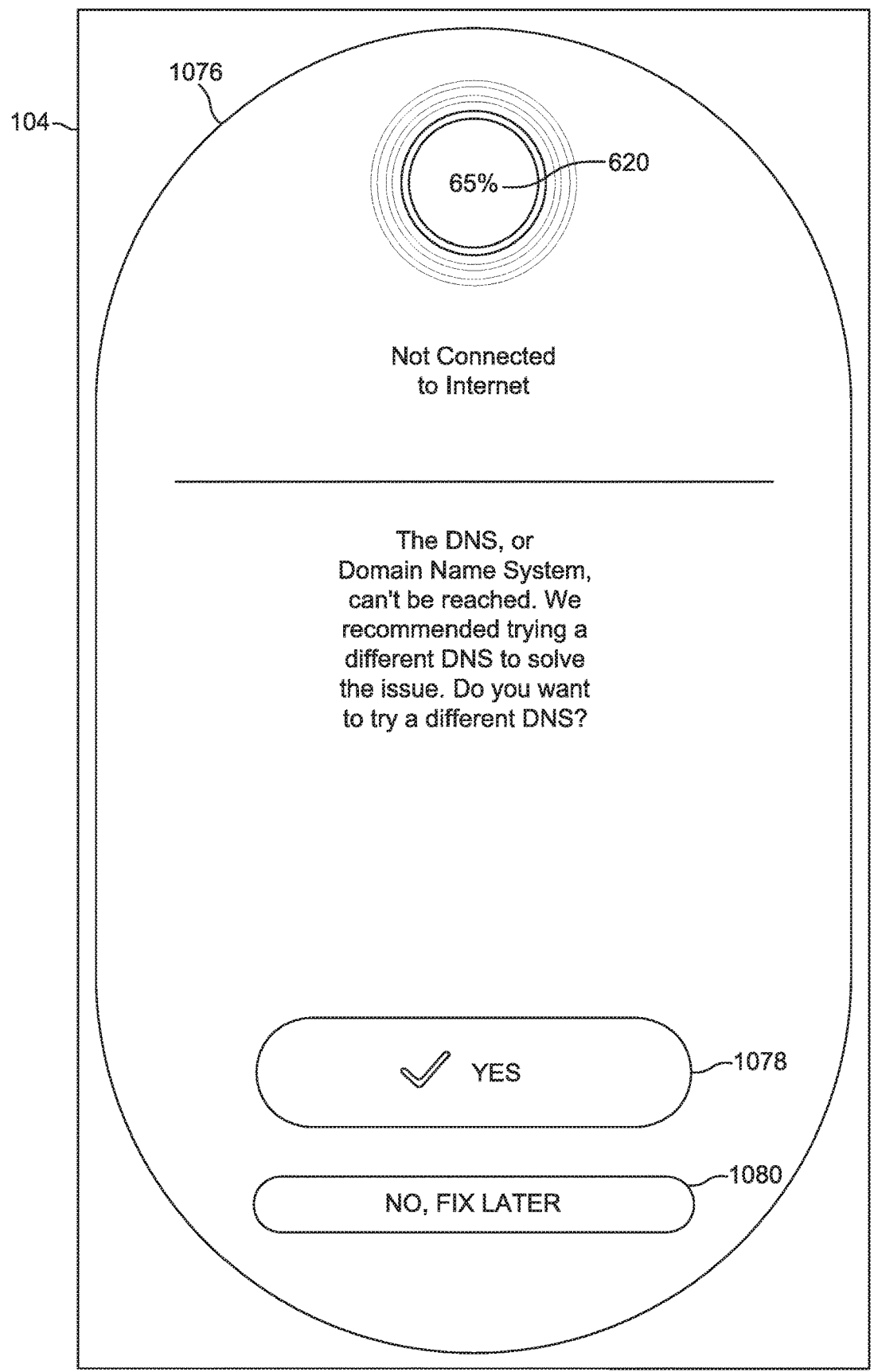
FIG. 28A shows a not connected to internet screen of the graphical user interface.

FIG. 28A shows a not connected to internet screen 1076, which includes a different DNS button 1078 and a fix later button 1080. When selected, the different DNS button 1078 changes the DNS server being used by the premises networking device 100. The fix later button 1080 makes no changes to the configuration settings and advances to the interactive mode screen 894.

Figure 28B:
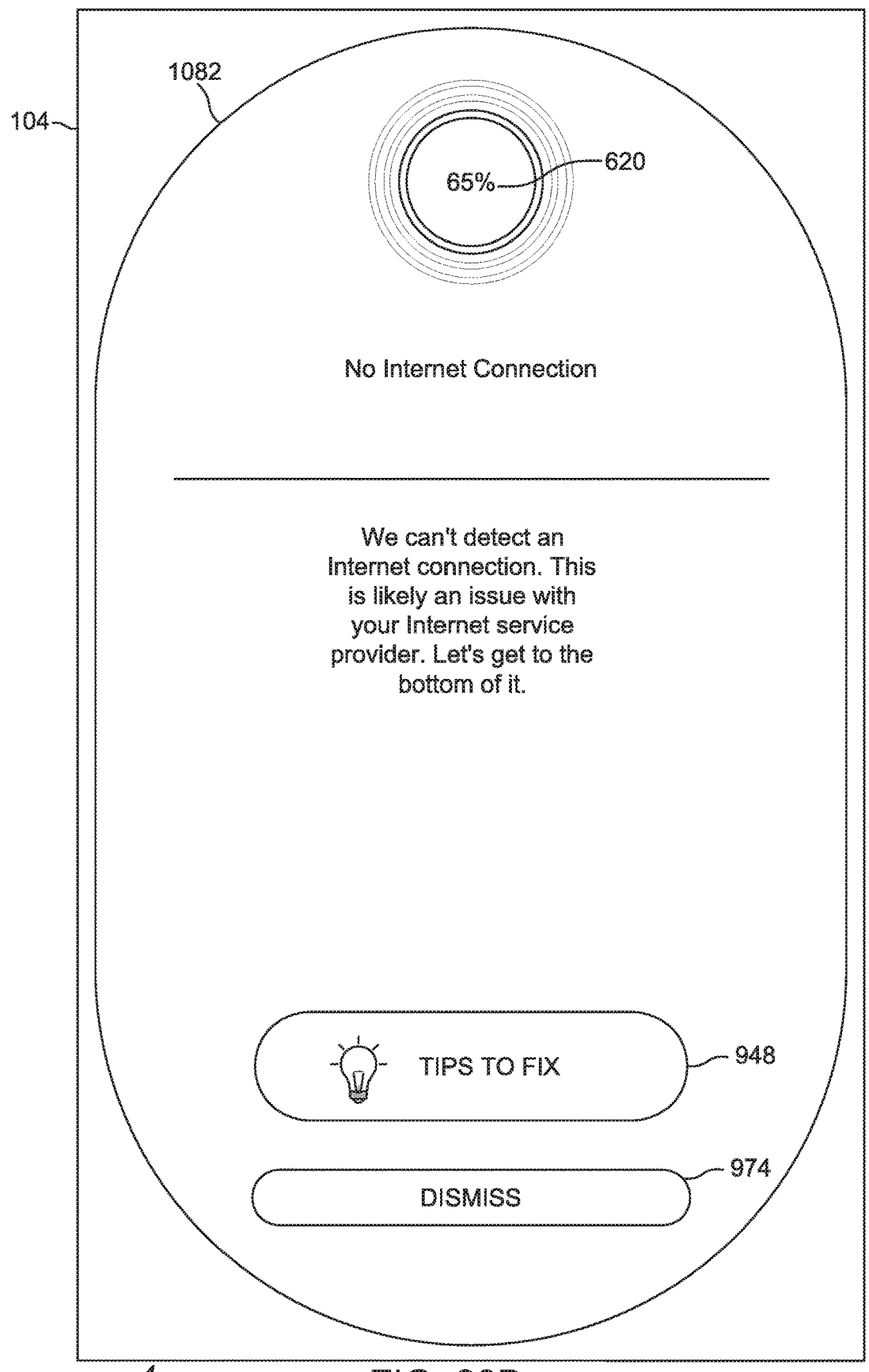
FIG. 28B shows a no internet connection screen of the graphical user interface.

FIG. 28B shows a no internet connection screen 1082, which includes the "Tips to Fix" button 948 and the dismiss button 974.

Figure 28C:
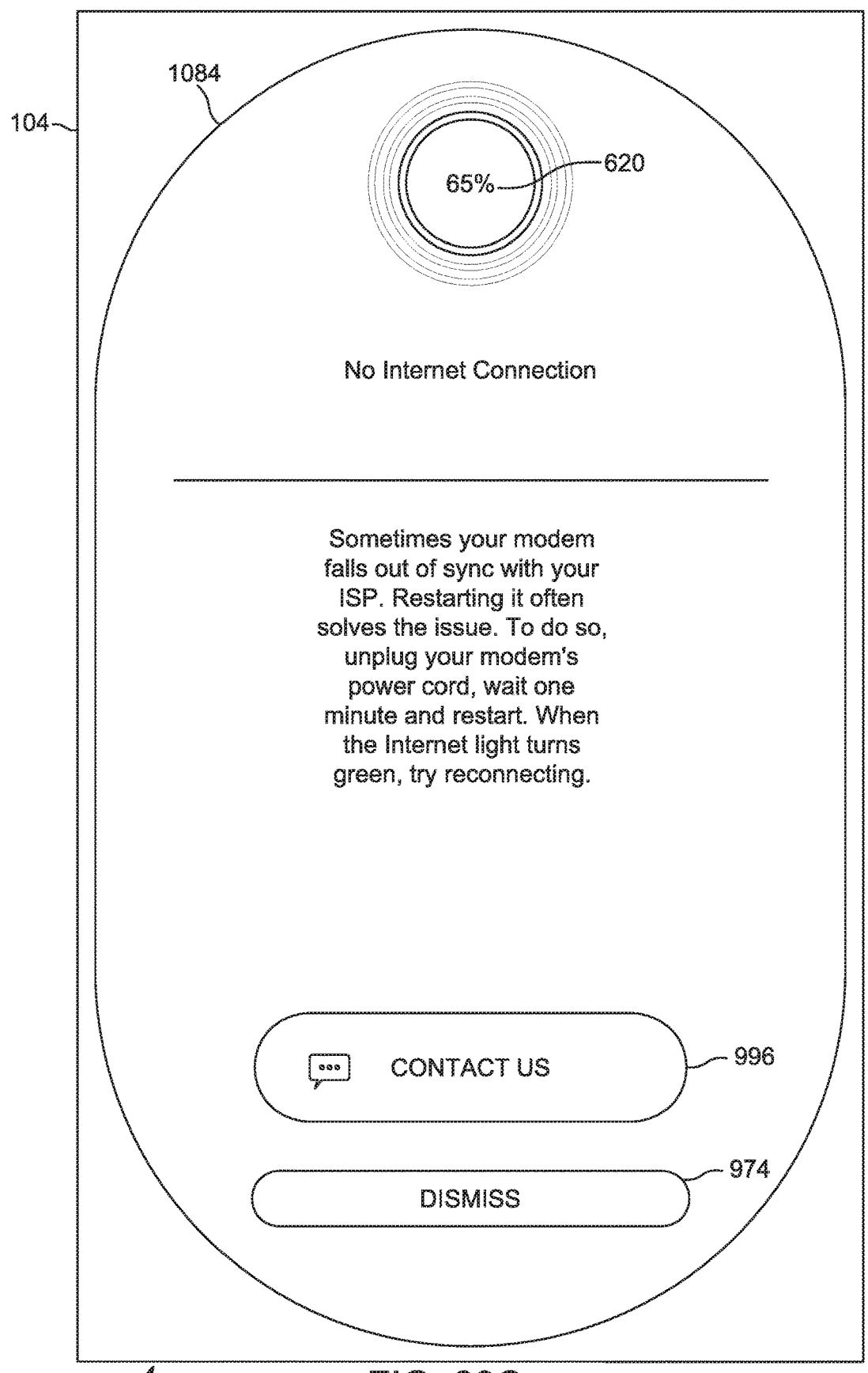
FIG. 28C shows a modem out of sync screen of the graphical user interface.

FIG. 28C shows a modem out of sync screen 1084, which includes the "Contact Us" button 996 and the dismiss button 974.

Figure 28D:
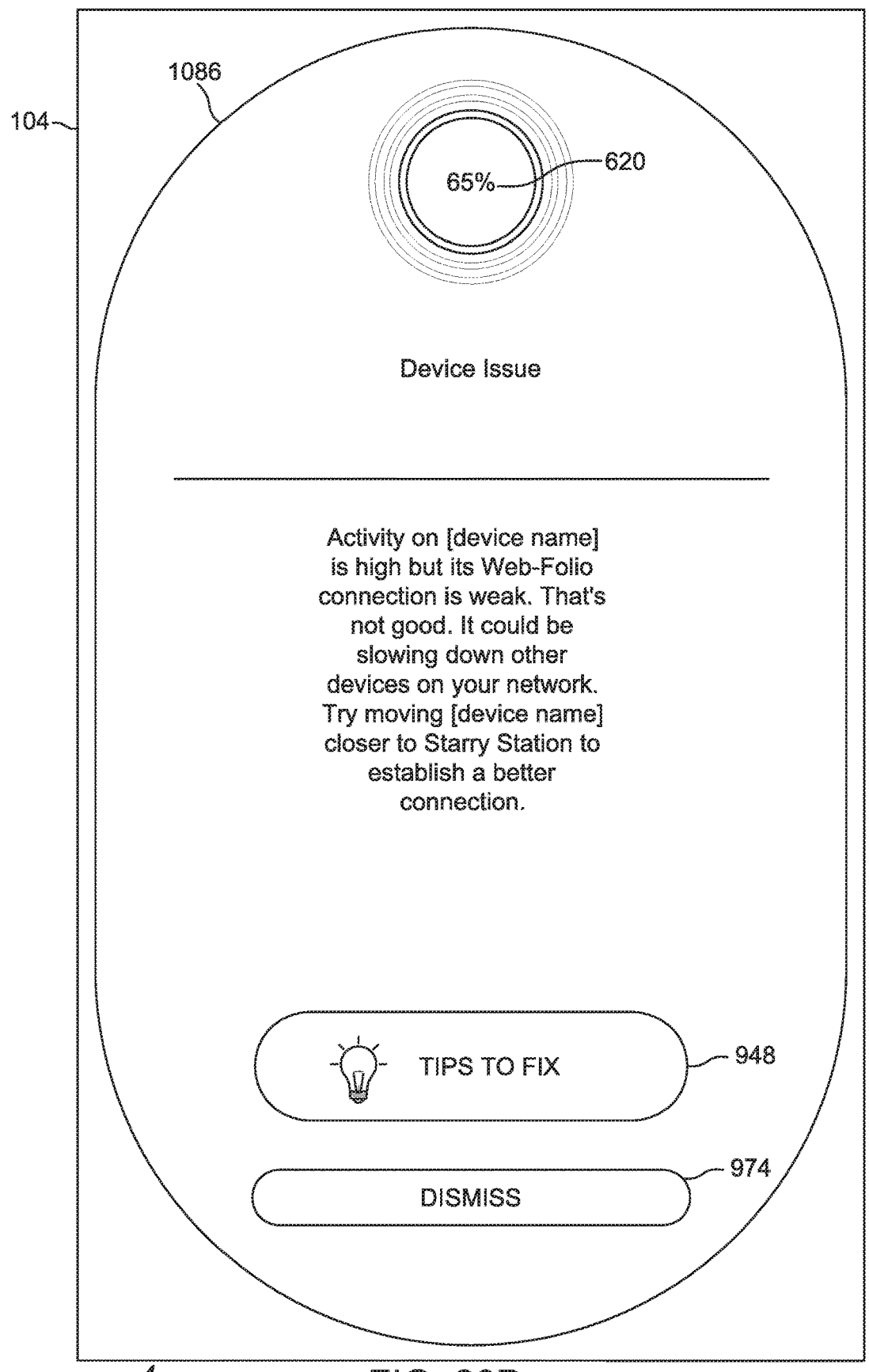
FIG. 28D shows a first example of a device issue screen of the graphical user interface.

FIG. 28D shows a first example of a device issue screen 1086, which includes the "Tips to Fix" button 948 and the dismiss button 974.

Figure 28E:
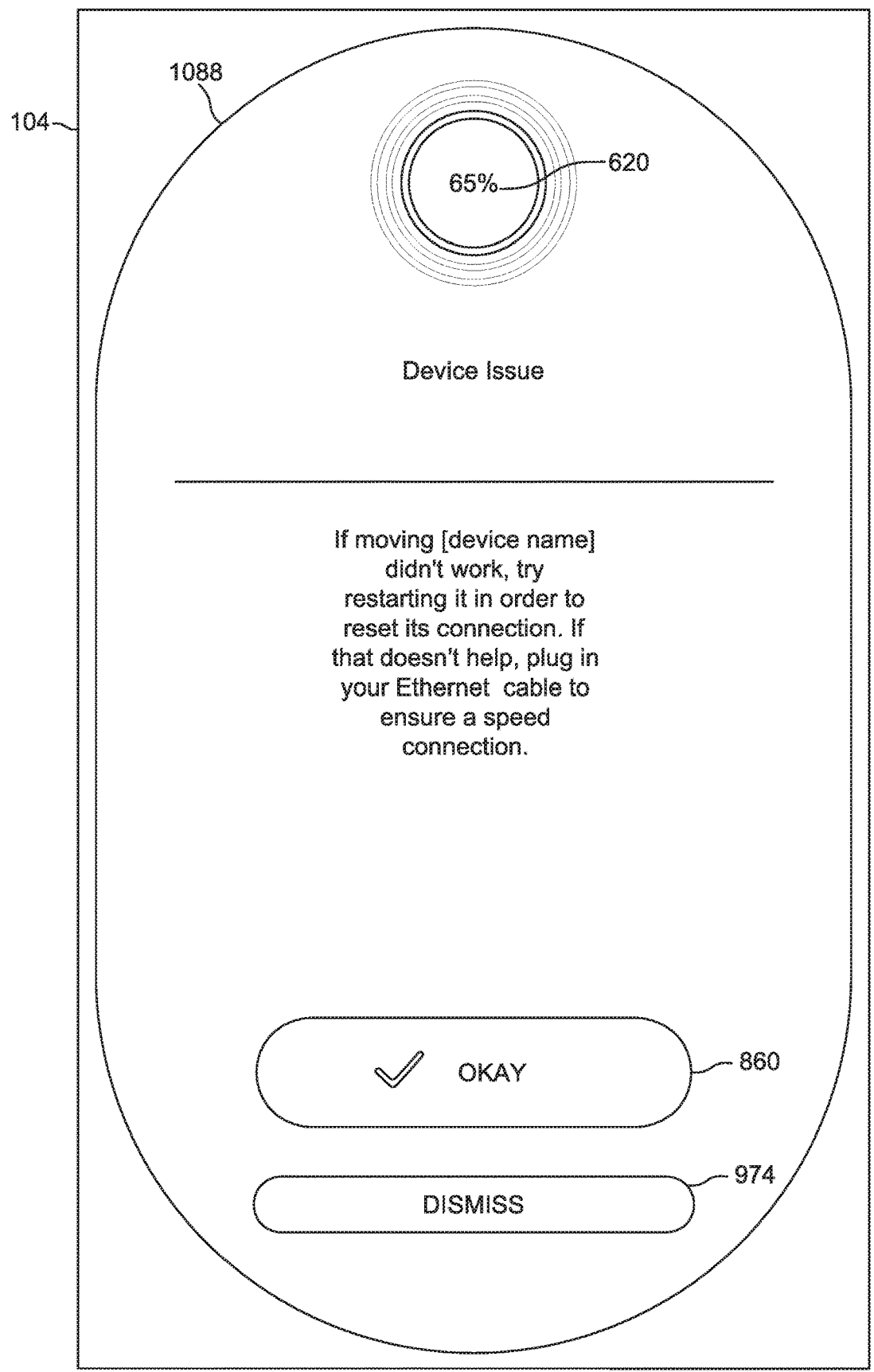
FIG. 28E shows a second example of the device issue screen of the graphical user interface.

FIG. 28E shows a second example of a device issue screen 1088, which includes the "Okay" button 860 and the dismiss button 974.

Figure 28F:
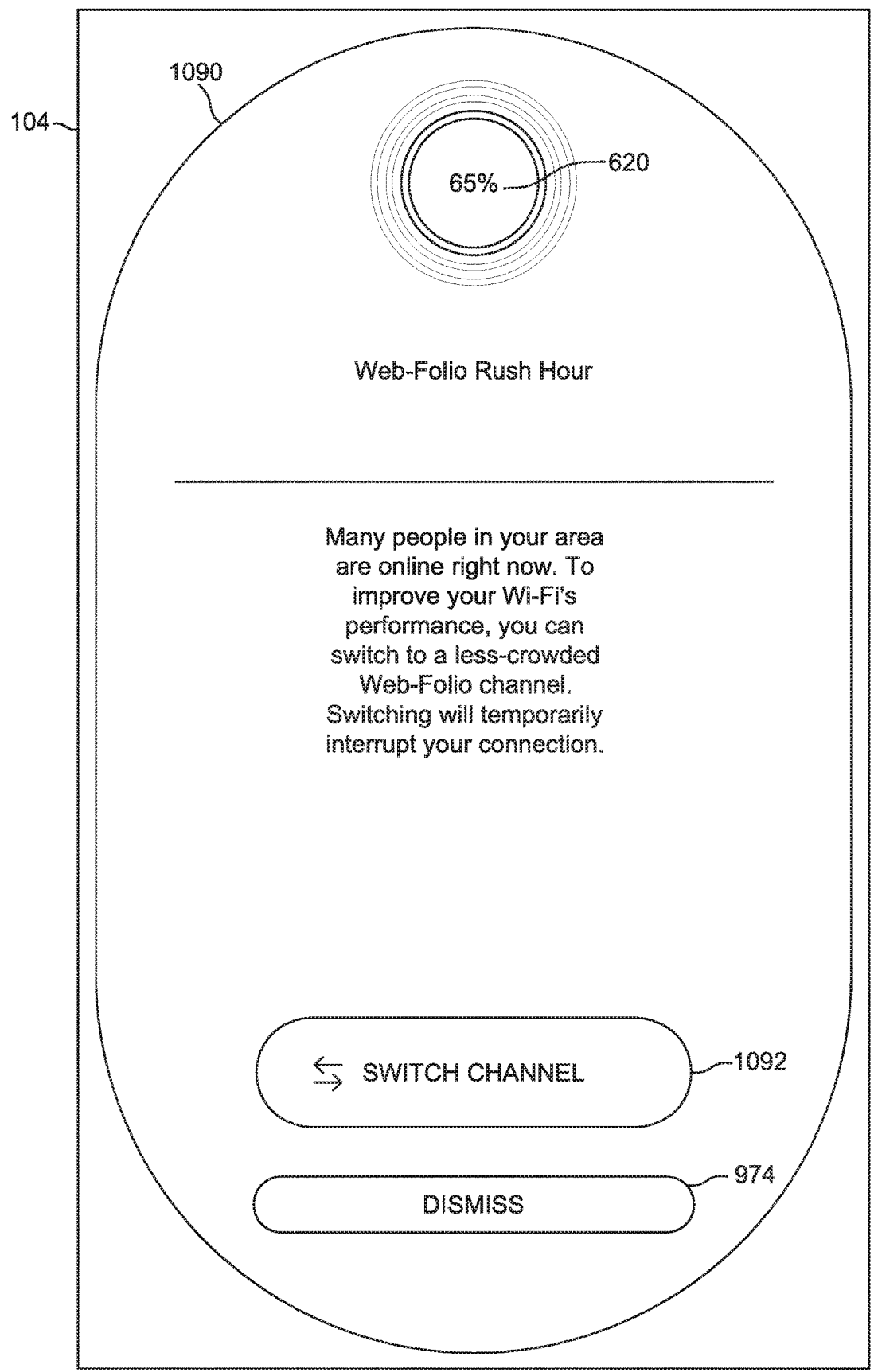
FIG. 28F shows a rush hour screen of the graphical user interface.

FIG. 28F shows a rush hour screen 1090, which includes the "Switch Channel" button 1092 and the dismiss button 974. When selected, the "Switch Channel" button 1092 switches the WLAN channel currently in use to a channel that is detected to be in use by fewer wireless access points in the area of the user's premises networking device 100. The dismiss button 974 makes no changes to the configuration settings and advances to the interactive mode screen 894.

Figure 28G:
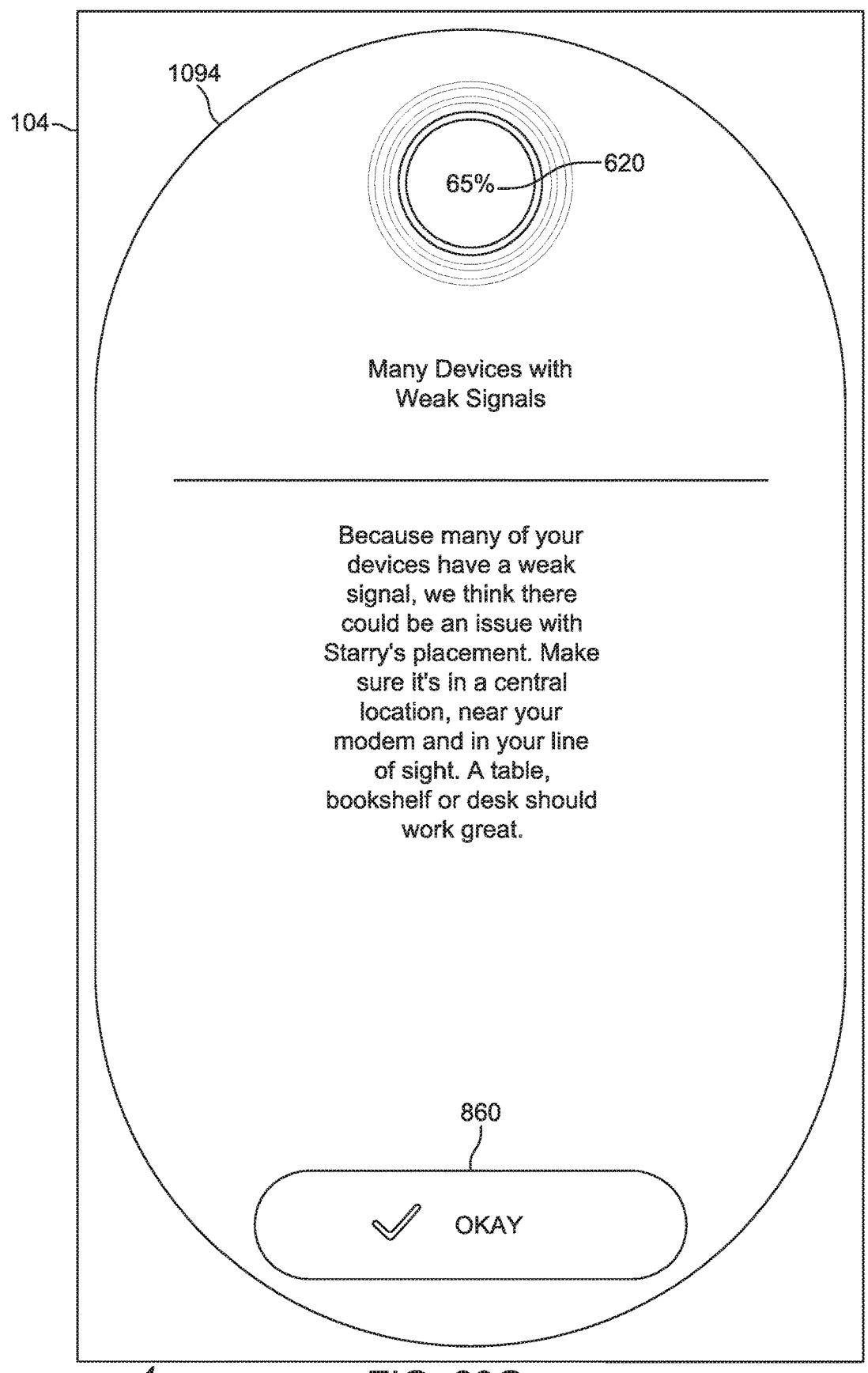
FIG. 28G shows a weak signals screen of the graphical user interface.

FIG. 28G shows a weak signals screen 1094, which includes the "Okay" button 860.

Ambient Mode

Figure 29A:
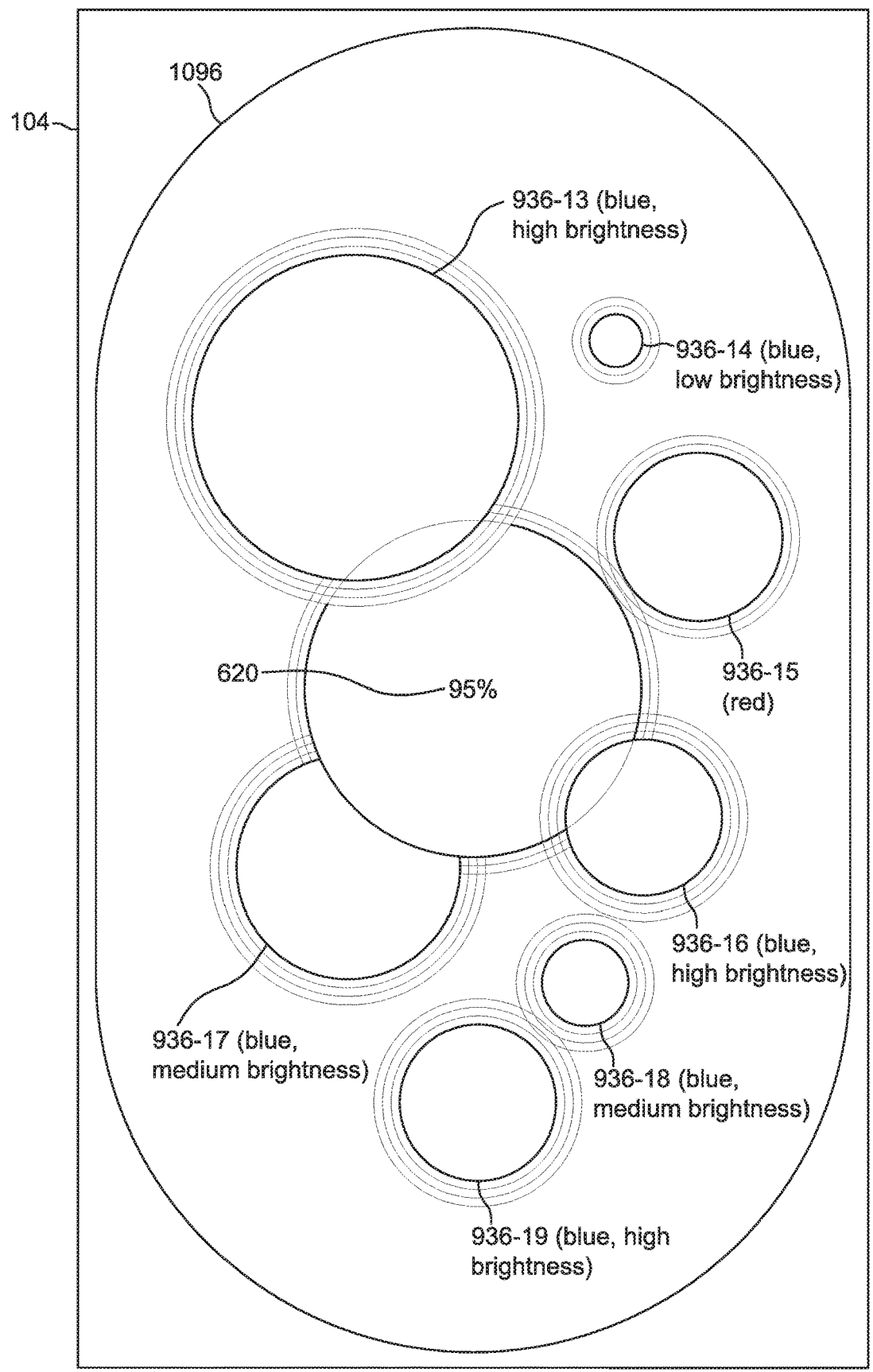
FIG. 29A shows an ambient mode screen of the graphical user interface.

FIG. 29A shows an ambient mode screen 1096, which is displayed when ambient mode 704 is activated by the GUI process 320 executing on the display processor 130. The screen includes the current health score 620. One or more graphical elements are also included. These elements are device status graphics 936 associated with connected user devices 122. As with the devices screen 932, the visual characteristics such as the size, hue and brightness of the device status graphics 936 communicate conditions of the local area network and specifically the conditions encountered by the corresponding user devices 122 represented by the device status graphics 936.

In general, the conditions of the local area network are measured by components of the premises networking device 100, such as the spectrum analyzer 106, the Wi-Fi antenna and chipset 118, 108, the low-power wireless communication interfaces and antenna 110, 120, and the wired data interface 114, and the network conditions information is sent to the display processor 130. The network conditions information can include the rate of transmission of data across the local area network such as between the premises networking device 100 and each of the user devices 122, the rate of transmission of data between the local area network and a wide area network (such as the internet), error rate, the received signal strength of wireless signals sent between the user devices 122 and the premises networking device 100, the amount of data transmitted across the network to and from user devices 122, the bandwidth of the network, whether user devices 122 are connected to the internet, whether user devices 122 are connected to the premises networking device 100, electromagnetic radiation emissions within the spectral bands in which the wireless interfaces 110, 108 operate (and whether network congestion or interference is present), among other examples.

Device status graphics 936 are then displayed on the GUI 126 by the display controller 130 via the GUI process 320 with visual characteristics based on the local area network conditions information. Specifically, the size of each device status graphic 936 is proportional to the amount of data transmitted across the local area network to or from the user device 122 associated with that device status graphic 936. The color of each device status graphic 936 can fall within a spectrum of colors with a constant hue (for example, blue) and variable brightness. A device status graphic 936 with relatively high brightness indicates that the signal strength of wireless signals (RSSI) sent between the associated user device 122 and the premises networking device 100 is higher than average, for example. On the other hand, a device status graphic 936 with relatively low brightness indicates that the signal strength is lower than average.

Device status graphics 936 can also be displayed in a different hue (for example, red or grey) to communicate further information about the network conditions and specifically the connection status of the associated user device 122. A device status graphic 936 that is red can indicate that the associated user device 122 has a problem with its connection (there is no internet connection, or the signal strength of wireless signals received from the user device 122 indicates that the device is too far away from the premises networking device 100 to maintain a reliable connection, among other examples). A device status graphic 936 that is grey indicates that the associated user device 122 is currently not connected to the premises networking device 100.

On the ambient mode screen 1096, the device status graphics 936 are displayed as colored shapes (for example, bubbles) of varying size, each of which is associated with a user device 122 connected to the premises networking device 100. The health score 620 is displayed in the center of the screen.

In the illustrated example, device status graphic 936-13 is the largest of the device status graphics 936 displayed on the ambient mode screen 1096, signifying that the user device 122 associated with device status graphic 936-13 is transmitting and receiving a relatively high amount of data across the network, as determined by the display processor 130 based on measurements from the Wi-Fi antenna and chipset 118, 108. Device status graphic 936-13 is also among the brightest of the device status graphics 936 displayed on the ambient mode screen 1096, signifying that the signal strength of the wireless signals received from the user device 122 is relatively high, as determined by the display processor 130 based on measurements from the Wi-Fi antenna and chipset 118, 108.

In another example, device status graphic 936-14 is among the smallest and the least bright of the device status graphics 936, signifying that the user device 122 associated with the device status graphic 936-14 is transmitting and receiving a relatively low amount of data over the network, and the signal strength of wireless signals received from the user device 122 is relatively low, as determined by the display processor 130 based on measurements from the Wi-Fi antenna and chipset 118, 108.

In another example, device status graphic 936-15 is colored with a red hue, signifying that there is a problem with the device's connection (for example, the signal strength of wireless signals is weak, indicating that the user device 122 is too far away from the premises networking device 100 to maintain a reliable connection), as determined by the display processor 130 based on measurements from the WiFi antenna and chipset 118, 108.

Figure 29B:
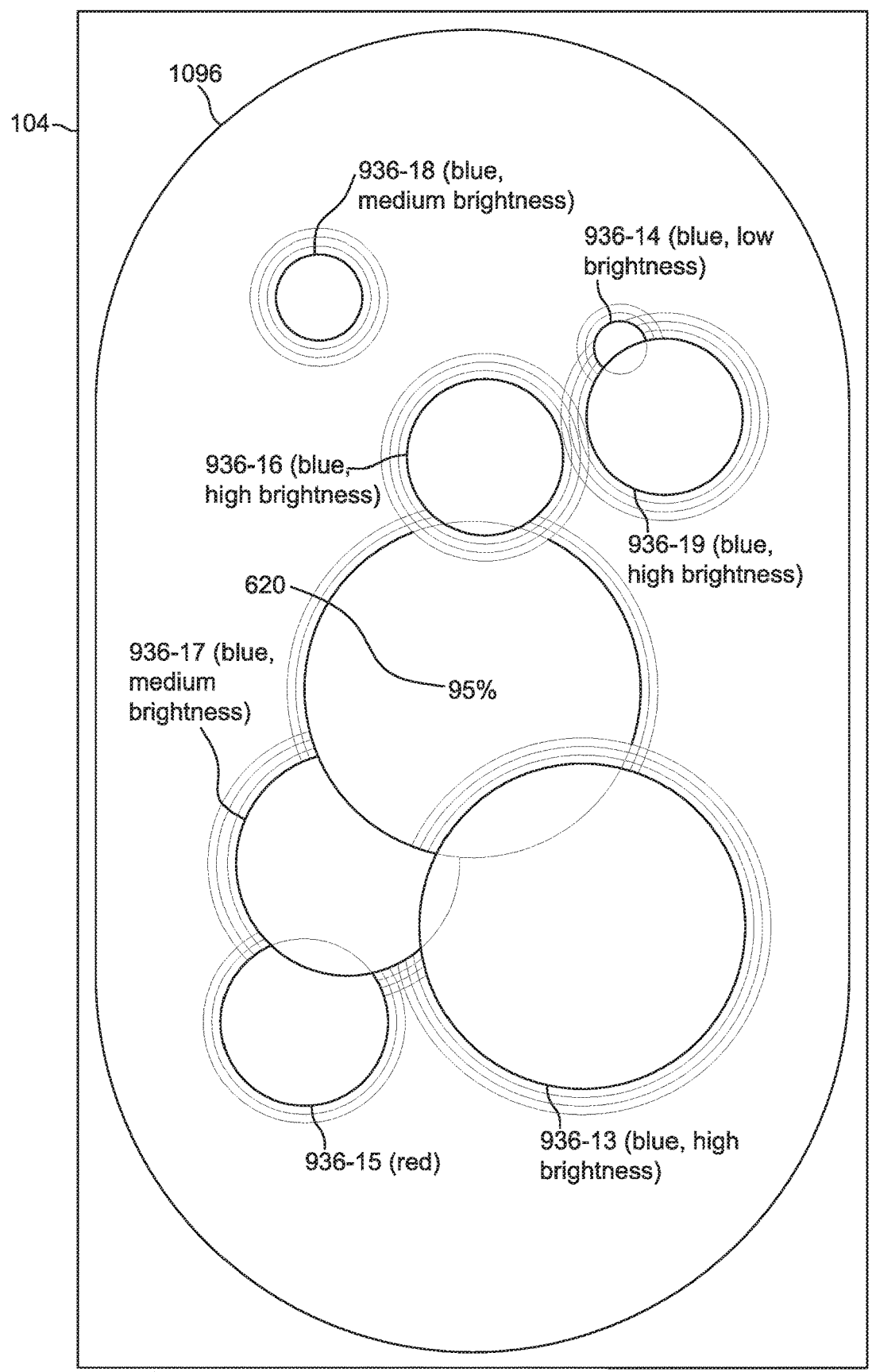
FIG. 29B shows the ambient mode screen at a different point in an animation.

The device status graphics 936 are preferably displayed on the ambient mode screen 1096 in animation. FIG. 29B shows the ambient mode screen 1096 at a different point in the animation, with some device status graphics 936 in different locations relative to the ambient mode screen 1096 depicted in FIG. 29A. The device status graphics 936 can also be selected by the user to display more detailed information, such as the device health screens 950, 956, 962, 970 or the device trouble screen 982, among other examples.

The information on the ambient mode screen 1096 is updated continuously. In one example, a user viewing the ambient mode screen 1096 sees the health score 620 change from 95% to 60%, indicating that a problem with the network has just been detected. In another example, the user sees a device status graphic 936 change from blue to red, indicating that a problem with the connection of the associated user device 122 has just been detected. The user then selects the device status graphic 936 to view more detailed information.

The visual depiction of network health information on the ambient mode screen 1096 enables the user to interpret information displayed on the screen from a position relatively far from the premises networking device 100. In one example, a user seated on a couch in a home can look at the ambient mode screen on a device 100 located on the other side of the room in order to quickly confirm that the network is healthy.

In one embodiment, ambient mode GUIs of third party apps running on the premises networking device 100 via the API 304 can also be displayed in ambient mode 704. In one example, a third party ride service app alerts the user that the user's requested ride is now available by displaying a message on the screen.

Sleep Mode

Figure 30:
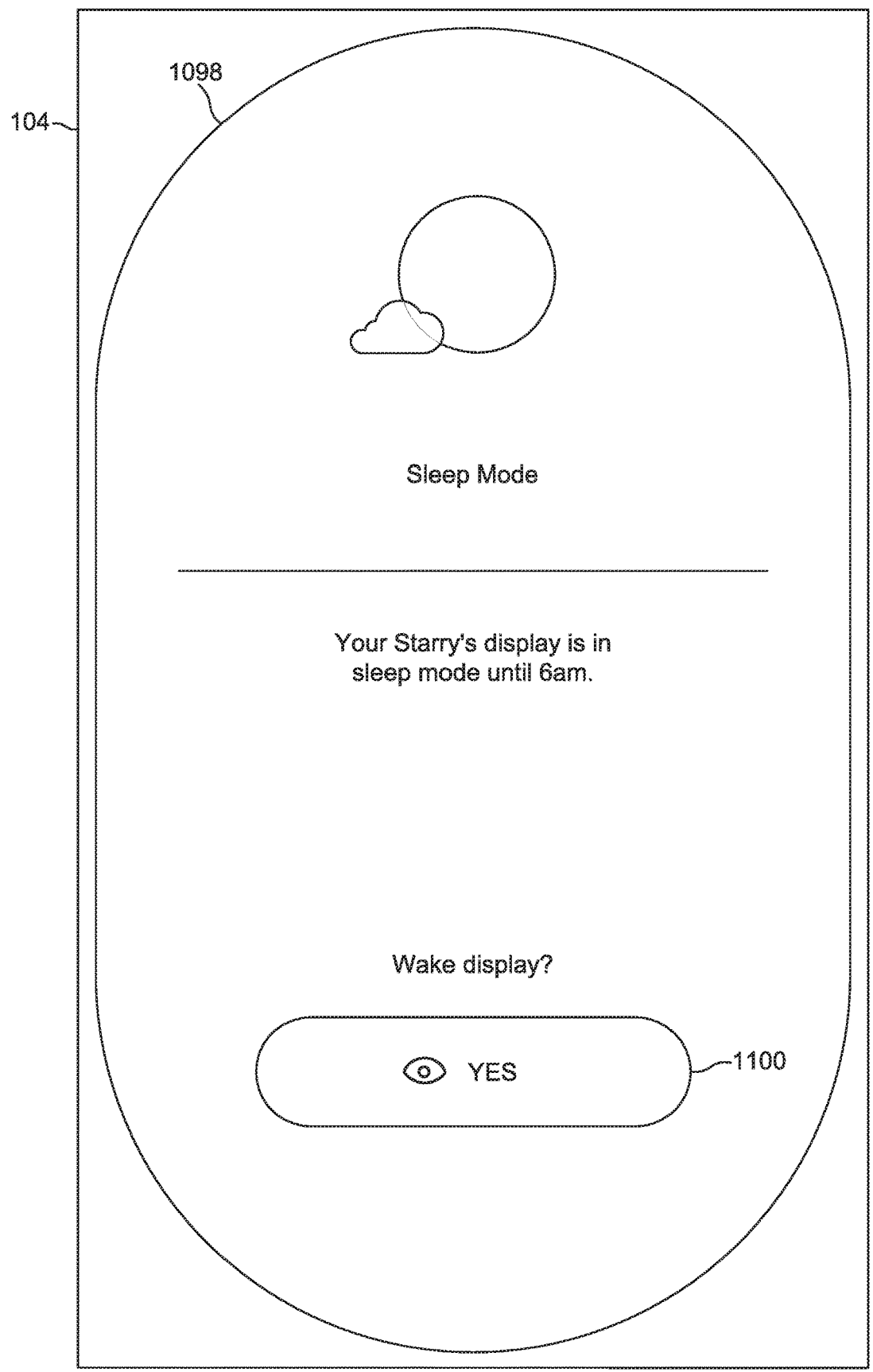
FIG. 30 shows a sleep mode screen of the graphical user interface.

FIG. 30 shows a sleep mode screen 1098, which is displayed when the premises networking device 100 is in sleep mode, and interactive mode is activated. The screen includes instructional text and the "Wake display" button 1100, which, when selected, advances to the interactive mode screen 894.

Screentime

Figure 31A:
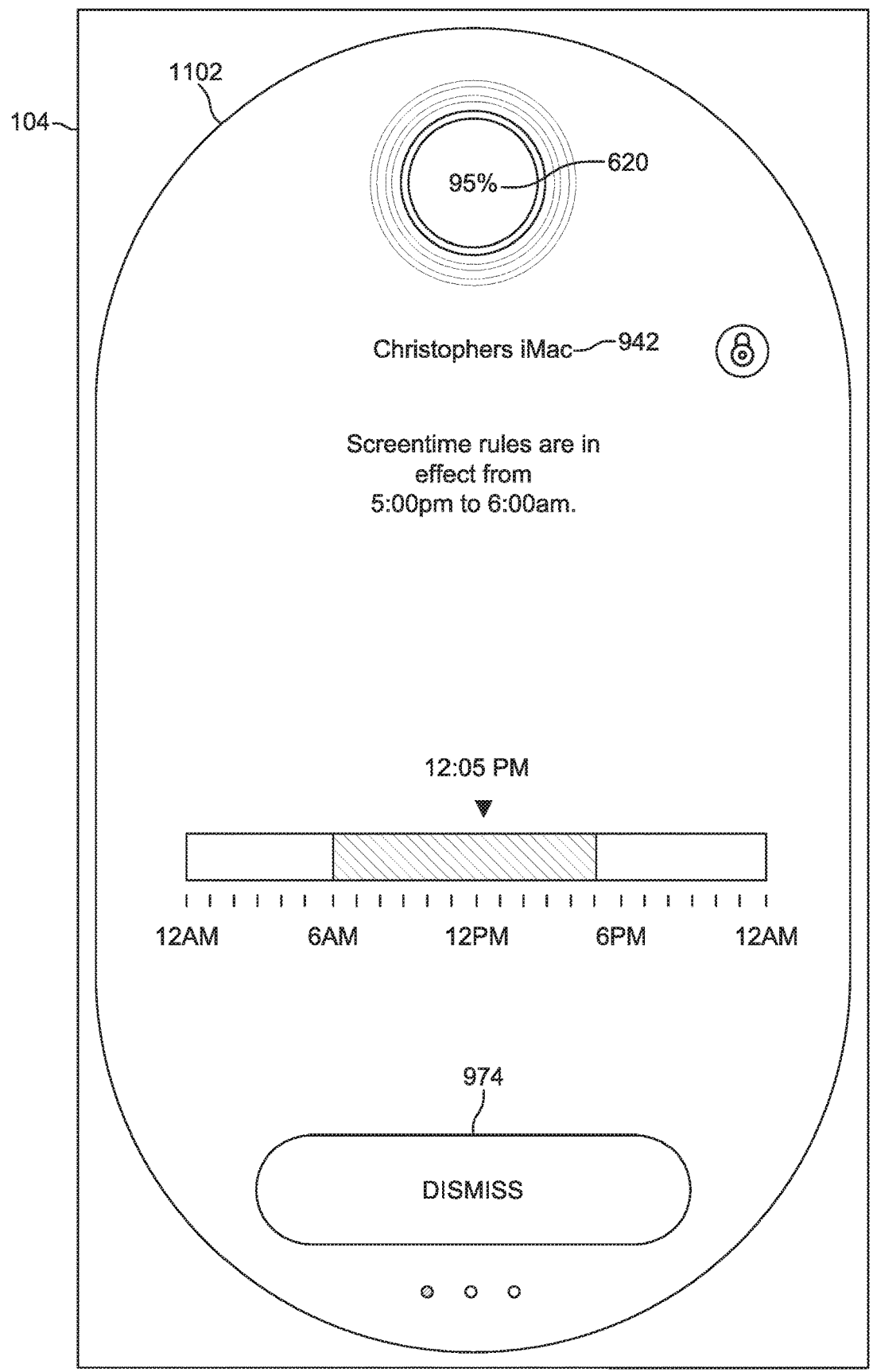
FIG. 31A shows a Screentime status screen of the graphical user interface.

FIG. 31A shows a Screentime status screen 1102, which is displayed when the user selects either a device status graphic 936 on the devices screen 932, or a device name 942 on the devices list screen 940, and the associated user device 122 that was selected is in Screentime mode. The screen includes the health score 620, the device name 942, text and a graphic confirming that Screentime mode is enabled for the associated user device 122, and the dismiss button 974.

Figure 31B:
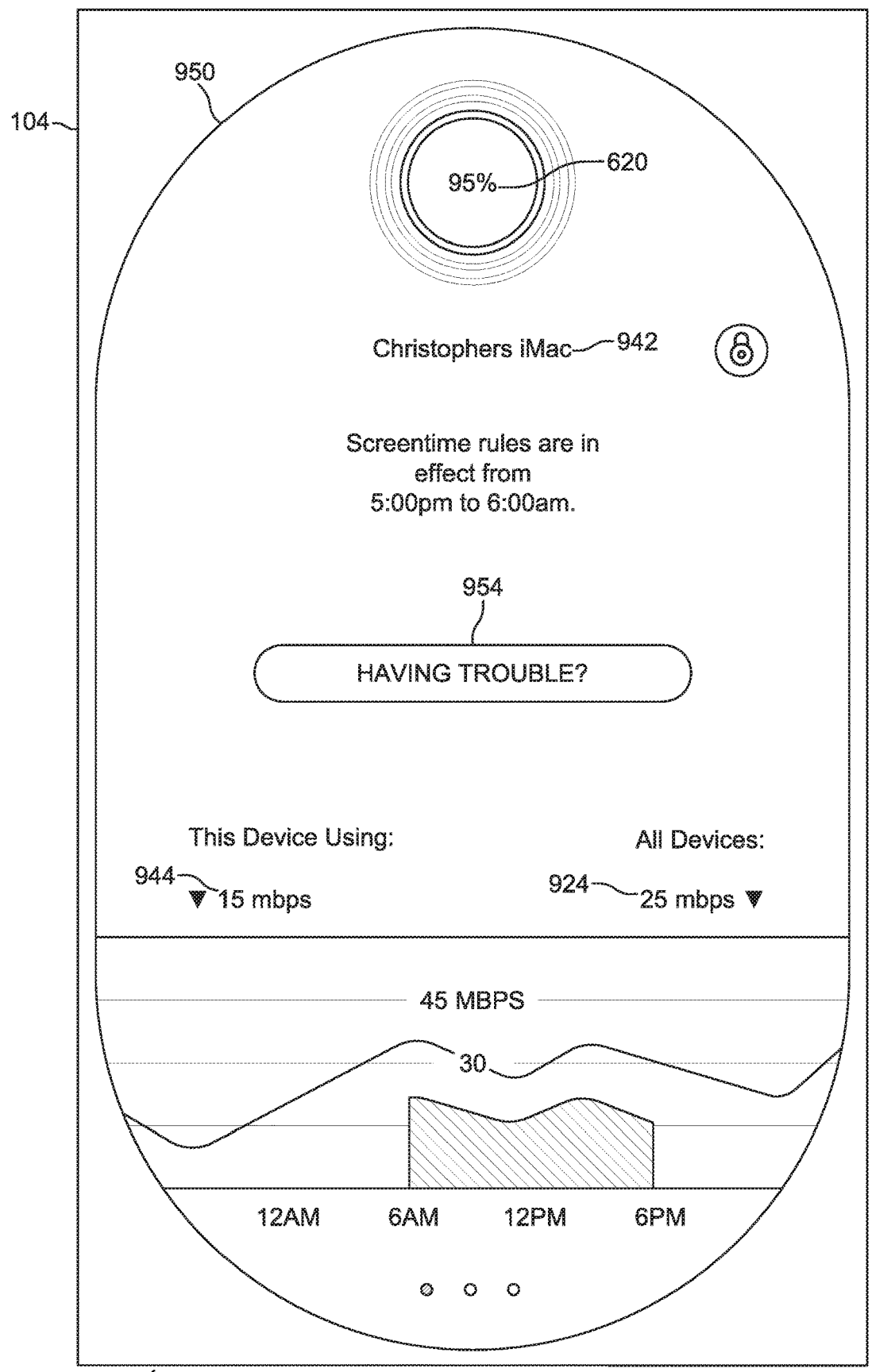
FIG. 31B shows the first device health screen of the graphical user interface for an associated user device that is in Screentime mode.

FIG. 31B shows the first device health screen 950 for an associated user device 122 that is in Screentime mode. The screen includes text confirming that Screentime mode is enabled for the device.

While this invention has been particularly shown and described with references to preferred embodiments thereof, it will be understood by those skilled in the art that various changes in form and details may be made therein without departing from the scope of the invention encompassed by the appended claims.

What is claimed is:

1. A premises networking device, the device comprising:
a controller for maintaining a local area network for a premises, including forwarding data packets to and from host devices of the local area network and providing dynamic host configuration protocol services, and for executing an operating system, wherein the operating system provides an application programming interface enabling instructions to be executed by the controller;
third-party applications executing on the controller and making function calls via the application programming interface, wherein the applications are supplied by entities that are different from a business entity offering the premises networking device,
wherein the premises networking device is an access point and/or router for supporting network connections for host computing devices and for maintaining the local area network for the premises by managing forwarding of packets between the devices on the local area network and an internet service provider, managing configuration settings of the local area network maintained by the premises networking device, performing Dynamic Host Configuration Protocol (DHCP) services, performing domain name system (DNS) services, performing point-to-point protocol over Ethernet (PPPoE) services, performing network address translation (NAT) services, managing encryption, and managing a firewall for the local area network.

2. The device as claimed in claim 1, wherein the application programming interface enables the third-party applications to send instructions to speakers on the premises networking device.

3. The device as claimed in claim 1, wherein the application programming interface enables the third-party applications to send instructions to and receive data from a microphone on the premises networking device.

4. The device as claimed in claim 1, wherein the application programming interface enables the third-party applications to send instructions to and receive data from an infrared sensor on the premises networking device.

5. The device as claimed in claim 1, wherein the application programming interface enables the third-party applications to send instructions to and receive data from a wireless interface of the premises networking device.

6. The device as claimed in claim 1, wherein the application programming interface enables the third-party applications to display a graphical user interface on a touch screen display of the premise networking device.

7. The device as claimed in claim 1, wherein the application programming interface enables instructions from applications executing on network servers to be executed by the controller.

8. The device as claimed in claim 1, wherein the third-party applications include applications for managing home security systems.

9. The device as claimed in claim 1, wherein the third-party applications include applications for managing home lighting systems.

10. The device as claimed in claim 1, wherein the third-party applications include applications for managing speaker systems.

11. The device as claimed in claim 1, wherein the application programming interface enables the third-party applications to access context information of the premises networking device including whether a user is proximate to the premises networking device, whether the user has looked up weather information using the premises networking device, or whether the user has looked up time information using the premises networking device.

12. A method for executing instructions on a premises networking device, the method comprising:
the premises networking device maintaining a local area network for a premises, including forwarding data packets to and from host devices of the local area network and providing dynamic host configuration protocol services;
third-party applications, which are developed by entities that are different from an entity offering the premises networking device, sending function calls to an application programming interface of an operating system of the premises networking device; and
the operating system of the premises networking device receiving and executing the function calls from the applications,
wherein the premises networking device is an access point and/or router for supporting network connections for host computing devices and for maintaining the local area network for the premises by managing forwarding of packets between the devices on the local area network and an internet service provider, managing configuration settings of the local area network maintained by the premises networking device, performing Dynamic Host Configuration Protocol (DHCP) services, performing domain name system (DNS) services, performing point-to-point protocol over Ethernet (PPPoE) services, performing network address translation (NAT) services, managing encryption, and managing a firewall for the local area network.

13. The method as claimed in claim 12, further comprising the third-party applications sending instructions to speakers on the premises networking device via the application programming interface.

14. The method as claimed in claim 12, further comprising the third-party applications sending instructions to and receiving data from a microphone on the premises networking device via the application programming interface.

15. The method as claimed in claim 12, further comprising the third-party applications sending instructions to and receiving data from an infrared sensor on the premises networking device via the application programming interface.

16. The method as claimed in claim 12, further comprising the third-party applications sending instructions to and receiving data from a wireless interface of the premises networking device via the application programming interface.

17. The method as claimed in claim 12, further comprising the third-party applications displaying information in a touch screen display of the premises networking device via the application programming interface.

18. The method as claimed in claim 12, further comprising applications executing on network servers sending instructions via the application programming interface to be executed by the controller.

19. The method as claimed in claim 12, wherein the third-party applications include applications for managing home security systems.

20. The method as claimed in claim 12, wherein the third-party applications include applications for managing home lighting systems.

21. The method as claimed in claim 12, wherein the third-party applications include applications for managing speaker systems.

22. The device as claimed in claim 1, further comprising the third-party applications receiving, via the application programming interface, context information of the premises networking device including whether a user is proximate to the premises networking device, whether the user has looked up weather information using the premises networking device, or whether the user has looked up time information using the premises networking device.

23. A premises networking device, the device comprising:
a microphone and speaker; and
a controller for maintaining a local area network for a premises, including forwarding data packets to and from host devices of the local area network and providing dynamic host configuration protocol services, and for, using the microphone and speaker, establishing a voice connection between a user at the premises networking device and a customer service system, providing uplink and downlink status information, and providing subscription, data usage, and activity information,
wherein the premises networking device is an access point and/or router for supporting network connections for host computing devices and for maintaining the local area network for the premises by managing forwarding of packets between the devices on the local area network and an internet service provider, managing configuration settings of the local area network maintained by the premises networking device, performing Dynamic Host Configuration Protocol (DHCP) services, performing domain name system (DNS) services, performing point-to-point protocol over Ethernet (PPPoE) services, performing network address translation (NAT) services, managing encryption, and managing a firewall for the local area network.

24. The device as claimed in claim 1, wherein the controller is implemented in a combination of a display processor and a network processor.

25. The device as claimed in claim 23, wherein the controller is implemented in a combination of a display processor and a network processor.

26. The device as claimed in claim 1, wherein the third-party applications include applications for combining control of separate premises automation systems including premises lighting systems, security systems and climate systems into one user interface.

27. The device as claimed in claim 1, wherein the third-party applications include applications for blocking advertisements on all internet-connected host devices.

28. The device as claimed in claim 1, wherein the third-party applications include applications for managing parental controls for all connected host devices.

29. The device as claimed in claim 1, wherein the third-party applications include retail shopping applications for making purchases through the premises networking device.

30. The device as claimed in claim 1, wherein the third-party applications include voice-authentication applications for controlling access to the premises networking device and any other third party applications running thereon.

* * * * *